United States Patent
Matsubara

(10) Patent No.: US 8,069,831 B2
(45) Date of Patent: Dec. 6, 2011

(54) METHOD AND APPARATUS FOR START CONTROL OF A VEHICLE

(75) Inventor: Manabu Matsubara, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 635 days.

(21) Appl. No.: 11/286,283

(22) Filed: Nov. 25, 2005

(65) Prior Publication Data

US 2006/0175902 A1  Aug. 10, 2006

(30) Foreign Application Priority Data

| Nov. 26, 2004 | (JP) | ................................ 2004-342679 |
| Dec. 1, 2004 | (JP) | ................................ 2004-348397 |
| Sep. 22, 2005 | (JP) | ................................ 2005-276174 |
| Sep. 22, 2005 | (JP) | ................................ 2005-276175 |

(51) Int. Cl.
 *F02N 11/08* (2006.01)
(52) U.S. Cl. .................................................. 123/179.2
(58) Field of Classification Search ............... 290/38 R, 290/37 A, 38 C, 38 D; 307/10.6, 10.7, 71, 307/37, 60, 66, 132 E; 123/179.3, 179.5, 123/335, 406.55, 407.57; 322/90; 320/117, 320/71; 361/166, 191, 3
See application file for complete search history.

(56) References Cited

U.S. PATENT DOCUMENTS

| 4,412,137 A | * | 10/1983 | Hansen et al. | ............... 307/10.6 |
| 7,342,325 B2 | * | 3/2008 | Rhodes | ........................ 307/10.6 |

FOREIGN PATENT DOCUMENTS

| JP | U-07-17660 | 3/1995 |
| JP | A-09-203364 | 8/1997 |
| JP | A-09-228935 | 9/1997 |
| JP | A 9-329074 | 12/1997 |
| JP | Y2 2573274 | 3/1998 |
| JP | A 11-072071 | 3/1999 |

OTHER PUBLICATIONS

Japanese Patent Office, Japanese Notice of Rejection for Application No. 2005-276174 (with English translation), mailed: Jan. 5, 2010, pp. 1-2 (translation: pp. 1-3).
Japanese Patent Office, Japanese Notice of Rejection for Application No. 2005-276175 (with English translation), mailed: Feb. 2, 2010, pp. 1-3 (translation: pp. 1-4).

* cited by examiner

*Primary Examiner* — Michael Cuff
*Assistant Examiner* — Keith Coleman
(74) *Attorney, Agent, or Firm* — Oliff & Berridge PLC

(57) ABSTRACT

An accessory switch SWa and an ignition switch SWi are connected to a sub-relay RL1. A starter switch SWs is connected to a sub-relay RL2. The sub-relay RL2 is turned OFF when welding occurs in the starter switch SWs. When welding occurs in the accessory switch SWa, the starter switch SWs is turned OFF, or the starter switch SWs is not turned ON.

15 Claims, 61 Drawing Sheets

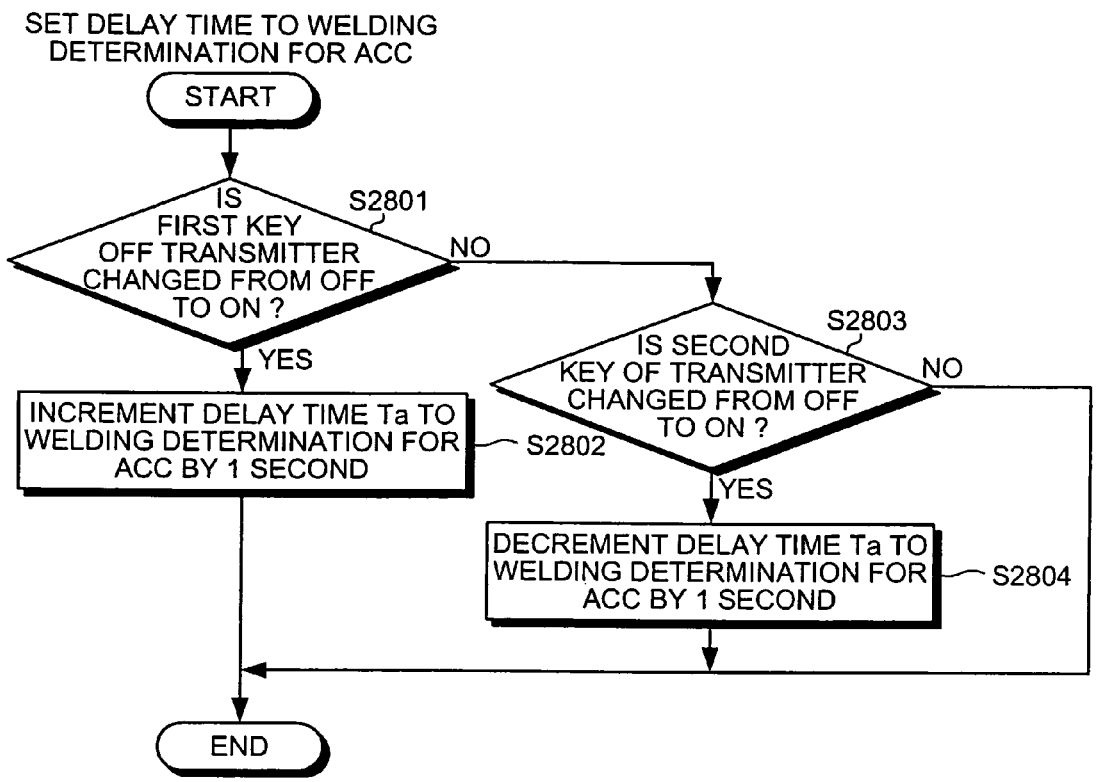
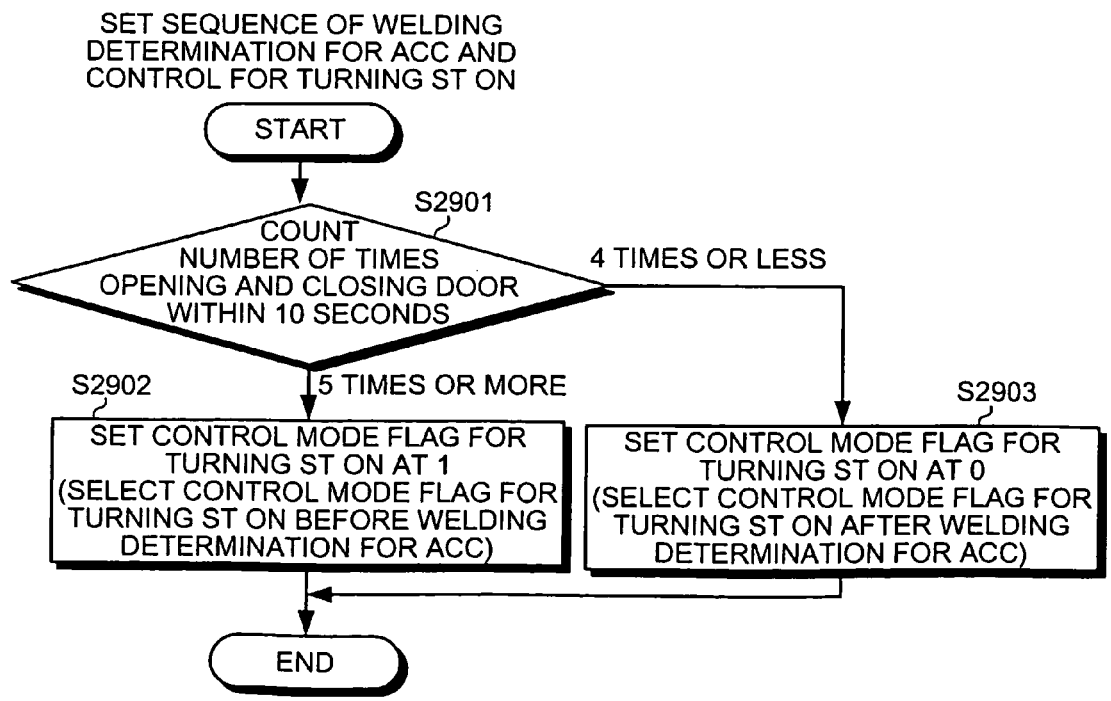

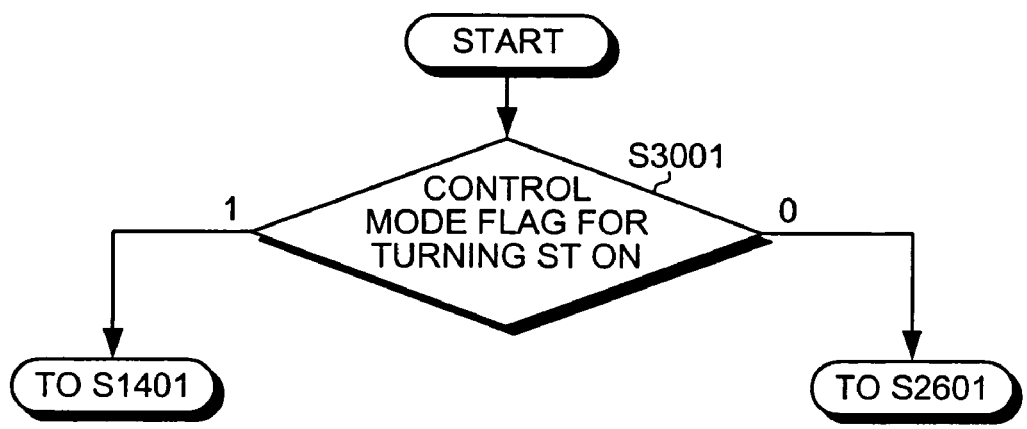
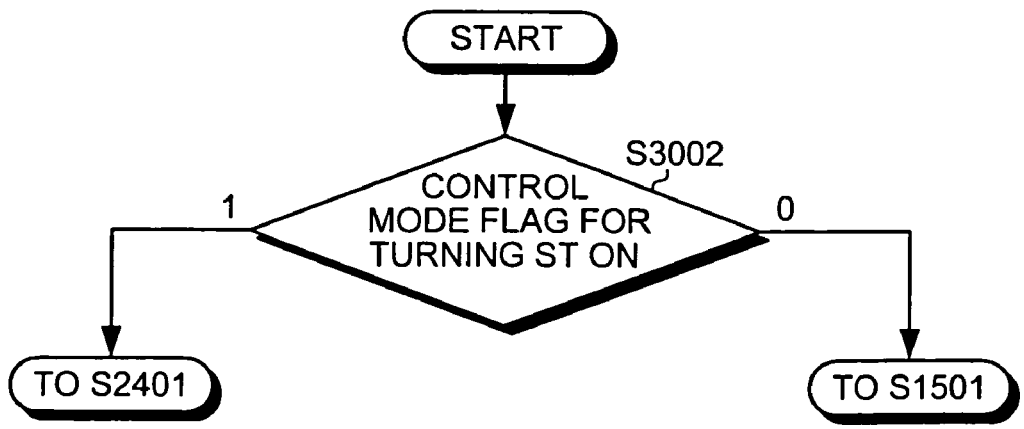

WHEN STARTER SWITCH SWs1 IS NOT NECESSARY

METHOD AND APPARATUS FOR START CONTROL OF A VEHICLE

CROSS-REFERENCE TO RELATED APPLICATIONS

This application is based upon and claims the benefit of priority from Japanese Patent Application No. 2004-342679, filed on Nov. 26, 2004; Japanese Patent Application No. 2004-348397, filed on Dec. 1, 2004, Japanese Patent Application No. 2005-276174, filed on Sep. 22, 2005, and 2005-276175, filed on Sep. 22, 2005 the entire contents of which are incorporated herein by reference.

BACKGROUND OF THE INVENTION

1. Field of the Invention

The present invention relates to a start control technique for controlling starting of a vehicle based on a signal received from a remote terminal or in the directive mode.

2. Description of the Related Art

A vehicle generally has a starter switch to control starting of an engine of the vehicle, an ignition switch to control ignition of the engine, and an accessory switch to control on/off of an in-vehicle electric equipment.

When the starter switch is ON, large amount of power is required to rotate a starter motor. Therefore, when the starter switch and the accessory switch are turned ON simultaneously, enough power may not be supplied to the in-vehicle electric equipment.

To solve this problem, conventionally, a configuration has been employed in which the ignition key is mechanically operated by the operator to turn ON or OFF the switches (a starter switch, an ignition switch, and accessory switches), so that the starter switch and accessory switches do not turn ON simultaneously.

Recently, however, vehicles can be stared with a remote operation terminal, such as a remote key, i.e., without using an ignition key. In such a case, a relay circuit is used to perform ON/OFF control of the ignition switches, such as the starter switch, the ignition switch, and the accessory switches.

However, because the starter switch and the accessory switch control a larger current, contact welding can occur in a switch (a control relay) of these switches. If contact welding occurs, the starter switch and the accessory switch can simultaneously turned ON.

Japanese Utility Model Publication No. 2573274 discloses a technique to turn OFF other control relays when contact welding occurs in a switch (a control relay) and then turning OFF a sub-relay shared by each switch. Japanese Patent Laid-Open Publication No. H9-329074 discloses an engine starter with enhanced capability for detecting trouble in bypassing a start contact in a contact unit.

In the conventional techniques, however, a sub-relay is turned OFF after contact welding is detected and other switches are turned OFF, so that is a time lag until power to the switch, in which the contact welding has occurred, is disconnected.

As a result, the starter switch and the accessory switch may be simultaneously turned ON, in-vehicle electric equipment may be affected by noises, and the starter motor may operate even after start of an engine is completed.

Sometimes it may be desirable to continue usual operations, even when welding occurs, without disconnecting all the switches. For instance, when welding occurs in the starter switch, it is preferable that only the starter switch is disconnected and usual operations of the accessory switch or the ignition switch are continued.

In the conventional techniques, however, when welding occurs in any switch, even the other switches are disconnected before disconnecting the shared sub-relay. As a result, ordinal control can not be continued even in switches in which welding has not occurred.

In some vehicles, a plurality of ignition or starter signals are used. In this case, it is necessary to provide a corresponding number of ignition switches or starter switches in the start control apparatus. However, production cost increases in preparing two types of start control apparatuses: one for vehicles that use only one signal and one for vehicles that use a plurality of signals. Thus, there is need to develop a versatile start control apparatus that can be used in both type of vehicles.

Moreover, from the view point of cost reduction, it is desirable that switches that are not necessary are not provided, and that switches can be provided only when required.

However, when a start control apparatus capable of corresponding to starter signals for two signal lines is loaded in a vehicle having only one signal line, if switches that not used are simply removed, an abnormal state is generated when there is a need to determine a state of the removed switches.

Determination of state of a switch includes open determination and welding determination. Open determination includes determining whether the switch is open (i.e., whether the switch is correctly turned ON in response to control for turning the switch ON). Welding determination includes determining whether welding has occurred (i.e., whether the switch is correctly turned OFF in response to control for tuning the switch OFF). In the case of the removed switch, the result of the determination of its state is always the same, i.e., OFF, so that the result of the open determination always indicates that there is open trouble (i.e., the switch is OFF irrespective of control for turning the switch ON).

There is a need for development of a start control apparatus and a start control method having high applicability irrespective of configuration of the vehicles and capable of accurately determining a state of a switch with simple configuration.

SUMMARY OF THE INVENTION

It is an object of the present invention to at least solve the problems in the conventional technology.

According to an aspect of the present invention, a start control apparatus for providing start control of a vehicle in response to a signal received from a terminal for remote operations, or in the directive mode, includes a starter switch for controlling start of an engine; a relay for disconnecting power to the starter switch; a power circuit for independently supplying power to at least either one of an ignition switch for controlling ignition of the engine and an accessory switch controlling power supply to in-vehicle electric equipment; a starter switch welding detecting unit for detecting welding in the starter switch; and a switch control unit for disconnecting power to the starter switch by controlling the relay when welding in the starter switch is detected by the starter switch welding detecting unit.

According to another aspect of the present invention, a start control apparatus for providing start control of a vehicle in response to a signal received from a terminal for remote operations, or in the directive mode, includes a starter switch for controlling start of an engine; an accessory switch controlling power supply to in-vehicle electric equipment; a starter switch welding detecting unit for detecting welding in the starter switch; and a switch control unit for providing control for turning ON the accessory switch in succession to start of the engine after welding detection is carried out by the starter switch welding detecting unit.

The above start control unit further includes a relay for disconnecting power to the starter switch, wherein the switch control unit disconnects power to the starter switch, when welding in the starter switch is detected by the starter switch welding detecting unit, by controlling the relay, and providing control for turning ON the accessory switch.

According to still another aspect of the present invention, a start control apparatus for providing start control of a vehicle in response to a signal received from a terminal for remote operations, or in the directive mode, includes a starter switch for controlling start of an engine; an accessory switch controlling power supply to in-vehicle electric equipment; an accessory switch welding detecting unit for detecting welding in the accessory switch; and a switch control unit for providing control for turning OFF the starter switch when welding in the accessory switch is detected by the accessory switch welding detecting unit after the starter switch is turned ON.

According to still another aspect of the present invention a start control apparatus for providing start control of a vehicle in response to a signal received from a terminal for remote operations, or in the directive mode, includes a starter switch for controlling start of an engine; an accessory switch controlling power supply to in-vehicle electric equipment; an accessory switch welding detecting unit for detecting welding in the accessory switch; and a switch control unit for providing control for turning ON the starter switch after welding detection is carried out by the accessory switch welding detecting unit.

In the above start control apparatus, the switch control unit suppresses control for turning ON the starter switch when welding is detected by the accessory switch welding detecting unit.

In the above start control apparatus, the switch control unit provides control for turning ON the starter switch when the welding is detected and then is melted away.

According to still another aspect of the present invention, a start control apparatus for providing start control of a vehicle in response to a signal received from a terminal for remote operations, or in the directive mode, includes a starter switch for controlling start of an engine; an accessory switch controlling power supply to in-vehicle electric equipment; an accessory switch welding detecting unit for detecting welding in the accessory switch; and a switch control unit capable of switching a sequence of the control for turning ON the starter switch and detection of welding in the accessory switch.

In the above start control apparatus, the switch control unit can change a period of standby time from the control for turning OFF the accessory switch until detection of welding in the switch.

In the above start control apparatus, the sequence of the control for turning ON the starter switch and detection of welding in the accessory switch can be switched based on the standby time.

According to still another aspect of the present invention, a start control apparatus for providing start control of a vehicle in response to a signal received from a terminal for remote operations, or in the directive mode, includes a first switch control unit for outputting a control signal to a first starter switch or to a first ignition switch; a second switch control unit for outputting a control signal to a second starter switch or to a second ignition switch; a first monitoring unit for monitoring a state of a switch controlled by the first switch control unit; a second monitoring unit for monitoring a state of a switch controlled by the second switch control unit; and an auxiliary circuit for inputting a state of a switch other than that controlled by the second switch control unit to the second monitoring unit.

In the above start control apparatus, the first switch control unit outputs a control signal to the first starter switch, the second switch control unit outputs a control signal to the second starter switch, and the auxiliary control circuits inputs a state of the first starter switch to the second monitoring unit.

The above start control apparatus further includes a determining unit for determining a connection state of a switch based on a result of monitoring by the first monitoring unit and/or the second monitoring unit, wherein the determining unit can change timing for execution of the determination.

In the start control apparatus, the determining unit determines a connection state of a switch based on a result of monitoring by the second monitoring unit according either later one of the control timing for a switch inputted from the auxiliary circuit and the control timing by the second switch control unit.

In the above start control apparatus, the determining unit determines a state of a connection state of a switch based on a result of monitoring by the second monitoring unit according to the control timing for a switch inputted from the auxiliary switch.

The above start control apparatus includes the first starter switch and/or the first ignition switch provided therein, and further comprising an external connection terminal for connecting the switch controlled by the second switch control unit to the outside.

According to still another aspect of the present invention, a start control apparatus includes a first monitoring unit for monitoring a state of a first ignition line switch when providing start control; and a second monitoring unit for monitoring a second ignition line switch when providing start control, wherein the second monitoring unit monitors, when the second ignition line switch is not provided therein, a state of the first ignition line switch.

According to still another aspect of the present invention, a start control apparatus includes a first switch control unit for controlling the first ignition line switch when providing start control; a second switch control unit for controlling the second ignition line switch according to timing different from that for the first ignition line switch when providing start control; a first monitoring unit for monitoring the first ignition line switch; a second monitoring unit for monitoring a state of the second ignition line switch; a first determining unit for determining abnormality of the first ignition line switch based on a result of monitoring by the first monitoring unit after a state of the first ignition line switch is changed; and a second determining unit for determining abnormality of the second ignition line switch based on a result of monitoring by the second monitoring unit after a state of the second ignition line switch is changed. The timing for timing for starting determination of abnormality by the first determining unit after the state change of the first ignition line switch and the timing for starting determination of abnormality by the second determining unit after the state change of the second ignition line switch are set identically.

In the above start control apparatus, the second monitoring unit monitors a state of the first ignition line switch when the second ignition line switch is not provided therein.

According to still another aspect of the present invention, a start control apparatus includes a first switch control unit for outputting a control signal to the first ignition line switch when providing start control; a second switch control unit for outputting a control signal to the second ignition line switch according to the timing different from that for the first ignition line switch when providing start control; a first monitoring unit for receiving an output signal from the first ignition line switch and monitoring a state of the first ignition line switch; a second monitoring unit for receiving an output signal from the second ignition line switch and monitoring a state of the second ignition line switch; a first determining unit for outputting a control signal to the first ignition line switch and then starting determination of abnormality of the first ignition line switch according to first prespecified timing; and a second determining unit for outputting a control signal to the second ignition line switch and then starting determination of abnormality of the second ignition line switch according to second prespecified timing. The timing for starting determination of abnormality by the first determining unit and that for starting determination of abnormality by a switch inputted to the second monitoring unit determining unit are set identically.

According to still another aspect of the present invention, a start control apparatus includes a first switch control unit for outputting a control signal to the first ignition line switch when providing start control; a second switch control unit for outputting a control signal to the second ignition line switch according to the timing different from that for the first ignition line switch when proving start control; a first monitoring unit for receiving an output signal from the first ignition line switch and monitoring a state of the input signal; a second monitoring unit for receiving an output signal from the first ignition line switch or a an output signal from the second ignition line switch and monitoring a state of the inputted signal; a first determining unit for outputting a control signal to the first ignition line switch and then starting determination of abnormality of the first ignition line switch according to first prespecified timing; a second determining unit for outputting a control signal to the second ignition line switch and then starting determination of abnormality inputted to the second monitoring unit switch according to second prespecified timing; an input identifying unit for identifying a type of the ignition line switch inputted to the second monitoring unit based on a result of monitoring by the first monitoring unit and the second monitoring unit; and a determination timing changing unit for changing the timing for starting determination of abnormality by the second determining unit to that for starting determination of abnormality by the first determining unit when it is determined by the input identifying unit that the ignition line switch inputted to the second monitoring unit is the first ignition line switch.

According to still another aspect of the present invention, a start control method of providing start control of a vehicle in response to a signal received from a terminal for remote operations, or in the directive mode, includes detecting welding in the starter switch; and disconnecting power to the starter switch when welding in the starter switch is detected.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 31 is a flow chart of a process procedure for setting a delay time for performing the welding determination of the ACC;

FIG. 32 is a flow chart of a process procedure for setting an order of performing the welding determination of the ACC and the ST ON control;

FIG. 33 is a flow chart of a first time ACC ON control that uses a control mode flag for the ST ON control;

FIG. 34 is a flow chart of an ST ON control that uses the control mode flag for the ST ON control;

DETAILED DESCRIPTION OF THE PREFERRED EMBODIMENTS

First Embodiment

Figure 1:
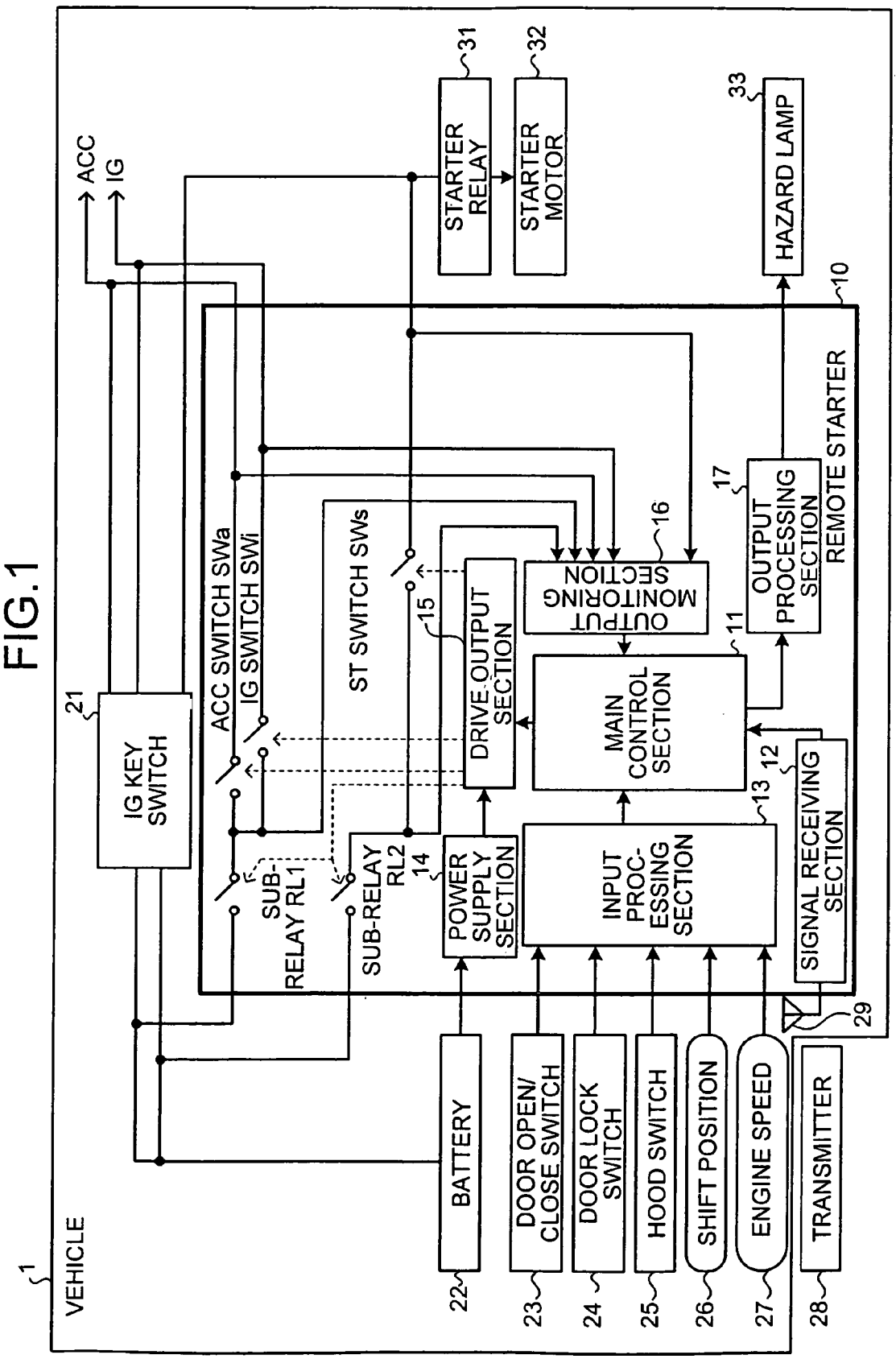
FIG. 1 is a block diagram of a remote starter according to an embodiment of the present invention.

FIG. 1 is a block diagram of a remote starter according to a first embodiment of the present invention. As shown in FIG. 1, a remote starter 10 is loaded in a vehicle 1. The remote starter 10 is connected to a battery 22, a door open/close switch 23, a door lock switch 24, a hood switch 25, an antenna 29, a starter relay 31, and a hazard lamp 33, and acquires data indicative of a shift position 26 and an engine speed 27.

The battery 22 is further connected to an ignition (IG) key switch 21. The starter relay 31 is connected to a starter motor 32.

A driver inserts an ignition key into the IG key switch 21 and manually operates the ignition key to turn ON the IG key switch 21. As a result, power supply to in-vehicle electric equipment (power supply to a path for an ACC shown in FIG. 1) and power supply to an ignition control device (power supply to a path for an IG in FIG. 1) is turned ON, and the engine (power supply to the starter relay in FIG. 1) of the vehicle starts.

The door open/close switch 23 is operated with opening/closing of a door of the vehicle. The door lock switch 24 is operated with locking/unlocking of the door of the vehicle. The hood switch 25 is operated with opening/closing of a hood of the vehicle.

The antenna 29 receives a signal from a transmitter 28. (for instance, a remote key) carried by the driver, and sends the received signal to the remote starter 10. The starter relay 31 is a control switch for making the starter motor 32 run when starting the engine. The hazard lamp 33 provides a visual alarm concerning behaviors of the vehicle to people and drivers of vehicles around the vehicle by simultaneously flickering direction indicators in the right and left sides of the vehicle, but is also used as a means for notifying a result of control for remote start to a driver of the vehicle in this embodiment.

The remote starter 10 includes a main control section 11, a signal receiving section 12, an input processing section 13, a power supply section 14, a drive output section 15, an output monitoring section 16, an output processing section 17, a sub-relay RL1, a sub-relay RL2, an accessory (ACC) switch SWa, an ignition (IG) switch SWi, and a starter (ST) switch SWs.

The accessory switch SWa, the ignition switch SWi, and the starter switch SWs respectively control power supply to the in-vehicle equipment (power supply to the path for the ACC in FIG. 1), power supply to the ignition control device (power supply to the path for the IG in FIG. 1), and start of the engine (power supply to the starter relay in FIG. 1). Namely, the remote starter 10 functions as an alternative to the IG key switch 21.

The sub-relay RL1 is a fail-safe mechanism for disconnecting power to both the accessory switch SWa and the ignition switch SWi. The sub-relay RL2 is a fail-safe mechanism for disconnecting power to the starter switch SWs.

The signal receiving section 12 sends the signal received by the antenna 29 to the main control section 11. The input processing section 13 outputs data indicative of states of the door open/close switch 23, the door lock switch 24, the hood switch 25, the shift position 26, and the engine speed 27 to the main control section 11.

The drive output section 15 controls turning ON or OFF the accessory switch SWa, the ignition switch SWi, the starter switch SWs, the sub-relay RL1, and the sub-relay RL2. The power supply section 14 acquires power necessary to operate the drive output section 15 from the battery 22, and supplies the power to the drive output section 15.

The output monitoring section 16 monitors the outputs of the sub-relays RL1 and RL2, the accessory switch SWa, the ignition switch SWi, the starter switch SWs, and sends the result of the monitoring to the main control section 11. The output processing section 17 controls the hazard lamp 33.

The main control section 11 provides control on all the sections and switches of the remote starter 10. The main control section 11 outputs signals to both the drive output section 15 and the output processing section 17 based on the signals received from the signal receiving section 12, the input processing section 13, and the output monitoring section 16.

More specifically, the main control section 11 executes start control by controlling the accessory switch SWa, the ignition switch SWi, and the starter switch SWs when the signal receiving section 12 receives an instruction for starting the engine via the transmitter 28. However, the main control section 11 does not execute the start control if it receives a signal from the input processing section 13 indicating that the door is in open state, the door is in unlocked state, the hood is in opened state and the like. Moreover, the main control section 11 does not execute the start control if the shift position 26 indicates that the vehicle is in a place other than a parking lot.

The engine speed 27 is used to determine whether the engine has been started with the operation of the starter switch SWs. The engine speed 27 can also be used to determine whether the engine has become sufficiently warm. The result of such determination is useful when stopping the engine after warming up when the engine is started with a remote operation.

Figure 2:
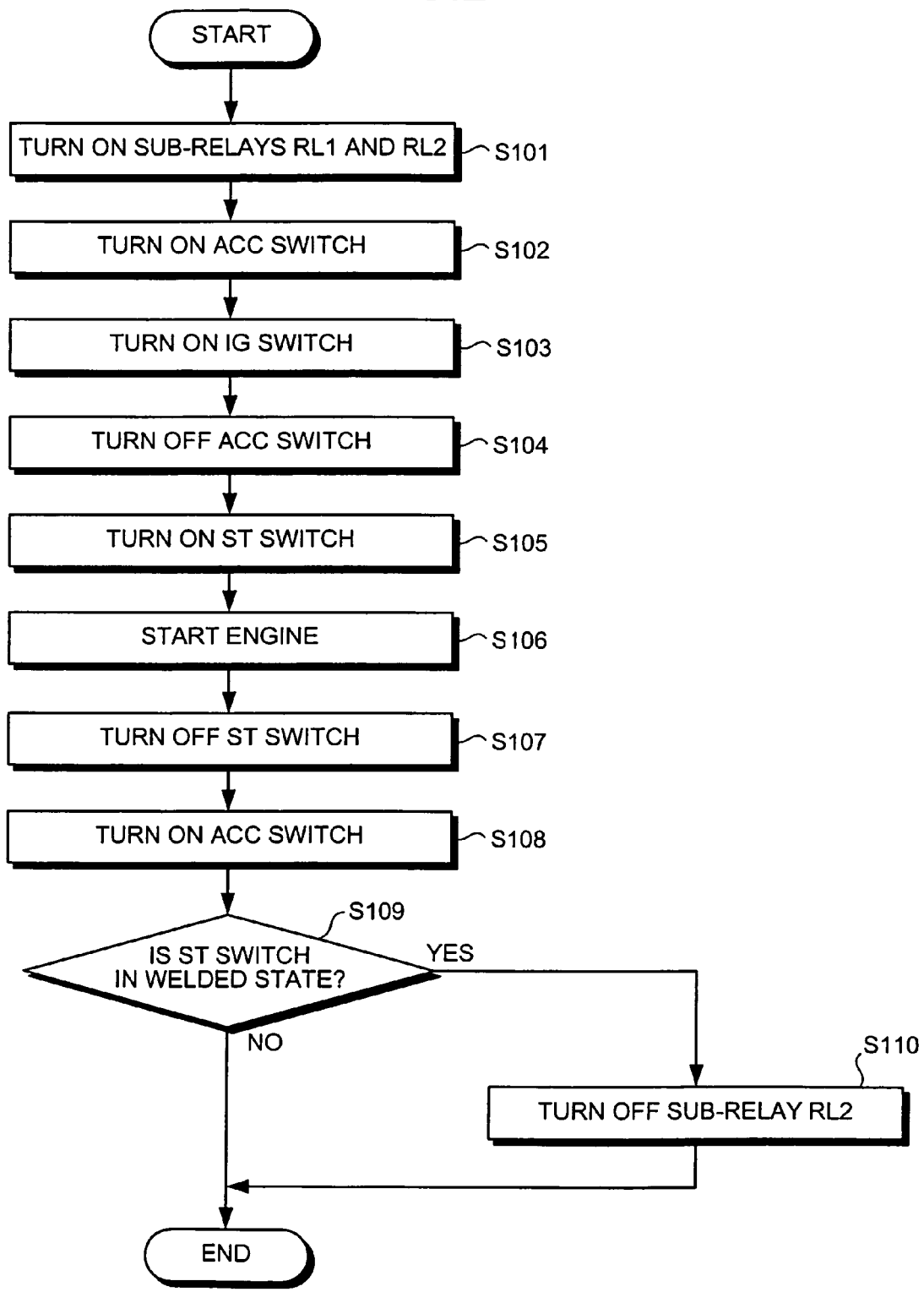
FIG. 2 is a flow chart of operations performed by a main control section shown in FIG. 1.

Operations of the main control section 11 are described in detail below. FIG. 2 is a flow chart of a start processing performed by the main control section 11. is the start processing is started when the signal receiving section 12 receives a remote control start instruction to start the engine via the transmitter 28.

In the start processing, the main control section 11 first turns ON the sub-relays RL1 and RL2 (step S101). Then, the main control section 11 sequentially turns ON the accessory switch SWa (step S102) and the ignition switch SWi (step S103).

Then, the main control section 11 turns OFF the accessory switch SWa (step S104), and turns ON the starter switch SWs (step S105). The accessory switch SWa is turned OFF to prevent the accessory switch SWa and starter switch SWs from being turned ON simultaneously to prevent the power supply to the in-vehicle electric equipment becoming unstable.

The engine starts as a result of turning ON of the starter switch SWs (step S106). Then, the main control section 11 turns OFF the starter switch SWs (step S107), and turns ON the accessory switch SWa (step S108).

Then, the main control section 11 determines whether the starter switch SWs is in welded state (step S109). When it is determined that the starter switch SWs is in welded state (step S109, yes), the main control section 11 turns OFF the sub-relay RL2 (step S110) to disconnect power to the starter switch SWs, and terminates the start processing. On the other hand, when it is determined that the starter switch SWs is not in welded state (step 109, No), the main control section 11 terminates the start processing.

Thus, if the sub-relay RL2 is disconnected when the starter switch SWs is in welded state, the sub-relay RL1 is kept ON, so that power supply to the accessory switch SWa and the ignition switch SWi connected to the sub-relay RL1 is continued. As a result, the ordinary control can be continued.

Figure 3:
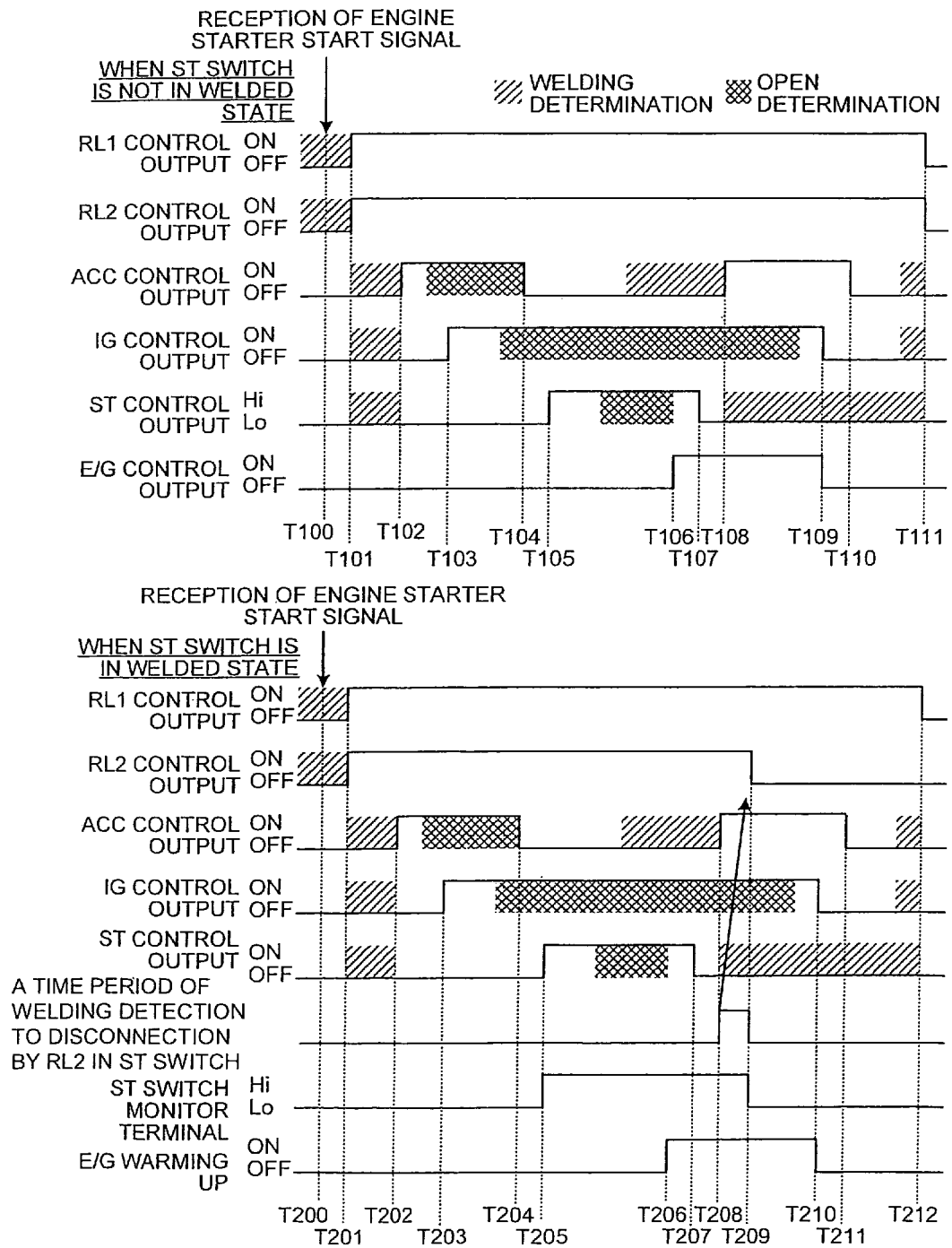
FIG. 3 is a schematic for explaining control output and the state of each switch in the processing shown in FIG. 2.

FIG. 3 is a schematic for explaining control output and the state of each switch in the processing shown in FIG. 2. More specifically, in FIG. 3, the top schematic represents a case in which the starter switch SWs is not in a welded state, and the bottom schematic represents a case in which the starter switch SWs is in a welded state.

At first the case in which the starter switch SWs is not in a welded state is explained below. When the remote control start instruction (i.e., an engine starter start signal) is received at a time point T100, the welding determination process is performed with respect to the sub-relays RL1 and RL2. If it is determined that the sub-relays RL1 and RL2 are not in a welded state, both the sub-relays RL1 and RL2 are turned ON (time point T101).

Then, the welding determination process is performed with respect to the accessory switch SWa, the ignition switch SWi, and the starter switch SWs. The accessory switch SWa is turned ON at a time point T102, and whether the accessory switch SWa has correctly been turned ON is determined (i.e., the open determination process is performed with respect to the accessory switch SWa). Then, the ignition switch SWi is turned ON at a time point T103, and the open determination process is performed with respect to the ignition switch SWi.

Then, the accessory switch SWa is turned OFF at a time point T104, and the welding determination process is performed with respect to the accessory switch SWa. At a time point T105, the starter switch SWs is turned ON, and the open determination process is performed with respect to the starter switch SWs.

As the starter switch SWs is turned ON, the engine starts at a time point T106, and warming up of the engine begins. The starter switch SWs is turned OFF at a time point T107, and the welding determination process is performed with respect to the starter switch SWs. At a time point T108, the accessory switch SWa is turned ON.

Because the starter switch SWs is not in a welded state, the accessory switch SWa, the ignition switch SWi, and the starter switch SWs allow ordinary controls. In FIG. 3, the ignition switch SWi is turned OFF when the engine has sufficiently warmed up (time point T109). Moreover, the accessory switch SWa is turned OFF at a time point T110, and the sub-relays RL1 and RL2 are turned OFF at a time point T111.

The case in which the starter switch SWs is in a welded state is now explained below. The process executed from a time point T200 until a time point T208 are the same as those executed at the time points T100 to T108. The starter switch SWs is turned ON at a time point T205. As a result, the voltage at a starter switch monitor terminal monitored by the output monitoring section 16 changes from a low logical level to a high logical level at the time point T205.

If the starter switch SWs is not in a welded state, the voltage at the starter switch monitor terminal changes from the high logical level to the low logical level at the time point T207 when the starter switch SWs is turned OFF. However, as the voltage at the starter switch monitor terminal is maintained at the high logical level even at the time point T207 and on. As a result, the main control section 11 determines that the starter switch SWs is not in a welded state at a time point T208, and turns OFF the sub-relay RL2 at a time point T209.

When the sub-relay RL2 is turned OFF, power to the starter switch SWs is cut off at the time point T209, and the voltage at the starter switch monitor terminal changes from the high logical level to the low logical level.

Subsequently, the accessory switch SWa and the ignition switch SWi are controlled in usual manner. In FIG. 3, when the engine has sufficiently warmed up (time point T210), the ignition switch SWi is turned OFF. Moreover, the accessory switch SWa is turned OFF at a time point T211, and the sub-relay RL1 is turned OFF at a time point T212.

As described above, when welding occurs in the starter switch SWs, the sub-relay RL2 is quickly turned OFF, so that a period of time during which both the accessory switch SWa and the starter switch SWs are simultaneously ON (i.e., between the time points T208 and T209) is short.

The accessory switch SWa and the ignition switch SWi can be controlled in a usual manner even if welding has occurred in the starter switch SWs. Moreover, excessive rotation of the starter motor 32 (the state in which rotation of the starter motor is continued even after start of the engine) can be evaded.

It has been explained above in connection to FIGS. 2 and 3 that the accessory switch SWa is turned ON after the starter switch SWs is turned OFF, and the sub-relay RL2 is disconnected if the starter switch SWs is in a welded state. However, if the welding determination is performed with respect to the starter switch SWs after the starter switch SWs is turned OFF, and then turning ON the accessory switch SWa, it is possible to prevent, without fail, the starter switch SWs and the accessory switch SWa from being simultaneously turned ON.

Figure 4:
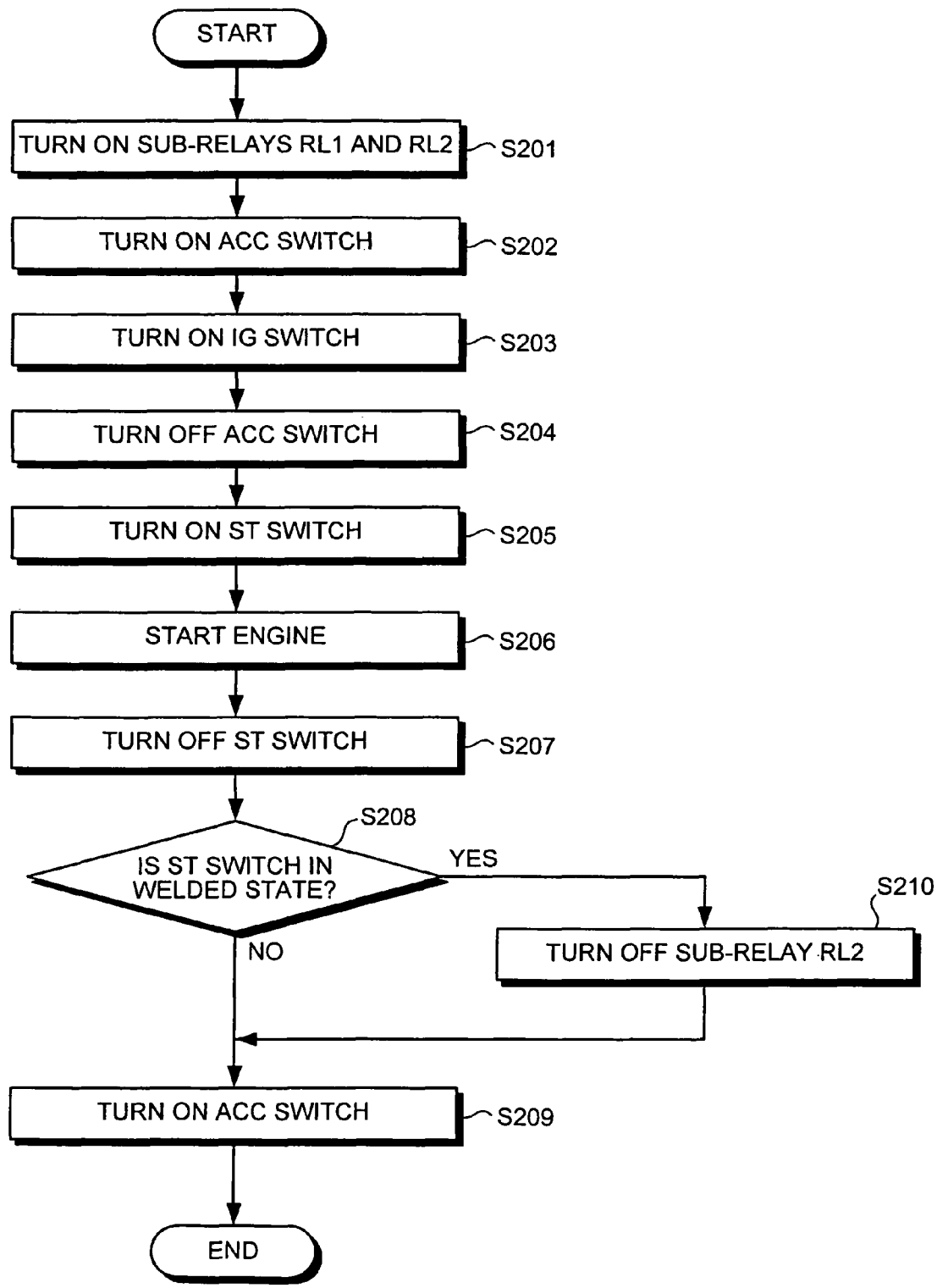
FIG. 4 is a flow chart of an accessory switch ON control after performing the welding determination of a starter switch.

FIG. 4 is a flow chart of the operations performed by the main control section 11 when the accessory switch SWa is turned ON after performing the welding determination with respect to the starter switch SWs. The operations in steps S201 to S207 are the same as those in the steps S101 to S107 shown in FIG. 2, therefore, there explanation will be omitted. In other words, step S208 and on will only be explained below.

After the starter switch SWs is turned OFF (step S207), the main control section 11 performs the welding determination with respect to the starter switch SWs (step S208). If it is determined that the starter switch SWs is not in a welded state (step S208, No), the main control section 11 turns ON the accessory switch SWa (step S209).

On the other hand, if it is determined that the starter switch SWs is in welded state (step S208, Yes), the main control section 11 turns OFF the sub-relay RL2 to disconnect power to the starter switch SWs (step S210), and then turns ON the accessory switch SWa (step S209).

Then, after the accessory switch SWa is turned ON (step S209), the main control section 11 terminates the start processing, and then performs usual control.

Figure 5:
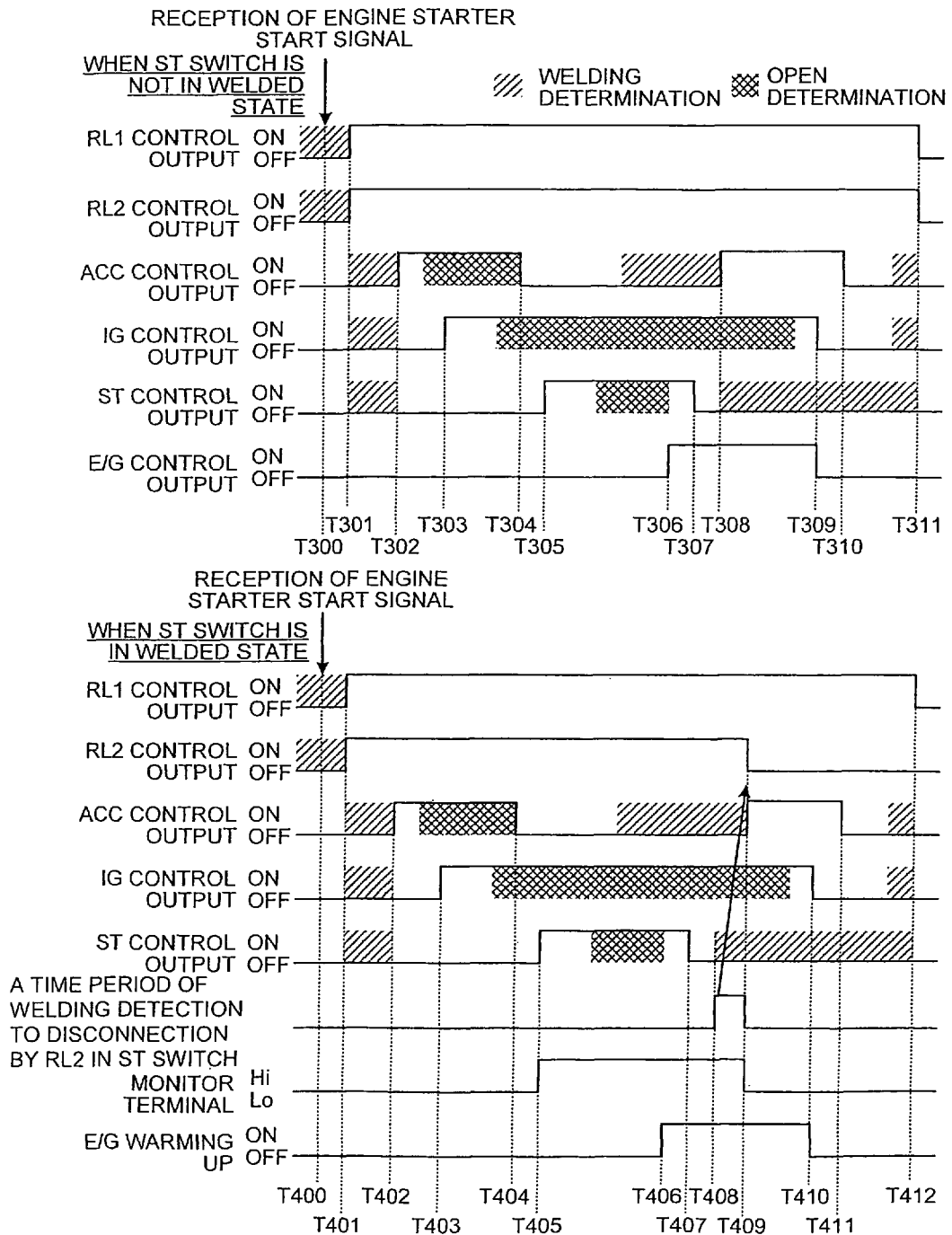
FIG. 5 is a schematic for explaining control output and the state of each switch during the processing shown in FIG. 4.

FIG. 5 is a schematic for explaining control output and the state of each switch in the processing shown in FIG. 4. More specifically, in FIG. 5, the top schematic represents a case in which the starter switch SWs is not in a welded state, and the bottom schematic represents a case in which the starter switch SWs is in a welded state.

At first the case in which the starter switch SWs is not in a welded state is explained below. The process executed from a time point T300 until a time point T307 are the same as those executed at the time points T100 to T107 shown in FIG. 3. At the time point T307, the starter switch SWs is turned OFF, and then a result of the welding determination with respect to the starter switch SWs is waited. When it is determined that welding has not occurred in the starter switch SWs, the accessory switch SWa is turned ON at a time point T308.

The subsequent controls are ordinary ones. Specifically, the ignition switch SWi is turned OFF when the engine has sufficiently warmed up (time point T309). Moreover, the accessory switch SWa is turned OFF at a time point T310, and the sub-relays RL1 and RL2 are turned OFF at a time point T311.

The case in which the starter switch SWs is in a welded state is now explained below. The process executed from a time point T400 until a time point T407 are the same as those executed at the time points T300 to T307. The starter switch SWs is turned ON at the time point T405. As a result, the voltage at the starter switch monitor terminal monitored by the output monitoring section 16 changes from a low logical level to a high logical level at the time point T405.

If the starter switch SWs is not in a welded state, the voltage at the starter switch monitor terminal changes from the high logical level to the low logical level at the time point T407 when the starter switch SWs is turned OFF. However, as the voltage at the starter switch monitor terminal is maintained at the high logical level even at the time point T407 and on. As a result, the main control section 11 determines that the starter switch SWs is not in a welded state at a time point T408, and turns OFF the sub-relay RL2 at a time point T409.

When the sub-relay RL2 is turned OFF, power to the starter switch SWs is cut off at the time point T409, and the voltage at the starter switch monitor terminal changes from the high logical level to the low logical level.

With turning OFF of the starter switch SWs at the time point T409, the accessory switch SWa is turned ON.

Subsequently, the accessory switch SWa and the ignition switch SWi are controlled in usual manner. In other words, when the engine has sufficiently warmed up (time point T410), the ignition switch SWi is turned OFF. Moreover, the accessory switch SWa is turned OFF at a time point T411, and the sub-relay RL1 is turned OFF at a time point T412.

As described above, the accessory switch SWa can be turned ON after determining whether the starter switch SWs is in welded state. Though it takes longer time from when the starter switch SWs is turned OFF until when the accessory switch SWa is turned ON, it is possible to prevent without fail that the starter switch SWs and accessory switch SWa are simultaneously turned ON.

The case in which the starter switch SWs is in a welded state is now explained below. When the starter switch SWs is to be turned ON, simultaneous turning ON of the starter switch SWs and accessory switch SWa can be prevented by turning the accessory switch SWa OFF before turning the starter switch SWs ON. When welding occurs in the accessory switch SWa, because the accessory switch SWa is ON even after the main control section 11 turns it OFF, it can happen that the starter switch SWs and the accessory switch SWa are simultaneously ON.

Figure 6:
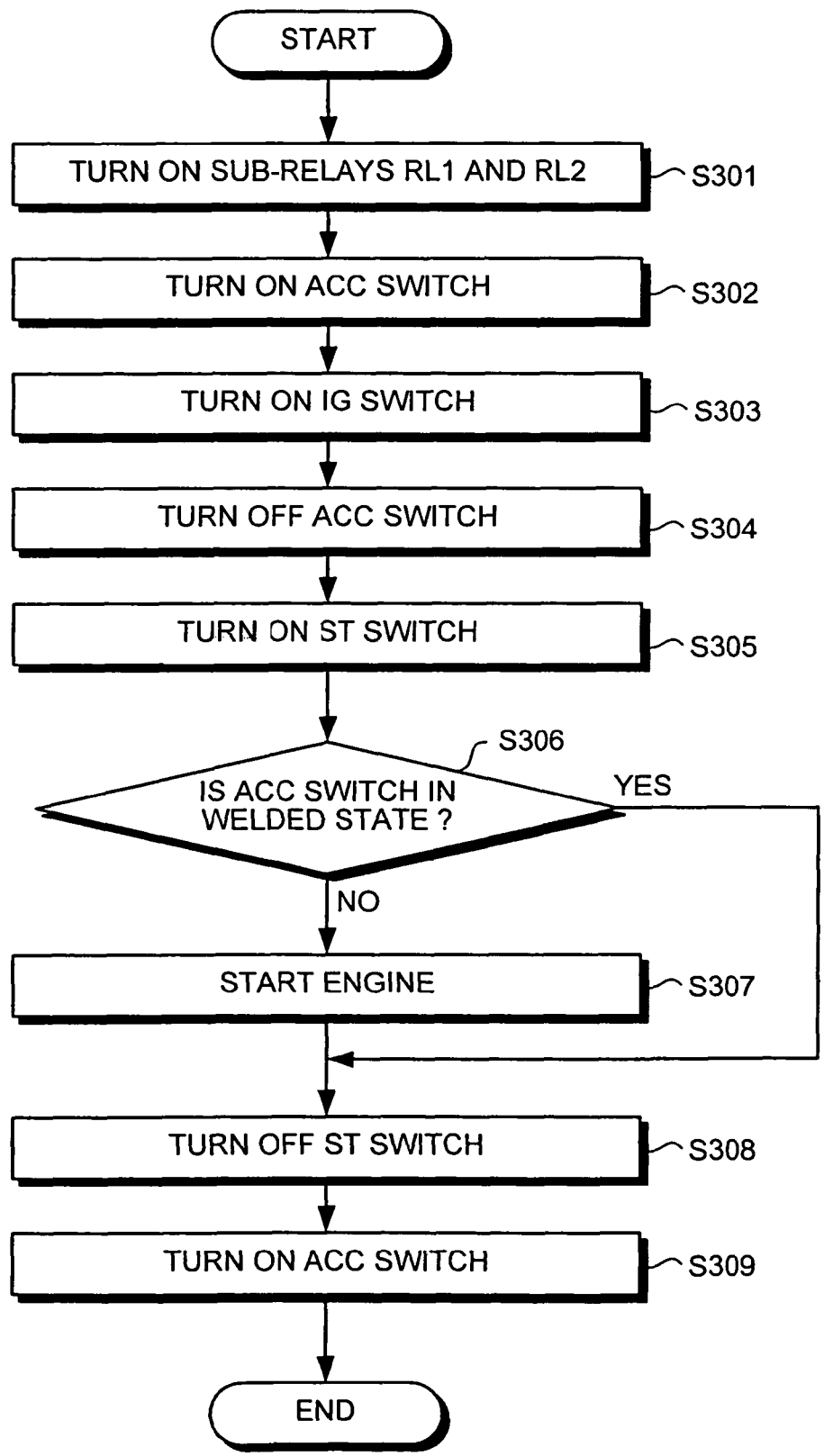
FIG. 6 is a flow chart of a process procedure for performing welding determination for an accessory switch and control of the starter switch.

To avoid this problem, a configuration is preferable in which when the main control section 11 determines that the accessory switch SWa is in a welded state, the main control section 11 immediately turns the starter switch SWs OFF. This process is described with reference to a flow chart in FIG. 6.

The operations in steps S301 to S305 are the same as those in the steps S101 to S105 shown in FIG. 2, therefore, there explanation will be omitted. In other words, step S306 and on will only be explained below.

After the starter switch SWs is turned ON (step S305), the main control section 11 performs the welding determination with respect to the accessory switch SWa (step S306). If it is determined that the accessory switch SWa is in welded state (step S306, Yes), the main control section 11 immediately turns OFF the starter switch SWs (step S308).

On the other hand, if it is determined that the accessory switch SWa is not in a welded state (step S306, No), the main control section 11 starts the engine (step S307) and then turns OFF the starter switch SWs (step S308).

Then, the main control section 11 turns ON the accessory switch SWa (step S309) and terminates the start processing, and then provides ordinary controls.

Figure 7:
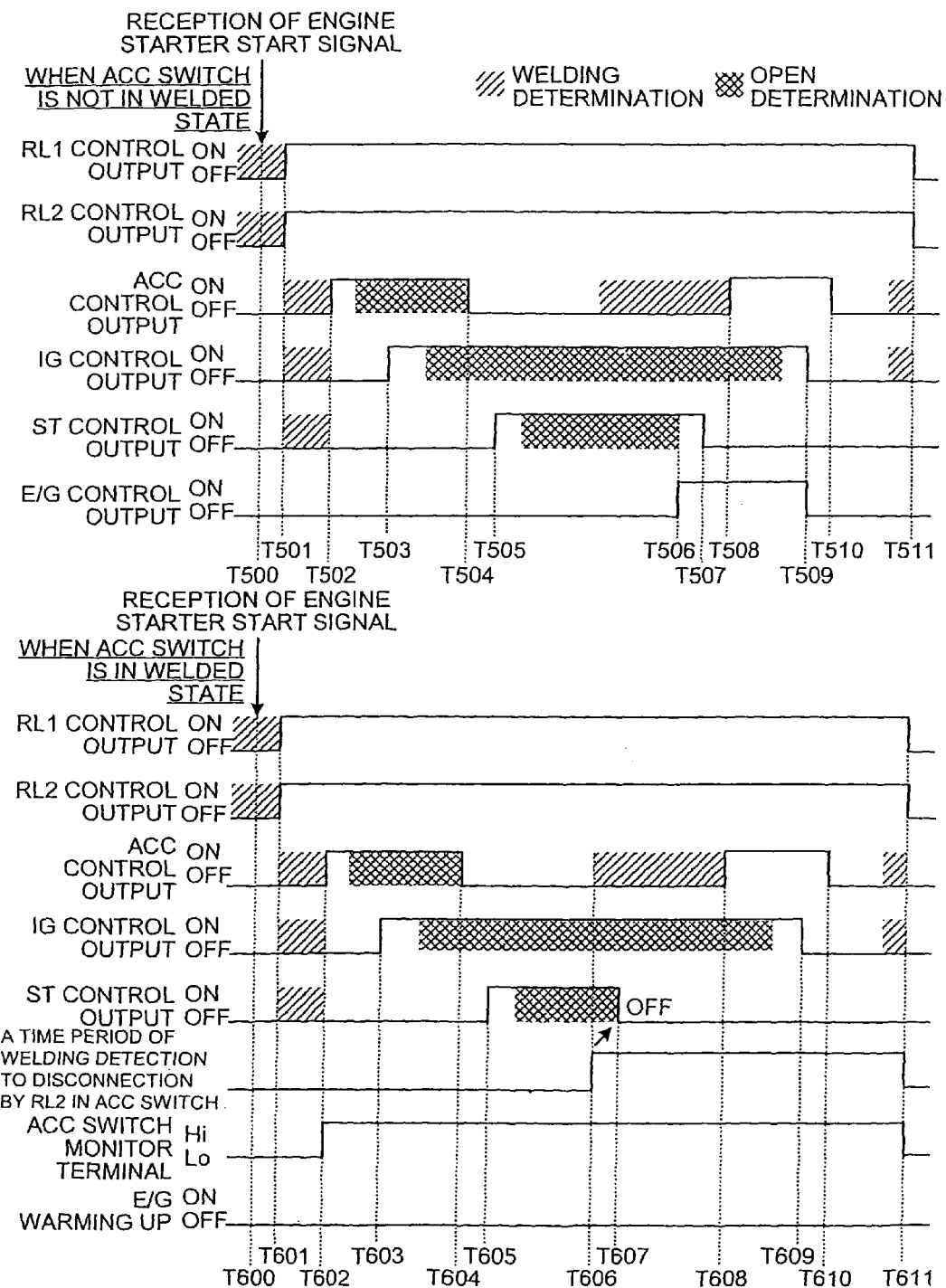
FIG. 7 is a schematic for explaining control output and the state of each switch during the processing shown in FIG. 6.

FIG. 7 is a schematic for explaining control output and the state of each switch in the processing shown in FIG. 5. More specifically, in FIG. 7, the top schematic represents a case in which the accessory switch SWa is not in a welded state, and the bottom schematic represents a case in which the accessory switch SWa is in a welded state.

At first the case in which the accessory switch SWa is not in a welded state is explained below. The process executed from a time point T500 until a time point T505 are the same as those executed at the time points T100 to T105 shown in FIG. 3. At the time point T505, the starter switch SWs is turned ON, and then it is determined whether the accessory switch SWa is in a welded state. Because the accessory switch SWa is not in a welded state, the starter switch SWs maintained ON until the engine starts (at a time point T506).

The starter switch SWs is then turned OFF at a time point T507, and then the accessory switch SWa is turned ON at a time point T508. The subsequent controls are the same as those performed usually. In other words, the ignition switch SWi is turned OFF when the engine has sufficiently warmed up (time point T509). Furthermore, the accessory switch SWa is turned OFF at a time point T510, and the sub-relays RL1 and RL2 are turned OFF at a time point T511.

The case in which the accessory switch SWa is in a welded state is now explained below. The process executed from a time point T600 until a time point T605 are the same as those executed at the time points T500 to T505. Because the accessory switch SWa has been turned ON at the time point T602, the voltage at the accessory switch monitor terminal obtained by the output monitoring section 16 changes from a low logical level to a high logical level at the time point T602.

If the accessory switch SWa is not in a welded state, the voltage at the accessory switch monitor terminal changes the high logical level to the low logical level at the time point T604 when the accessory switch SWa is turned OFF. However, the voltage at the accessory switch monitor terminal is maintained at the high logical level even at the time point T604 and on. As a result, the main control section 11 determines that welding has occurred in the accessory switch SWa at a time point T606, and turns OFF the starter switch SWs at a time point T607. Thus, the engine is not started and remains OFF.

Subsequently, the accessory switch SWa and ignition switch SWi are controlled in usual manner. In other words, the accessory switch SWa is turned ON at a time point T608, while the ignition switch SWi is turned OFF at a time point T609. Moreover, the accessory switch SWa is turned OFF at a time point T610, while the sub-relays RL1 and RL2 are turned OFF at a time point T611.

As described above, when welding occurs in the accessory switch SWa, the starter switch SWs is immediately turned OFF, so that a period of time when the accessory switch SWa and starter switch SWs are simultaneously turned ON (from the time point T605 until the time point T607) can be made shorter.

It has been explained above in connection to FIGS. 6 and 7 that the starter switch SWs is turned ON after the accessory switch SWa is turned OFF, and if the accessory switch SWa is in a welded state, the starter switch SWs is cut off. However, if the welding determination is performed with respect to the accessory switch SWa after the accessory switch SWa is turned OFF, and then turning On the starter switch SWs, it is possible to prevent, without fail, the starter switch SWs and the accessory switch SWa from being simultaneously turned ON.

Figure 8:
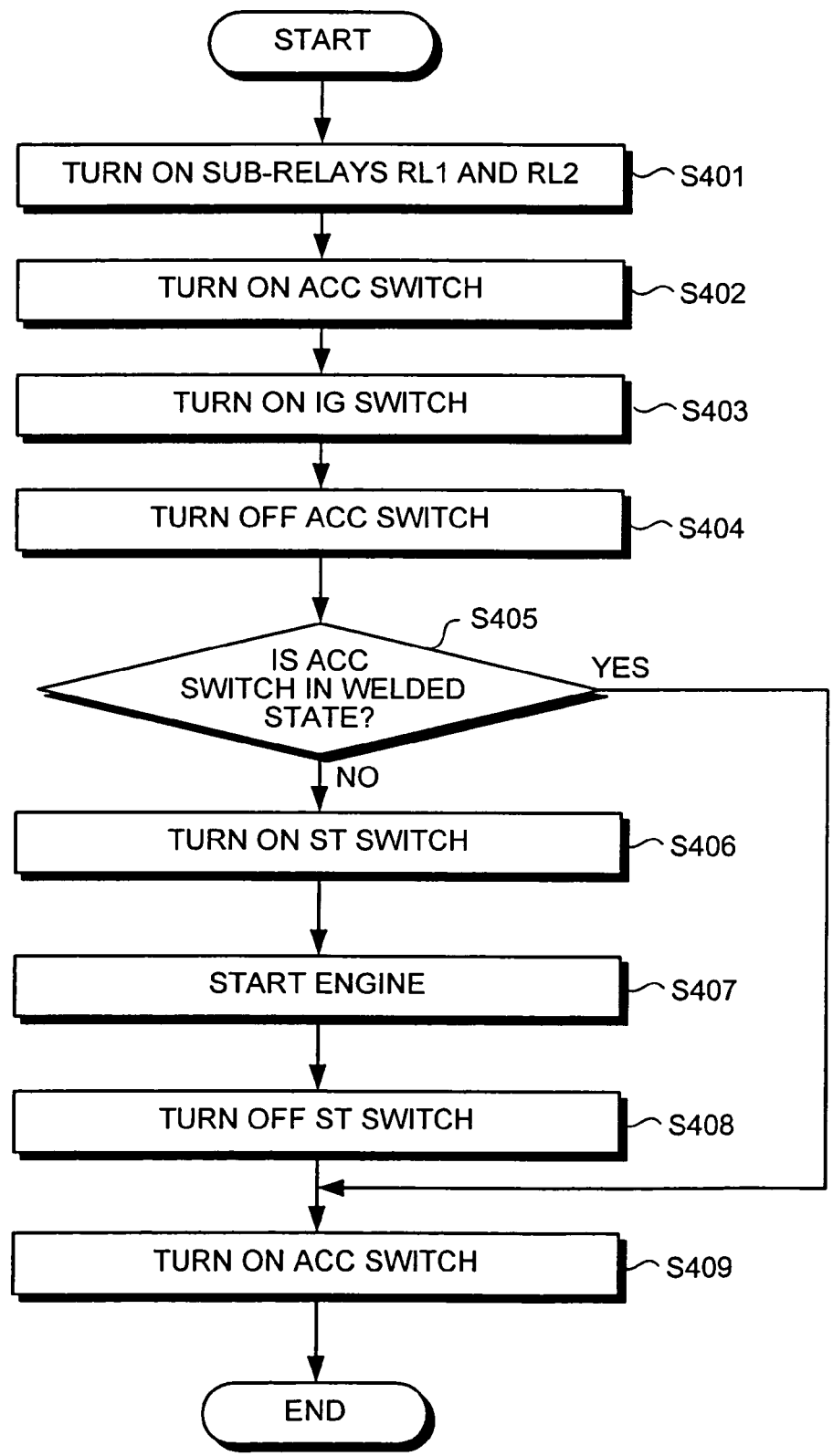
FIG. 8 is a flow chart of a process procedure for turning ON the starter switch after performing welding determination for an accessory switch.

Processing operations of the main control section 11 are shown in FIG. 8 in a case where the starter switch SWs is turned ON after it is determined whether the accessory switch SWa is in a welded state. The operations in steps S401 to S404 are the same as those in the steps S301 to S304 shown in FIG. 6, and therefore descriptions thereof are omitted herein, and operations executed in and after step S405 are described below.

After the accessory switch SWa is turned OFF (step S404), the main control section 11 determines whether the accessory switch SWa is in welded state (step S405). As a result, when it is determined that the accessory switch SWa is not in a welded state (step S405, No), the main control section 11 turns ON the starter switch SWs (step S406), starts the engine (step S407), and then turns OFF the starter switch SWs (step S408).

Then, after the starter switch SWs is turned OFF (step S408), or when the accessory switch SWa is in a welded state (step S405, Yes), the main control section 11 turns ON the accessory switch SWa (step S409), terminates the start processing, and then provides ordinary controls.

Figure 9:
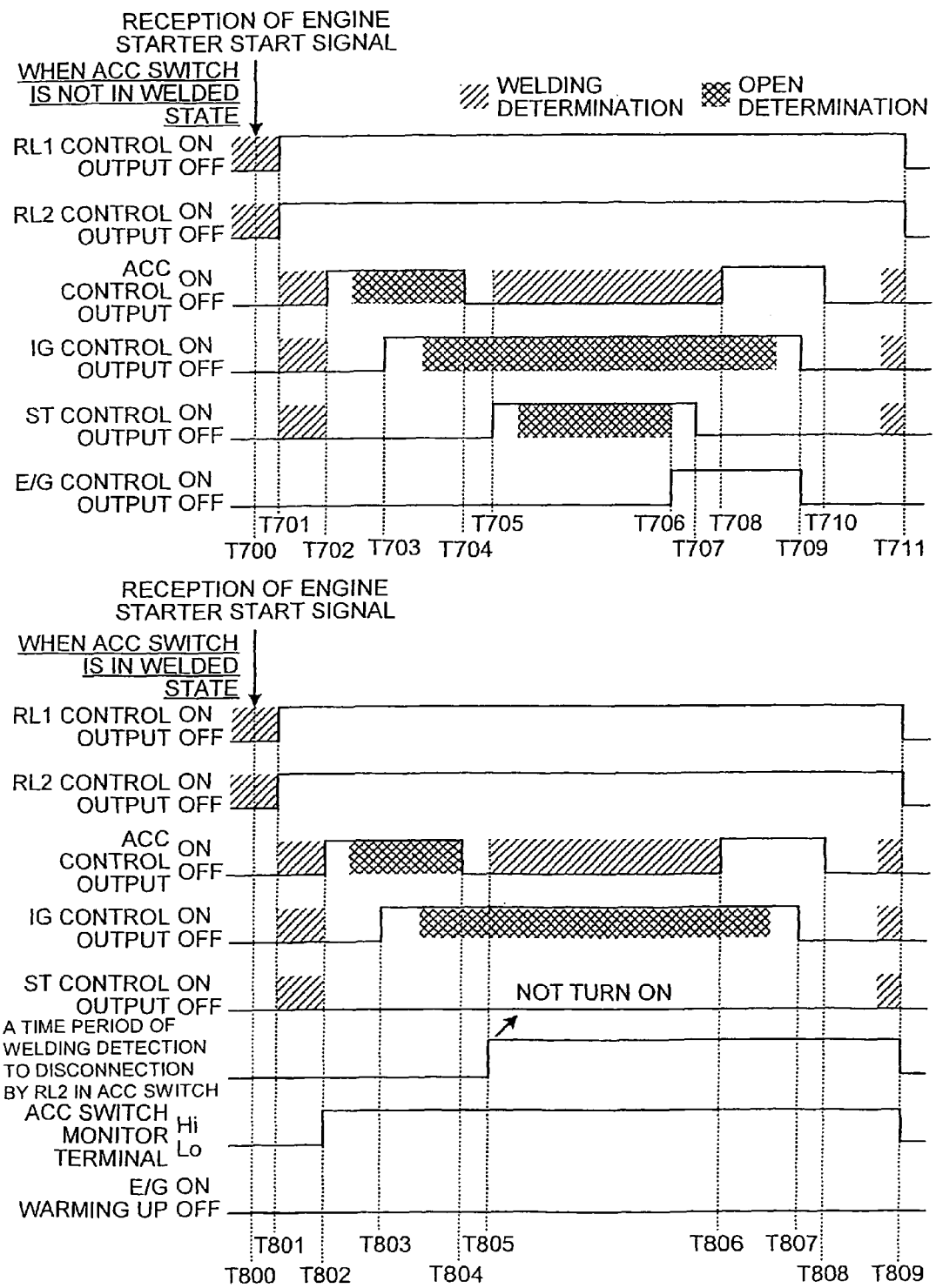
FIG. 9 is a schematic for explaining control output and the state of each switch during the processing shown in FIG. 8.

Next, control output to each switch and a state of each switch through the processing shown in FIG. 8 are described below with reference to FIG. 9. FIG. 9 illustrates both the processing executed when the accessory switch SWa is not in a welded state and the processing executed when the accessory switch SWa is in a welded state.

At first the processing executed when the accessory switch SWa is not in a welded state is described below. The processing steps executed at time points T700 to T704 are the same as those executed at the time points T500 to T504 shown in FIG. 7. At the time point T704, the accessory switch SWa is turned OFF, and then the main control section 11 determines whether the accessory switch SWa is in a welded state, and because welding is not detected in the accessory switch SWa, the main control section 11 turns ON the starter switch SWs at a time point T705.

With this control, the engine starts at a time point T706, and the main control section 11 turns OFF the starter switch SWs at a time point T707. Then the accessory switch SWa is turned ON at a time point T708. The subsequent controls are ordinary ones, and in the figure, the ignition switch SWi is turned OFF when warming up of the engine is finished (at a time point T709). Further the accessory switch SWa is turned OFF at a time point T710, and the sub-relay RL1 and sub-relay RL2 are turned OFF at a time point T711.

Next the processing executed when the accessory switch SWa is in a welded state is described below. Processing steps executed from a time point T800 until a time point T804 are the same as those executed at the time points T700 to T704, and the accessory switch SWa is turned ON at a time point T802, so that the voltage at the accessory switch monitor terminal obtained y the output monitoring section 16 changes from a low logical level to a high logical level at a time point T802.

If the accessory switch SWa is not is a welded state, the voltage at the accessory switch monitor terminal should change from High to Low at a time point T804 when the accessory switch SWa is turned OFF. The voltage at the accessory switch monitor terminal, however, still remains High at and after the time point T804, so that the main control section 11 determines at a time point T805 that welding has occurred in the accessory switch SWa, and does not turn ON the starter switch SWs. It is to be noted that, however, when welding is eliminated and the accessory switch SWa is turned OFF after welding occurred in the accessory switch SWa, the main control section 11 turns ON the starter switch SWs.

Subsequently, the accessory switch SWa and ignition switch SWi are provided with ordinary controls. In the figure, the accessory switch SWa is turned ON at a time point T806, and the ignition switch SWi is turned OFF at a time point T807. In addition, the accessory switch SWa is turned OFF at a time point T808, and the sub-relay RL1 and sub-relay RL2 are turned OFF at a time point T809.

As described above, when the configuration is employed in which whether the starter switch SWs is turned ON is determined based on welding determination for the accessory switch SWa, though it may take longer from the time when the accessory switch SWa is turned OFF until the time when the starter switch SWs is turned ON, it is possible to prevent without fail that the starter switch SWs and accessory switch SWa are simultaneously turned ON.

If the period between the time when the accessory switch SWa is turned OFF and the time when welding is determined in the accessory switch SWa is made shorter, the period between the time when the accessory switch SWa is turned OFF and the time when the starter switch SWs is turned ON can be made shorter.

The period from the time when the accessory switch SWa is turned OFF until the time when power is dropped to the ground depends on capacity of a capacitor for in-vehicle electric equipment connected to the ACC line. Thus, when a standby time until the determination of welding is set to be excessively short, there is the possibility that residual electric charge in the ACC line are erroneously detected as welding in the accessory switch SWa.

Figure 10:
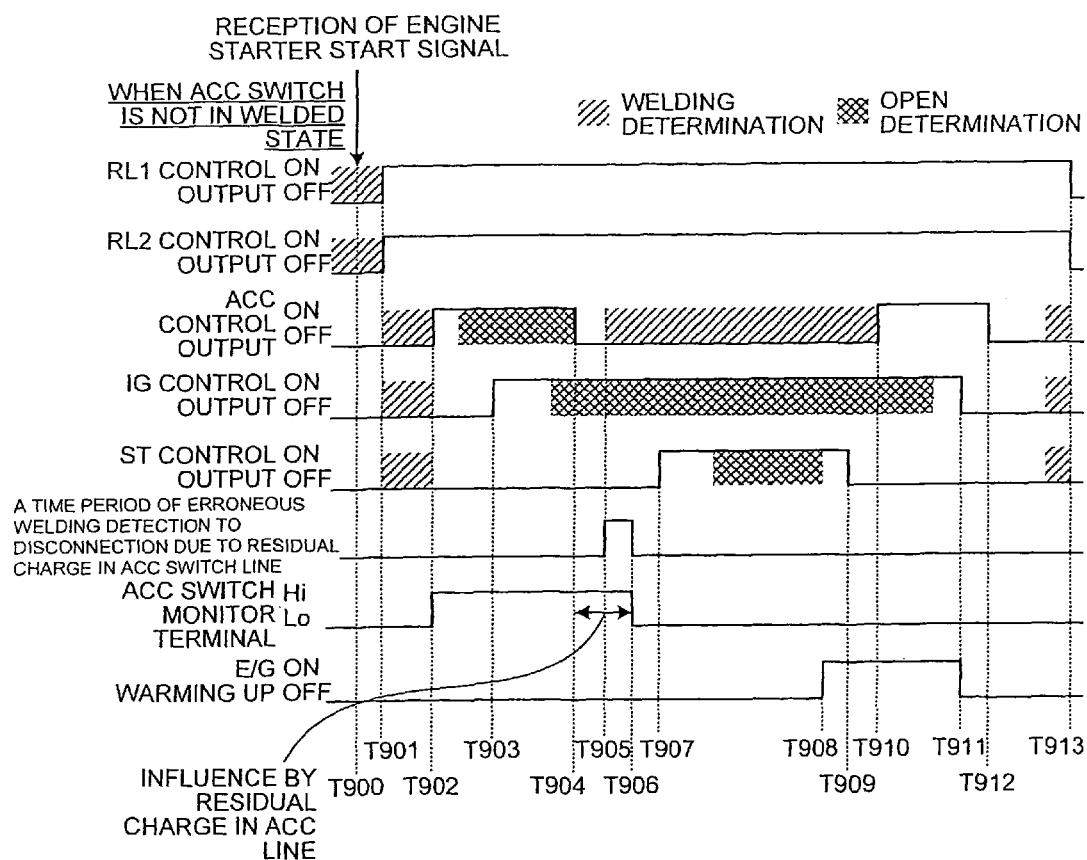
FIG. 10 is a schematic for explaining erroneous detection due to residual electric charge in an accessory switch (ACC) line.

A specific example of the erroneous detection described above is shown in FIG. 10. At first, processing steps executed at time points T900 to T904 are the same as those executed at the time points T700 to T704, and the accessory switch SWa is turned ON at the time point T902, so that the voltage at the accessory switch monitor terminal obtained by the output monitoring section 16 changes from Low to High at the time point T902.

The accessory switch SWa is then turned OFF at the time point T904, however, due to the influence of residual electric charge in the ACC line, it is at a time point T906 when the voltage at the accessory switch monitor terminal changes from High to Low. Therefore, when it is determined at a time point T905 whether the accessory switch SWa is in a welded state, it is determined that the accessory switch SWa is in a welded state between the time point T905 and the time point T906.

In order to prevent such an erroneous determination, the standby time until the welding determination for the accessory switch SWa is preferably set according to the state of connection of in-vehicle electric equipment in relation to the ACC line. Additionally, in-vehicle electric equipment can be added or removed after a sale of a vehicle, so that the main control section 11 can discretionarily change the setting of the standby time until the welding determination for the accessory switch SWa.

Further, relationship of which is before and which is after between the welding determination for the accessory switch SWa and the turning-ON control for the starter switch SWs can also be discretionarily selected. Namely, the main control section 11 can switch controls between that in which the starter switch SWs is turned ON before the welding determination for the accessory switch SWa (shown in FIGS. 6 and 7) and that in which the starter switch SWs is turned ON after welding determination for the accessory switch SWa (shown in FIGS. 8 and 9).

Herein, in selecting either one of the controls, time sequential order between the welding determination and the turning-ON control may be directly set, or may be automatically selected based on the length of a standby time. When the control described above is automatically selected based on the length of a standby time, for instance, by comparing the standby time and a prespecified threshold value, if the standby time is not less than the threshold value, the starter switch SWs may be turned ON before determining welding in the accessory switch SWa, while in turn, if the standby time is less than the threshold value, the starter switch SWs may be turned ON after determining welding in the accessory switch SWa.

Next, configuration of the present invention is described below. With the configuration shown in FIG. 1, ACC (accessory), IG (ignition), and ST (starter) includes one line each, but a plurality of lines of IGs or STs may be included depending on the configuration of the vehicle. If the configuration includes a plurality of ST lines, the lines may be divided to those for supplying power to a starter relay 31 to actually drive an engine and to those for controlling other devices.

In the configuration in FIG. 1, the starter switch SWs is connected to the sub-relay RL2 to failsafe the ACC and the ST independently, but what influences voltage supplied to the ACC is the power supply to the starter relay 31, and therefore, when a plurality of ST lines are present in a vehicle, only a line used for actually starting the engine may be enough to be isolated from the ACC line.

Figure 11:
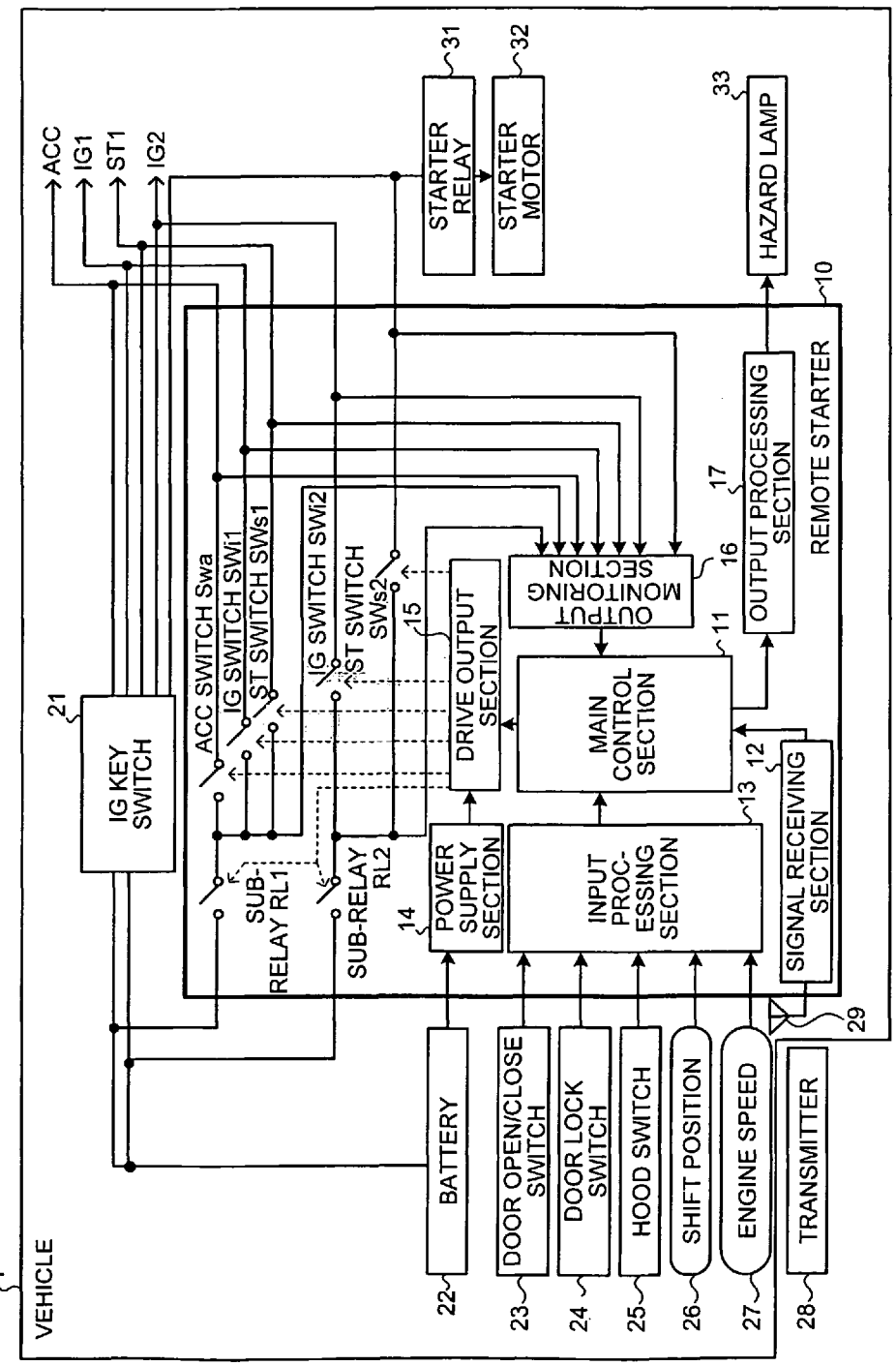
FIG. 11 is a block diagram (1) of a configuration that includes a plurality of starter (ST) lines and ignition (IG) lines.
Figure 12:
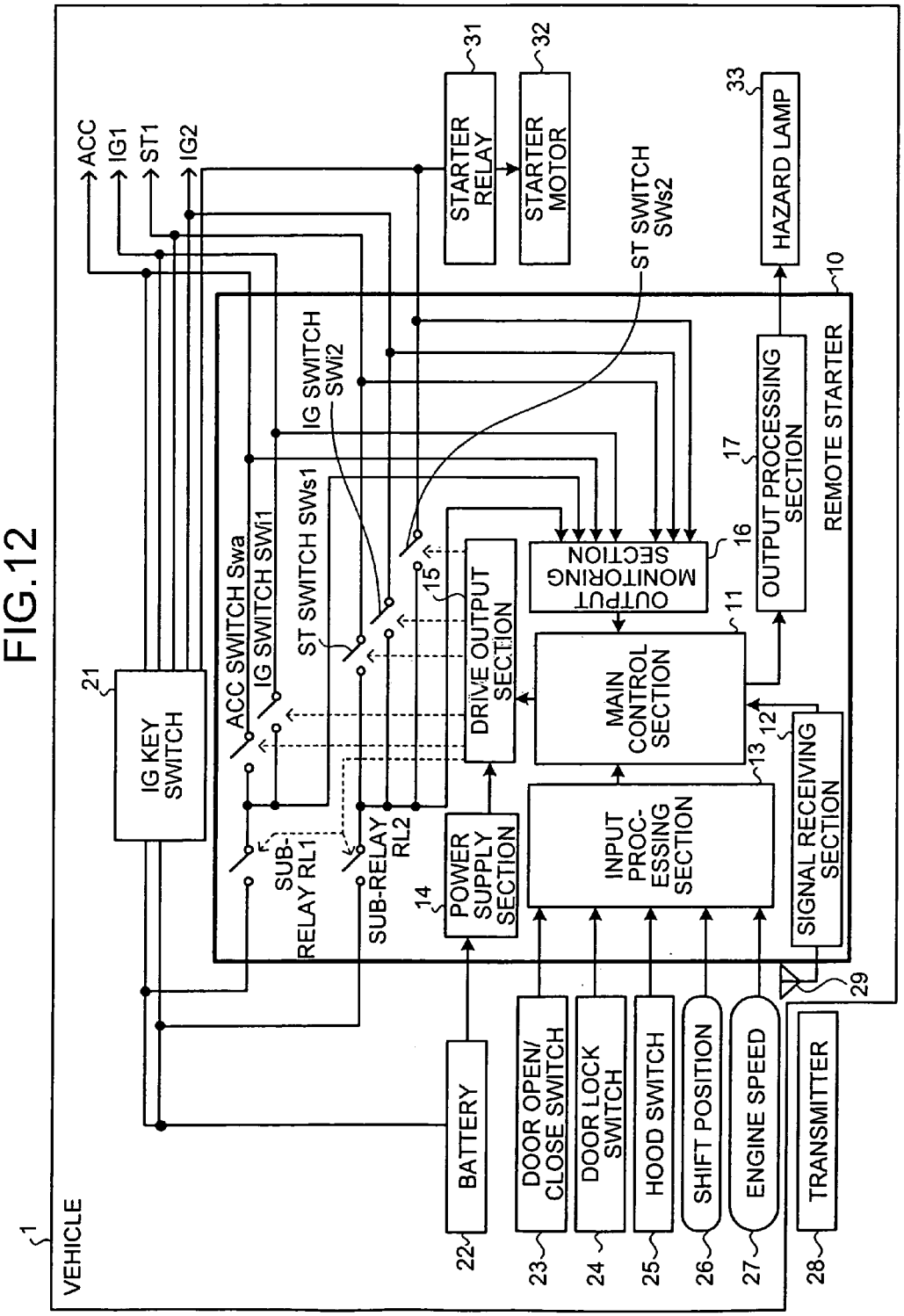
FIG. 12 is a block diagram (2) of a configuration that includes a plurality of starter (ST) lines and ignition (IG) lines.

An example of configuration of a remote starter when including the plurality of ST lines is shown in FIGS. 11 and 12. In the configuration shown in FIG. 11, the sub-relay RL1 is connected to the accessory switch SWa, the ignition switch SWi1 and the starter switch SWs1, while the sub-relay RL2 is connected to the ignition switch SWi2 and the starter switch SWs2. With this configuration, control of the line for actually starting the engine is provided by the starter switch SWs2, and control of the line for controlling is provided by the starter switch SWs1.

In the configuration shown in FIG. 12, the sub-relay RL1 is connected to the accessory switch SWa and ignition switch SWi1, and the sub-relay RL2 is connected to the starter switch SWs1, ignition switch SWi2, and starter switch SWs2.

Thus, by isolating the line for supplying power to the starter relay 31 and actually starting the engine from the ACC line, the present invention can be applied even to the configuration requiring a plurality of IG lines or ST lines.

Figure 13:
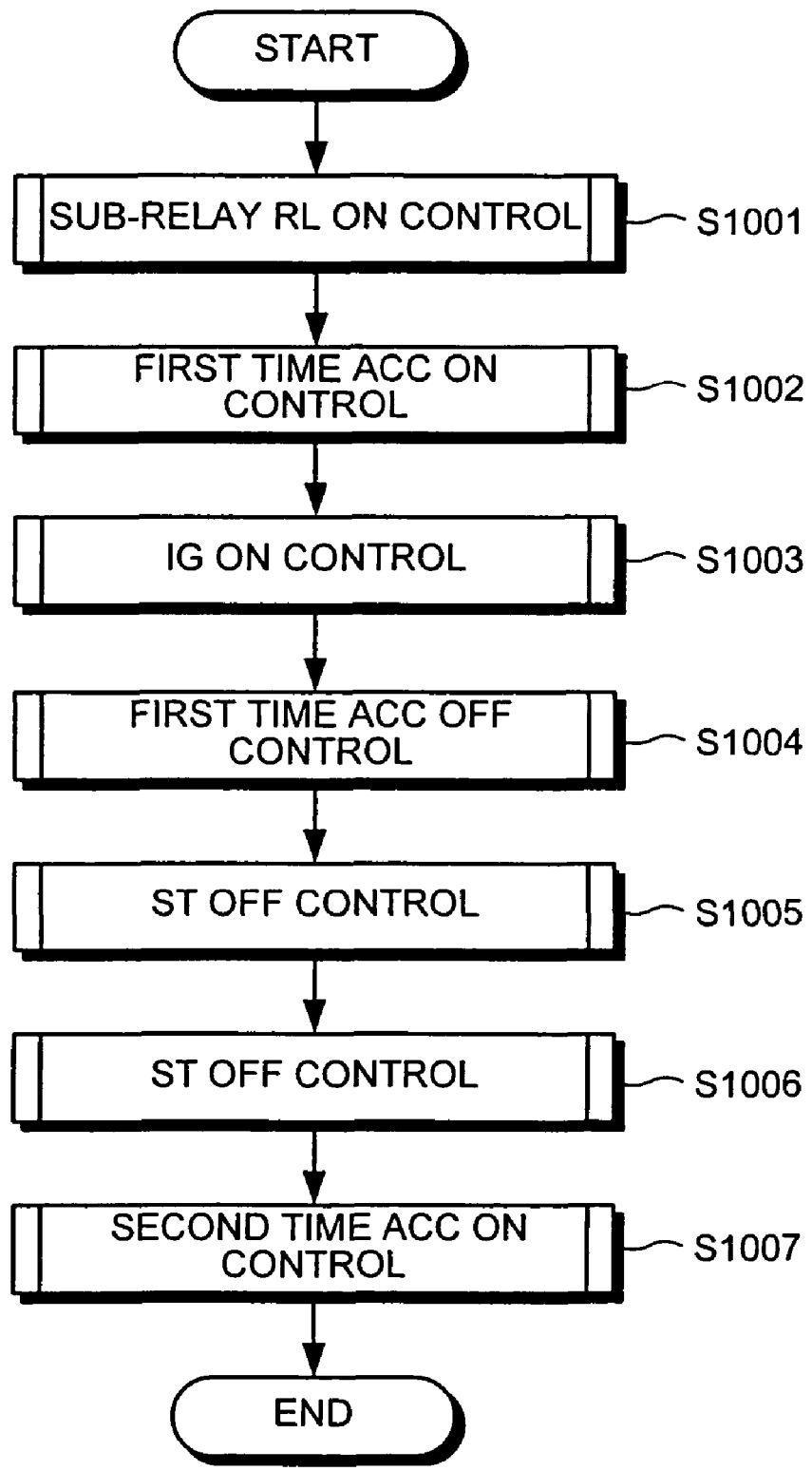
FIG. 13 is a flow chart of a process procedure of remote start control.

Next, processing operation of the remote starter 10 is described below. FIG. 13 is a flow chart for illustrating processes to be executed when the remote starter 10 receives an instruction for remote start from the transmitter 28. The processing flow shown in FIG. 13 is executed repeatedly during start control by the remote starter 10.

As shown in FIG. 13, when the remote starter 10 receives an instruction for remote start, a sub-relay RL ON control of turning ON the sub-relays RL1 and RL2 is performed (step S1001). Then, a first time ACC ON control (step S1002) and an IG ON control (step S1003) are executed.

After a first time ACC OFF control (step S1004) is executed, an ST ON control (step S1005) is executed. Further, after an ST OFF control (starter switch SWs) (step S1006) is executed, a second time ACC ON control (step S1007) is executed, and the processing is terminated.

Next, each process illustrated in FIG. 13 is described in detail below. Details of each process are different depending on which processing procedure to be employed from the following options: after the ACC line is turned ON, the sub-relay RL2 is turned OFF when the ST line is in a welded state (processing described with reference to FIGS. 2 and 3), when the ST line is in a welded state, the ACC line is turned ON after the sub-relay RL2 is turned OFF (processing described with reference to FIGS. 4 and 5), when the ACC line is in a welded state, the ST line is turned OFF (processing described with reference to FIGS. 6 and 7), or when the ACC line is in a welded state, the control for turning ON the ST line is inhibited (processing described with reference to FIGS. 8 and 9).

Figure 14:
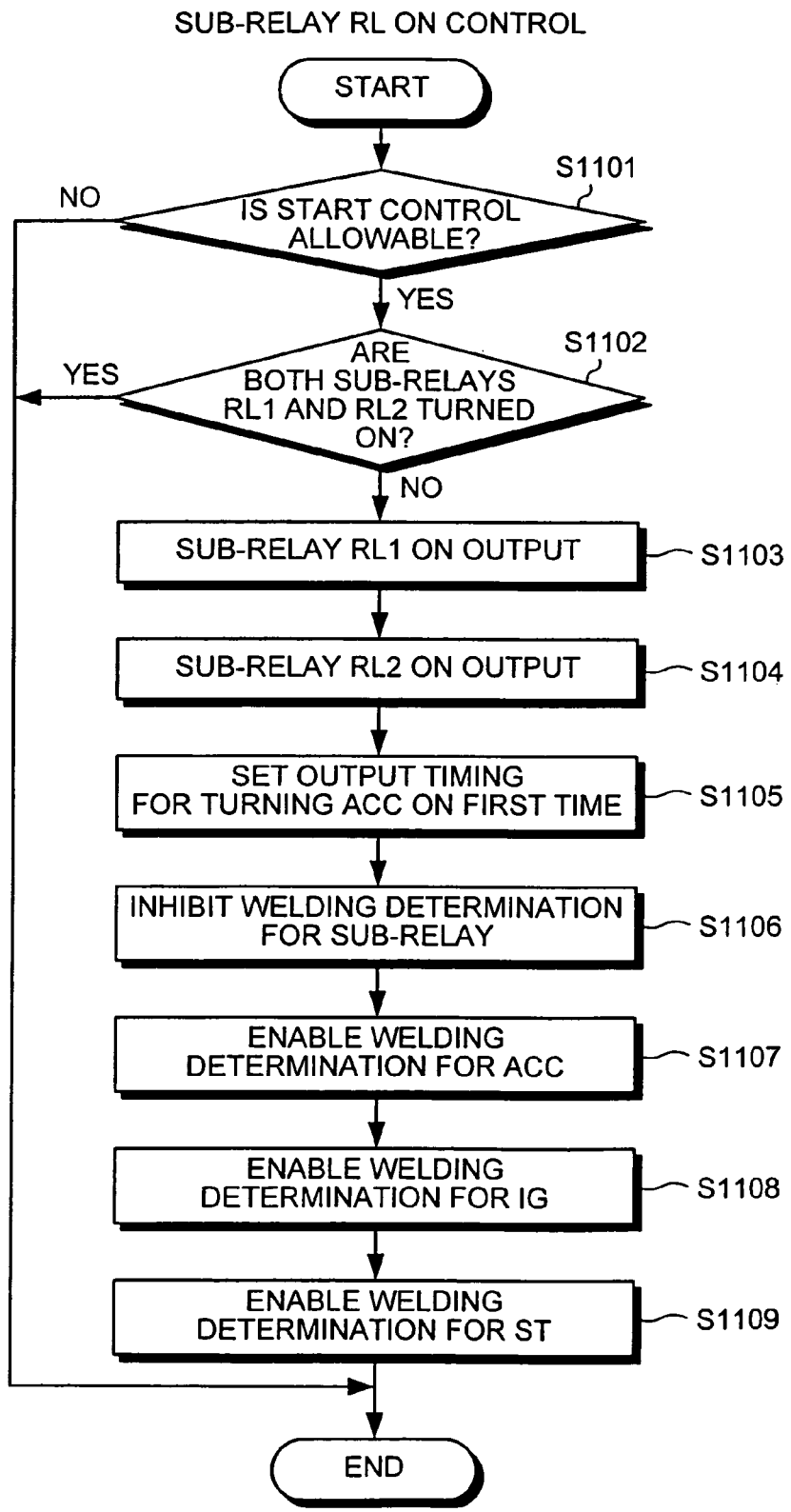
FIG. 14 is a flow chart of a sub-relay RL ON control shown in FIG. 13.

First of all, details of each process are described in the case where the procedure of after the ACC line is turned ON, the sub-relay RL2 is turned OFF when the ST line is in a welded state is employed, with reference to the flow chart in FIG. 14. In the processing flow, at the beginning, the remote starter 10 determines whether start control is allowable (step S1101).

When the start control is allowable (step S1101, Yes), it is determined whether both the sub-relays RL1 and RL2 are ON (step S1102).

When the sub-relays RL1 and RL2 are not ON (step S1102, No), the drive output section 15 turns ON the sub-relay RL1 (step S1103) and turns ON the sub-relay RL2 (step S1104).

Then, the control timing for turning ON the ACC first time (step S1002 in FIG. 13) is set (step S1105) and welding determination for the sub-relays RL1 and RL2 is inhibited (step S1106).

In addition, welding determination for the ACC line (accessory switch SWa) is enabled (step S1107), welding determination for the IG line (ignition switch SWi) is enabled (step S1108), and welding determination for the ST line (starter switch SWs) is enabled (step S1109).

After the step S1109 is finished, or when the start control is not allowable (step S1101, No), or when the sub-relays RL1 and RL2 are ON (step S1102, Yes), the remote starter 10 terminates the processing for turning ON the sub-relays RL and shifts to the control for turning ON the ACC line first time shown as step S1002 in FIG. 13.

Figure 15:
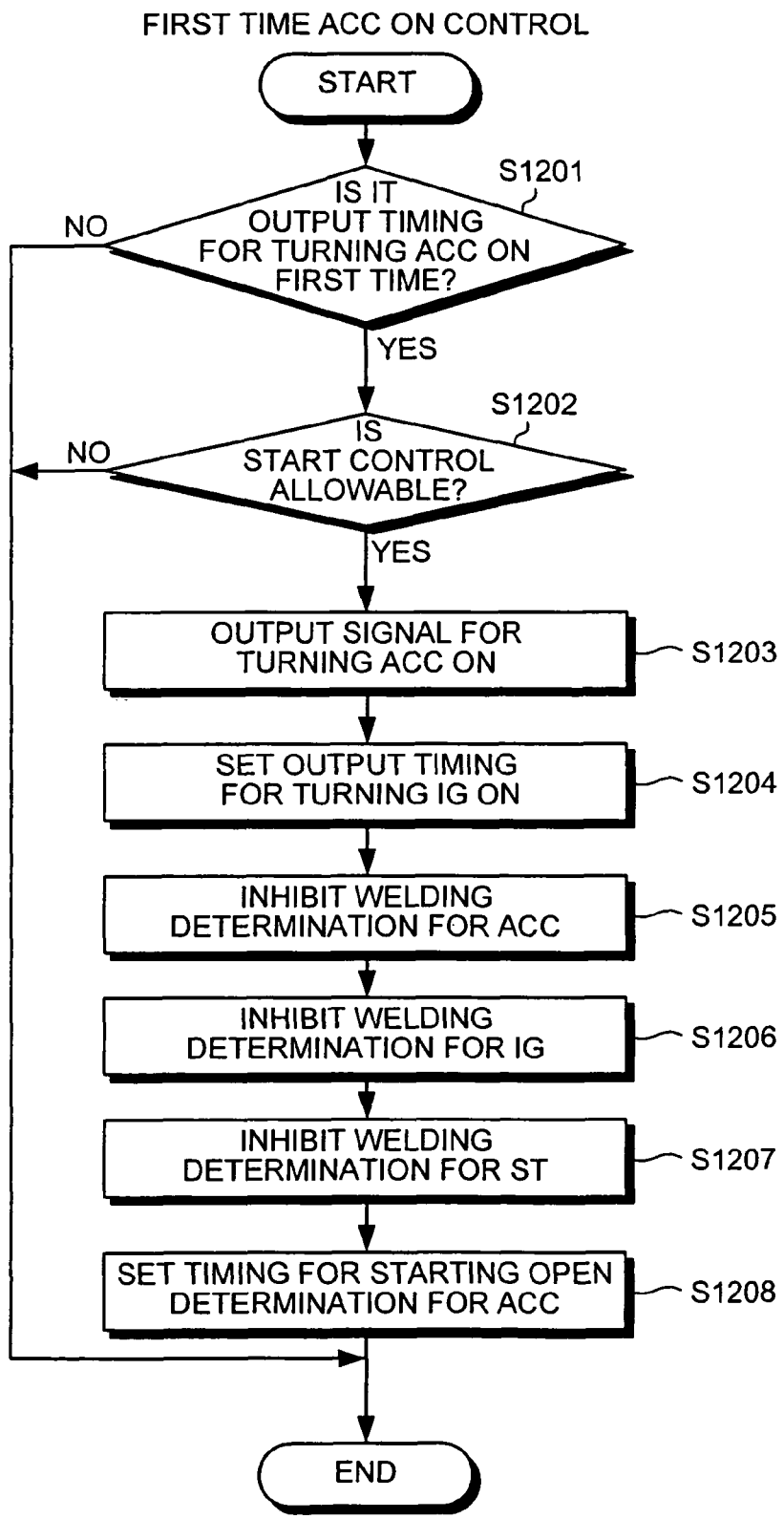
FIG. 15 is a flow chart of an accessory (ACC) line first time ON control shown in FIG. 13.

FIG. 15 is a flow chart for illustrating details of the processing during the control for turning ON the ACC line first time shown as step S1002 in FIG. 13. In this processing flow, at the beginning, the remote starter 10 determines whether the current point of time is timing for turning ON the ACC line first time (step S1201).

When it is determined that the current point of time is the timing for turning ON the ACC line first time (step S1201, Yes), then the remote starter 10 determines whether the start control is allowable (step S1202).

When the start control is allowable (step S1202, Yes), the drive output section 15 turns ON the ACC switch SWa to output a signal for turning ON the ACC line (step S1203).

In the next step, control timing for turning ON the IG line (step S1003 in FIG. 13) is set (step S1204), and the welding determination for the ACC line is inhibited (step S1205). Similarly, welding determination for the IG line is inhibited (step S1206) and also welding determination for the ST line is inhibited (step S1207).

After that, the remote starter 10 sets the timing for starting open determination for the ACC line (step S1208). The timing for starting the determination is set in consideration to chattering caused by change in switching. Specifically, it is advantageous to set the timing approximately 50 milliseconds to 100 milliseconds later than the control for turning ON the ACC line in step S1203. In the following description, it is assumed that the timing for starting the determination is set in consideration to chattering as described above.

After the step S1208 is finished, or when it is determined that the current point of time is not the timing for turning ON the ACC first time (step S1201, No), or when the start control is not allowable (step S1202, No), the remote starter 10 terminates the control for turning ON the ACC line first time and shifts to the control for turning ON the IG line shown as step S1003 in FIG. 13.

Figure 16:
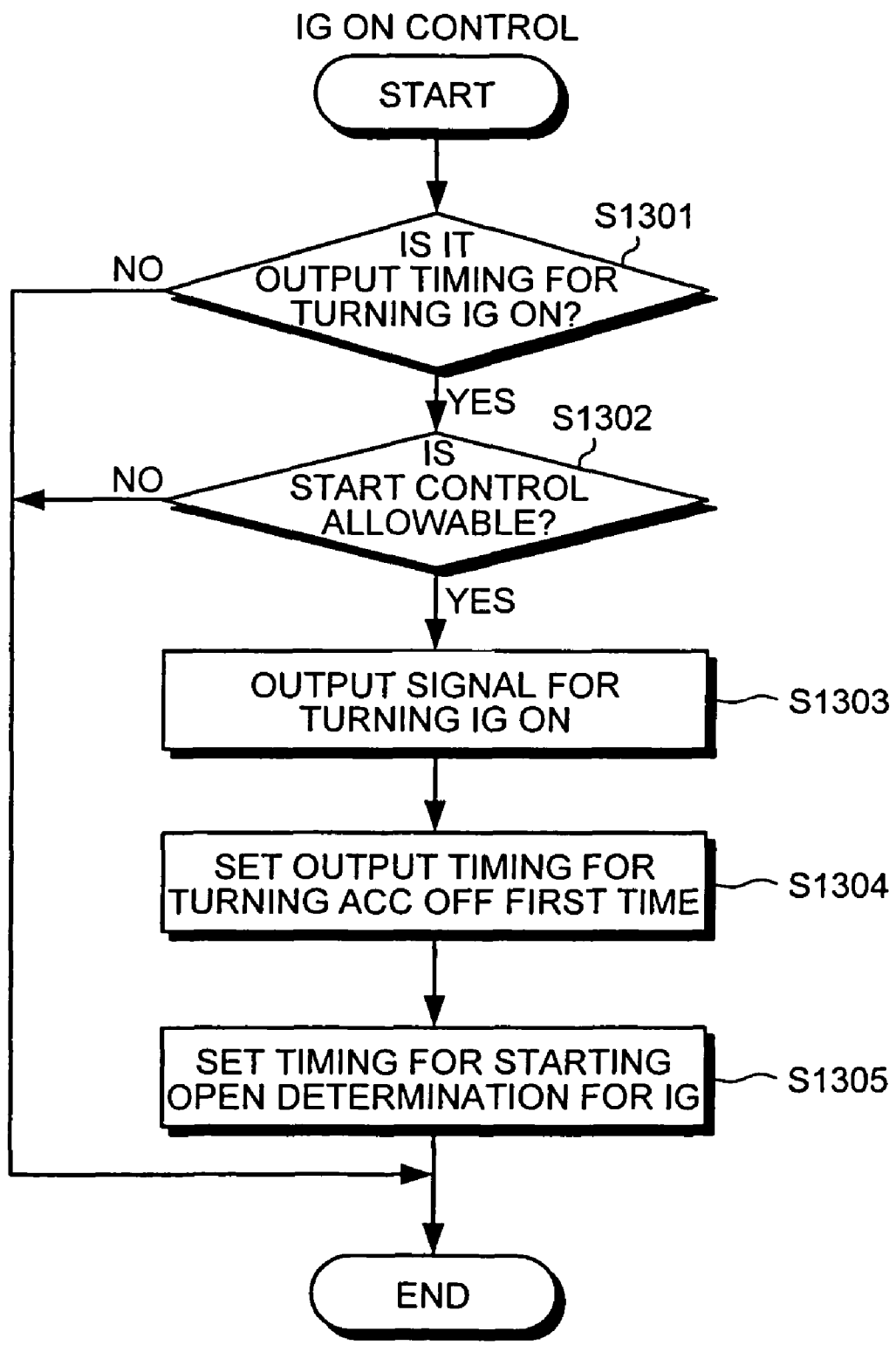
FIG. 16 is a flow chart of an ignition (IG) line ON control shown in FIG. 13.

FIG. 16 is a flow chart for illustrating details of the processing during the control for turning ON the IG line shown as step S1003 in FIG. 13. In this processing flow, at the beginning, the remote starter 10 determines whether the current point of time is the control timing for turning ON the IG line (step S1301).

When it is determined that the current point of time is the control timing for turning ON the IG line (step S1301, Yes), then the remote starter 10 determines whether start control is allowable (step S1302).

When it is determined that the start control is allowable (step S1302, Yes), the drive output section 15 turns ON the ignition switch SWi to output a signal for turning ON the IG line (step S1303).

In the next step, the control timing for turning OFF the ACC line first time (step S1004 in FIG. 13) is set (step S1304), and also the timing for starting open determination for the IG line is set (step S1305).

After the step S1305 is finished, or when it is determined that the current point of time is not the control timing for turning ON the IG line (step S1301, No), or when the start control is not allowable (step S1302, No), the remote starter 10 terminates the control for turning ON the IG line and shifts to the control for turning OFF the ACC line first time shown as step S1004 in FIG. 13.

Figure 17:
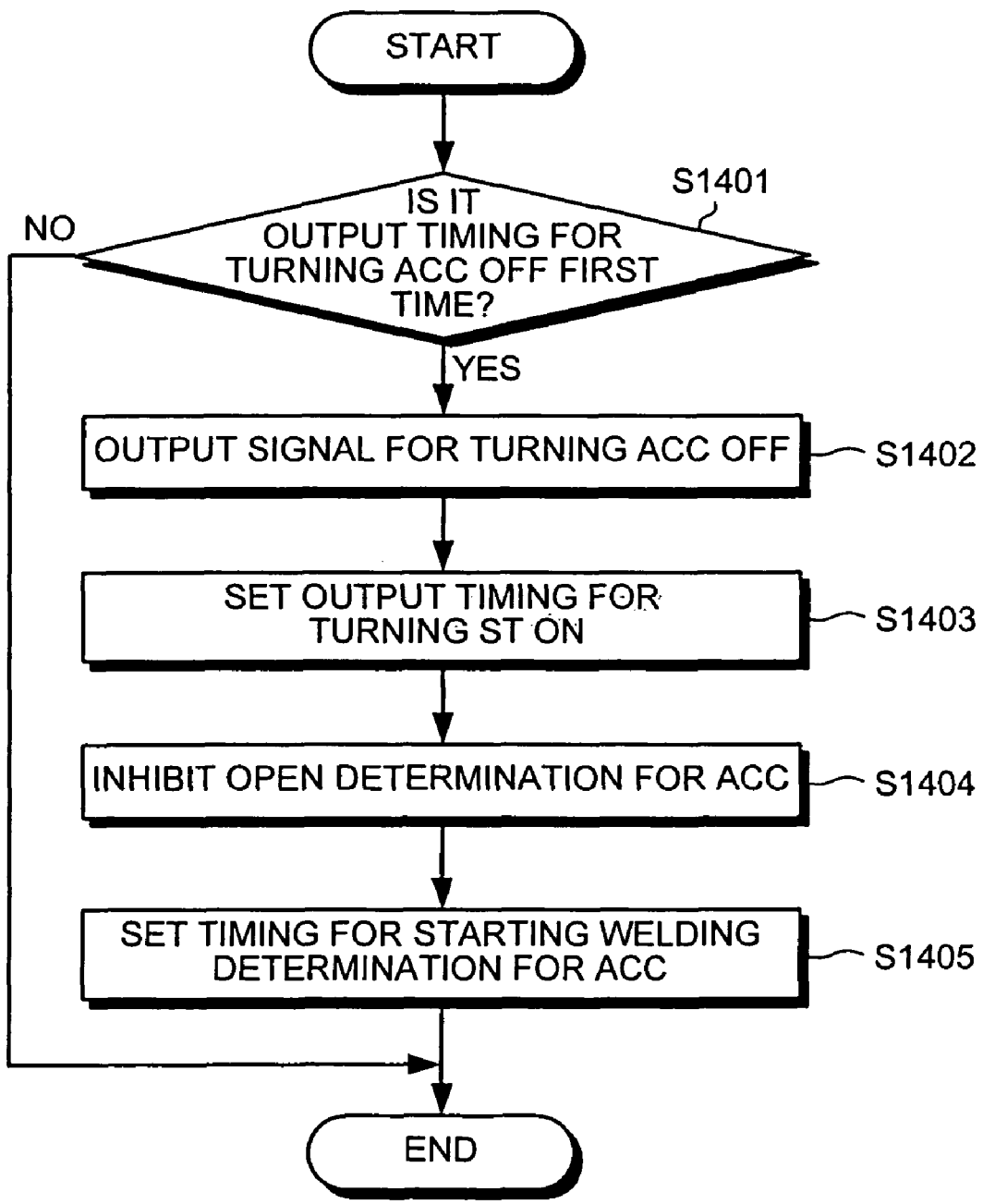
FIG. 17 is a flow chart of a first time ACC OFF control shown in FIG. 13.

FIG. 17 is a flow chart for illustrating details of the processing during the control for turning OFF the ACC line first time shown as step S1004 in FIG. 13. In this processing flow, at the beginning, the remote starter 10 determines whether the current point of time is the control timing for turning OFF the ACC line first time (step S1401).

When it is determined that the current point of time is the control timing for turning OFF the ACC line first time (step S1401, Yes), the drive output section 15 turns OFF the ACC switch SWa to output a signal for turning OFF the ACC line (step S1402).

Then, the control timing of control for turning ON the ST line (step S1005 in FIG. 13) is set (step S1403), and open determination for the ACC line is inhibited (step S1404).

Then, the remote starter 10 sets the timing for starting welding determination for the ACC line (step S1405). The timing for starting the determination is set in consideration to influence of residual electric charge in switching off. Although the specific time length depends on such parameters as the capacity of a capacitor or the like, it is advantageous to set, for instance, approximately one second later than the control for turning OFF the ACC line in step S1402. In the following description, it is assumed that the timing for starting the determination is set in consideration to residual electric charge as described above.

After the step S1405 is finished, or when it is determined that the current point of time is not the control timing for turning OFF the ACC line first time (step S1401, No), the remote starter 10 terminates the control for turning OFF the ACC line first time and shifts to the control for turning ON the ST line shown as step S1005 in FIG. 13.

Figure 18:
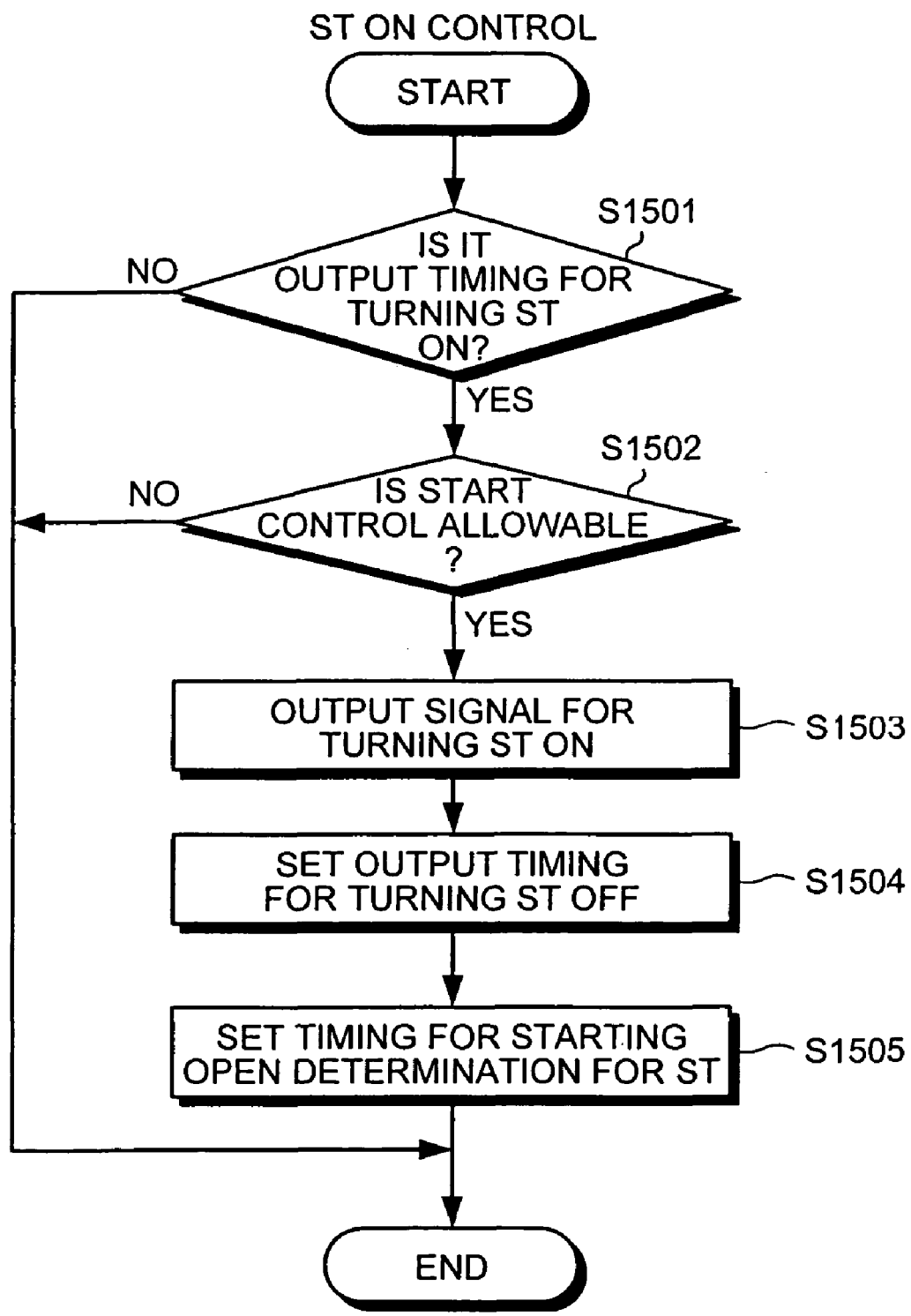
FIG. 18 is a flow chart of an ST ON control shown in FIG. 13.

FIG. 18 is a flow chart for illustrating details of the processing during the control for turning ON the ST line shown as step S1005 in FIG. 13. In this processing flow, at the beginning, the remote starter 10 determines whether the current point of time is the control timing for turning ON the ST line (step S1501).

When it is determined that the current point of time is the control timing for turning ON the ST line (step S1501, Yes), then the remote starter 10 determines whether start control is allowable (step S1502).

When the start control is allowable (step S1502, Yes), the drive output section 15 turns ON the starter switch SWs to output a signal for turning ON the ST line (step S1503).

In the next step, the control timing of control for turning OFF the ST line (step S1006 in FIG. 13) is set (step S1504), and also the timing for staring open determination for the ST line is set (step S1505).

After the step S1505 is finished, or when it is determined that the current point of time is not the control timing for turning ON the ST line (step S1501, No), or when the start control is not allowable (step S1502, No), the remote starter 10 terminates the control for turning ON the ST line and shifts to the control for turning OFF the ST line shown as step S1006 in FIG. 13.

Figure 19:
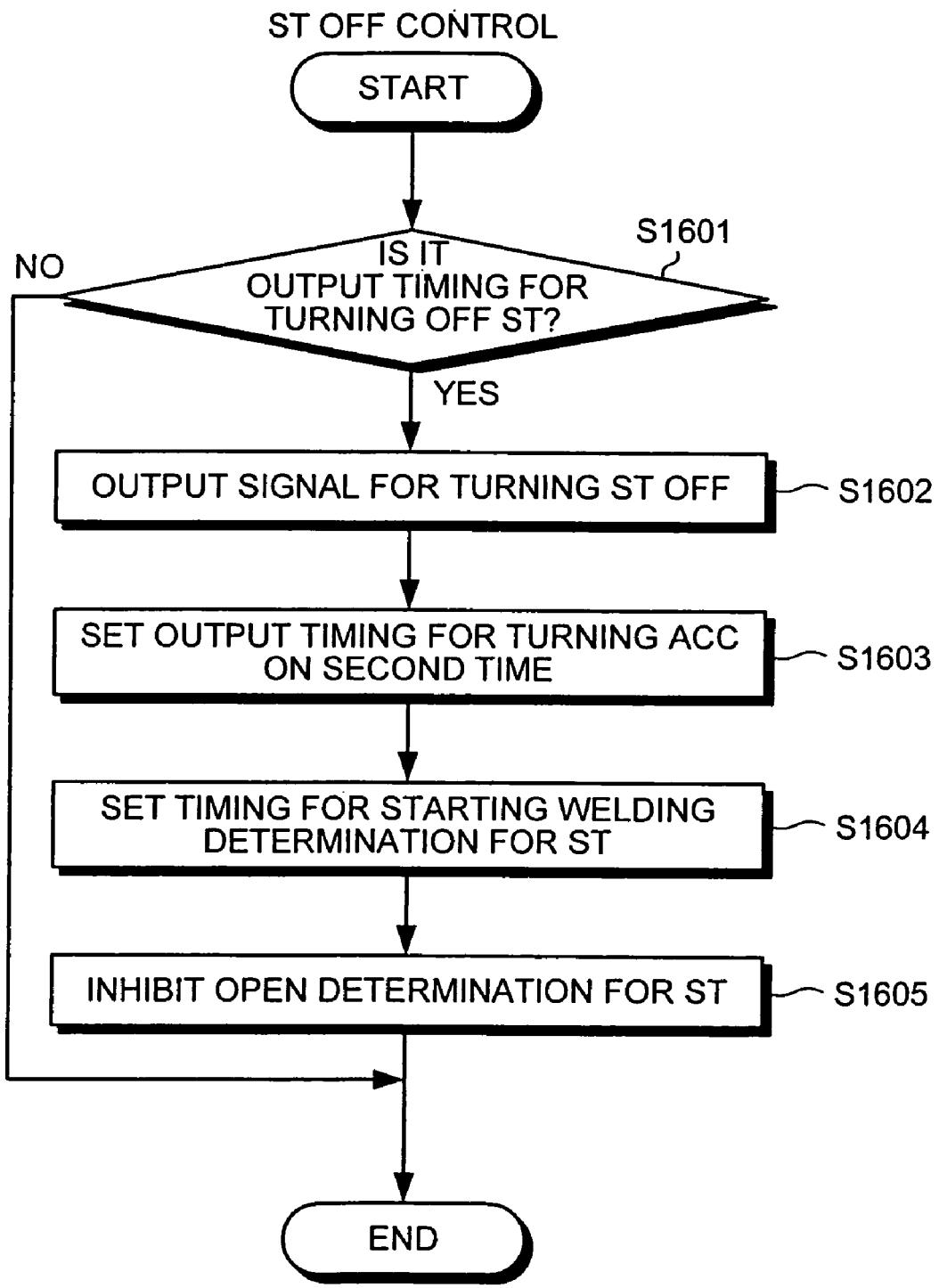
FIG. 19 is a flow chart of an ST OFF control shown in FIG. 13.

FIG. 19 is a flow chart for illustrating details of the processing during the control for turning OFF the ST line shown as step S1006 in FIG. 13. In this processing flow, at the beginning, the remote starter 10 determines whether the current point of time is the control timing for turning OFF the ST line (step S1601).

When it is determined that the current point of time is the control timing for turning OFF the ST (step S1601, Yes), the drive output section 15 turns OFF the starter switch SWs to output a signal for turning OFF the ST line (step S1602).

In the next step, the control timing for turning ON the ACC line second time (step S1007 in FIG. 13) is set (step S1603), and also the timing for starting welding determination for the ST line is set (step S1604) with open determination for the ST line inhibited (step S1605).

After the step S1605 is finished, or when the current point of time is not the control timing for turning OFF the ST line (step S1601, No), the remote starter 10 terminates the control for turning OFF the ST line and shifts to the control for second time turning ON the ACC line shown as step S1007 in FIG. 13.

Figure 20:
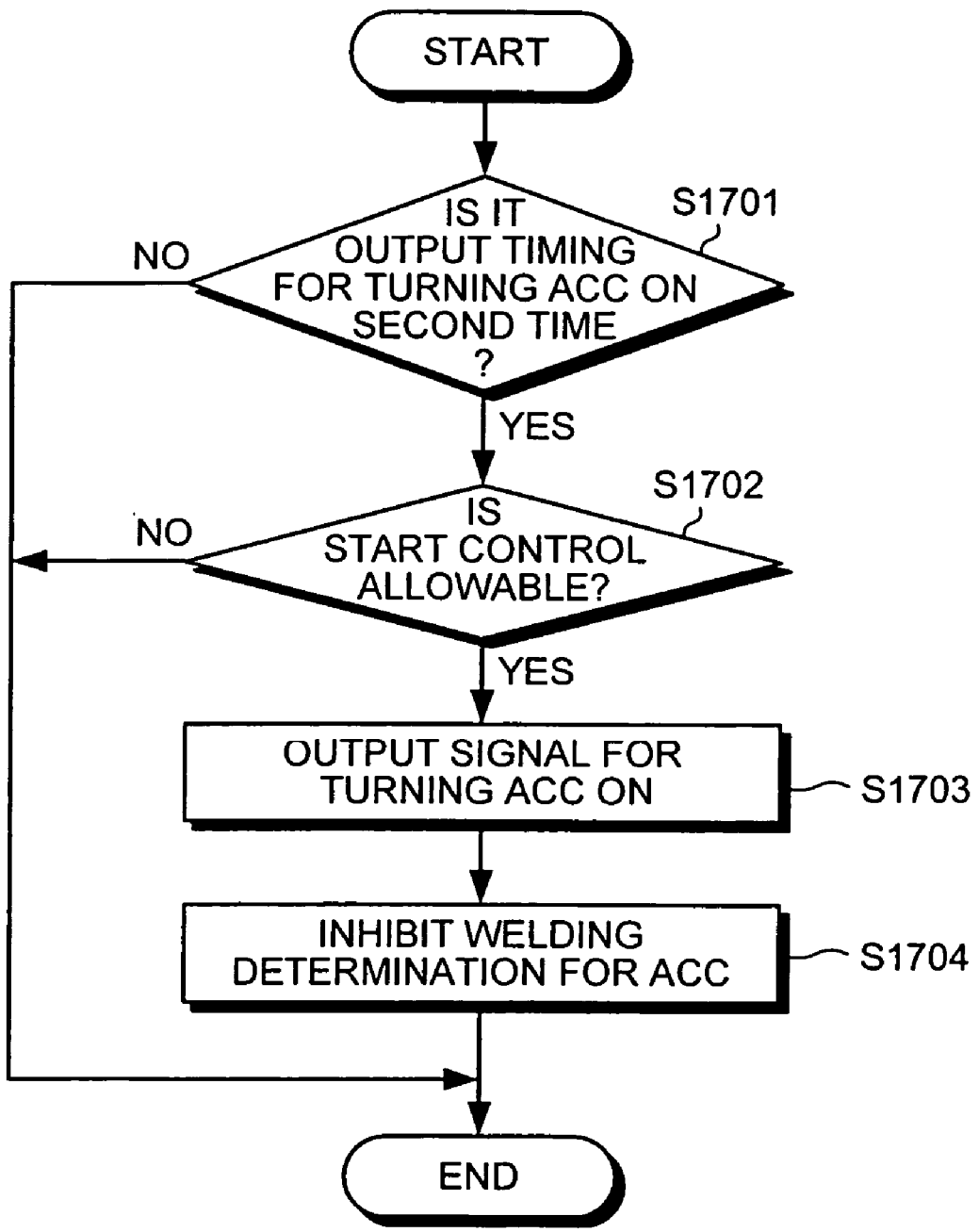
FIG. 20 is a flow chart of a second time ACC ON control shown in FIG. 13.

FIG. 20 is a flow chart for illustrating details of processing during the control for turning ON the ACC line second time shown as step S1007 in FIG. 13. In this processing flow, at the beginning, the remote starter 10 determines whether the current point of time is the control timing for turning ON the ACC line second time (step S1701).

When it is determined that the current point of time is the control timing for turning ON the ACC line second time (step S1701, Yes), then the remote starter 10 determines whether start control is allowable (step S1702).

When it is determined that the start control is allowable (step S1702, Yes), the drive output section 15 turns ON the ACC switch SWa to output a signal for turning ON the ACC line (step S1703) and also to inhibit welding determination for the ACC line (step S1704).

After the step S1704 is finished, or when it is determined that the current point of time is not the control timing for turning ON the ACC line second time (step S1701, No), or when the start control is not allowable (step S1702, No), the remote starter 10 terminates the control for turning ON the ACC line second time.

Next, failure determination by the remote starter 10 is described below. The start control processing described with reference to FIGS. 13 to 20 is carried out when an instruction for remote start is received from the transmitter 28, while each failure determination for the sub-relays, the ACC line, the IG line, and the ST line is periodically carried out within the main routine.

Figure 21:
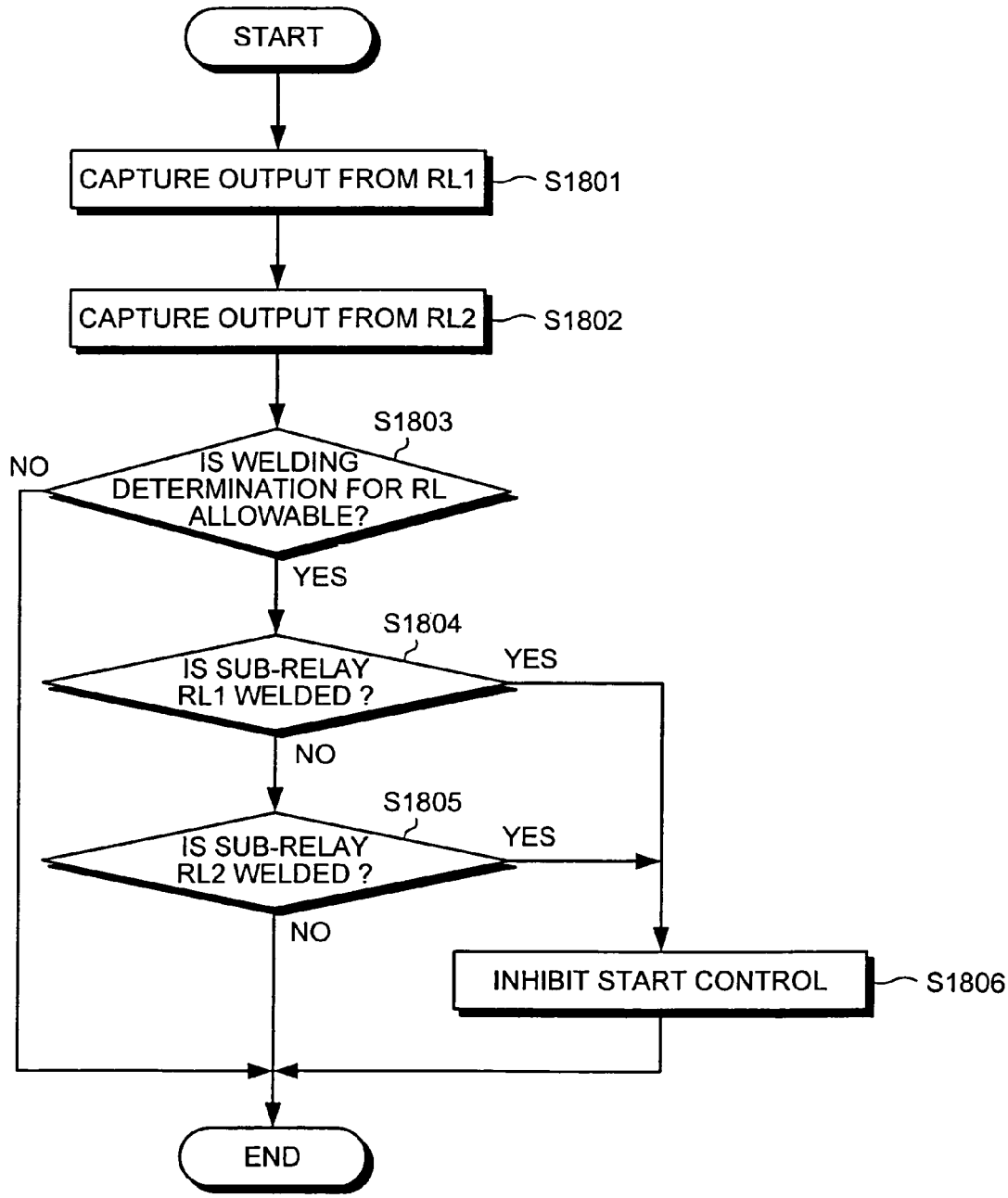
FIG. 21 is a flow chart of process procedure for performing failure determination of a sub-relay.

FIG. 21 is a flow chart for illustrating processing operations of the remote starter 10 for determining a failure in the sub-relays RL1 and RL2. As shown in FIG. 21, in the failure determination for the sub-relays, at first output from the sub-relay RL1 (step S1801) and output from the sub-relay RL2 (step S1802) are captured.

In the next step, the remote starter 10 determines whether welding determination for the sub-relays RL1 and RL2 is allowable (step S1803). When it is determined that the welding determination for the sub-relays RL1 and RL2 is not allowable (step S1803, No), the processing is immediately terminated.

On the other hand, when the welding determination for the sub-relays RL1 and RL2 is allowable (step S1803, Yes), the remote starter 10 determines whether the sub-relay RL1 is in a welded state (step S1804). Further, when it is determined that the sub-relay RL1 is not in a welded state (step S1804, No), whether the sub-relay RL2 is in a welded state is determined (step S1805).

When it is determined that the sub-relay RL2 is not in a welded (step S1805, No), the processing is immediately terminated.

On the other hand, when it is determined that the sub-relay RL1 is in a welded state (step S1804, Yes) or when it is determined that the sub-relay RL2 is in a welded state (step S1805, Yes), the remote starter 10 inhibits the start control (step S1806) and terminates the processing.

Inhibition of the start control is set by flagging with a prespecified indication, and when determining whether the start control is allowable, it is required only to refer to this flag. Also the control for turning OFF the sub-relay RL1 can be carried out in response to the inhibition of the start control. In the following description, to inhibit the start control, a flag is prepared with a prespecified indication, and also the control for turning OFF the sub-relay RL1 can be carried out.

Figure 22:
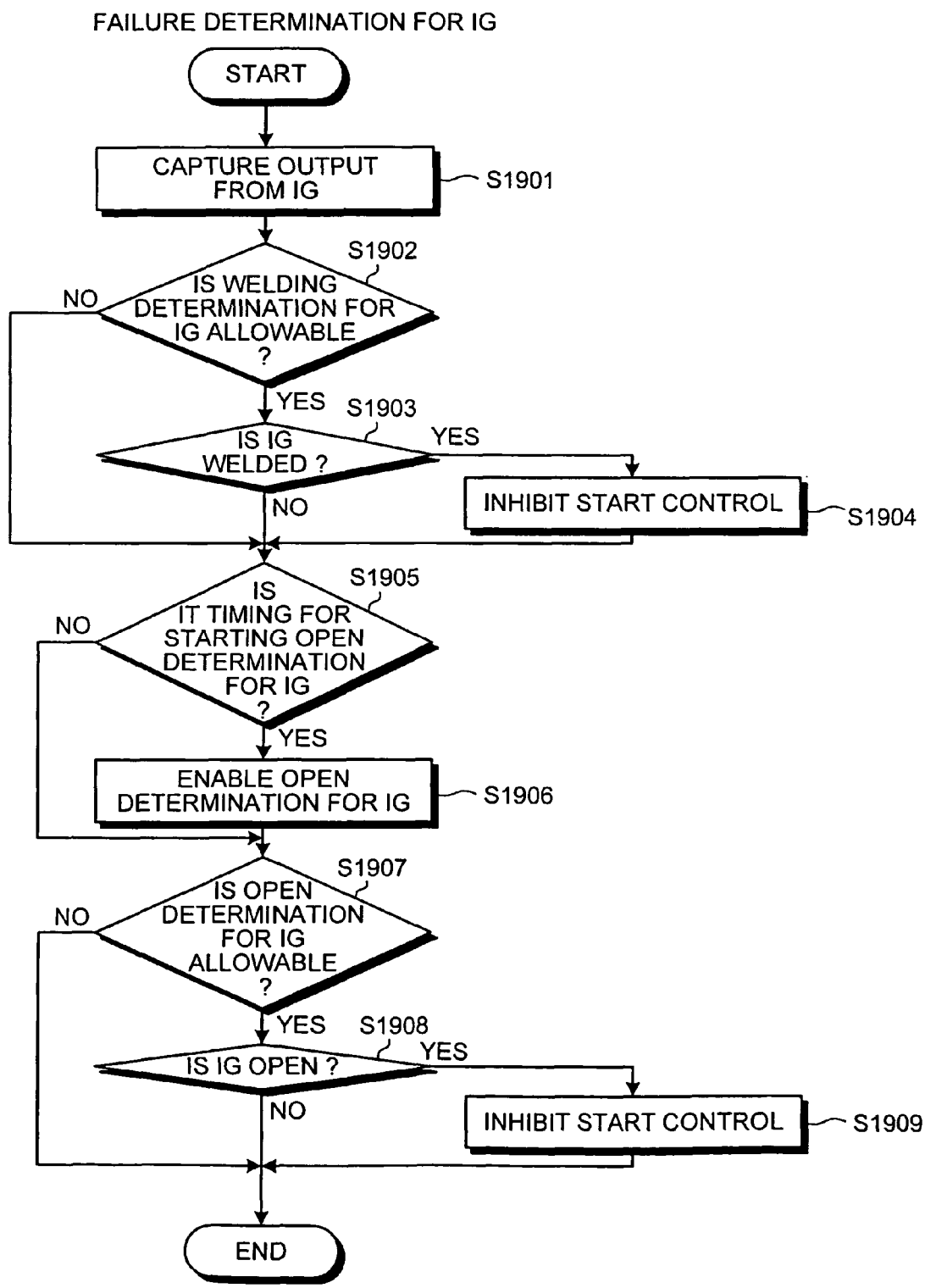
FIG. 22 is a flow chart of a process procedure for performing failure determination of the IG.

Next, determination of a failure in the IG line is described. FIG. 22 is a flow chart for illustrating the processing operation of the remote starter 10 for determining a failure in the IG line. As shown in FIG. 22, determination of a failure in the IG line begins with capture of output from the IG line (step S1901).

In the next step, the remote starter 10 determines whether welding determination for the IG line is allowable (step S1902). When IG welding determination is allowable (step S1902, Yes), welding in the IG line is determined (step S1903). When it is determined that the IG line is in a welded state (step S1903, Yes), the start control is inhibited (step S1904).

After the start control is inhibited in step S1904, or when determination of welding in the IG line is not allowable (step S1902, No), or when IG line is not in a welded state (step S1903, No), the remote starter 10 determines whether the current point of time is the timing for starting open determination for the IG line (step S1905).

When it is determined that the current point of time is the timing for starting open determination for the IG line (step S1905, Yes), the remote starter 10 enables open determination for the IG line (step S1906).

After the step S1906, or when it is determined that the current point of time is not the timing for starting open determination for the IG line (step S1905, No), the remote starter 10 determines whether open determination for the IG line is allowable (step S1907).

When open determination for the IG line is allowable (step S1907, Yes), the remote starter 10 executes the open determination for the IG line (step S1908). When it is determined that the IG line has an open failure (step S1908, Yes), the start control is inhibited (step S1909) with the processing terminated.

On the other hand, when it is determined that the open determination is not allowable (step S1907, No), or when IG line has no open failure (step S1908, No), the remote starter 10 immediately terminates the IG failure determination.

Figure 23:
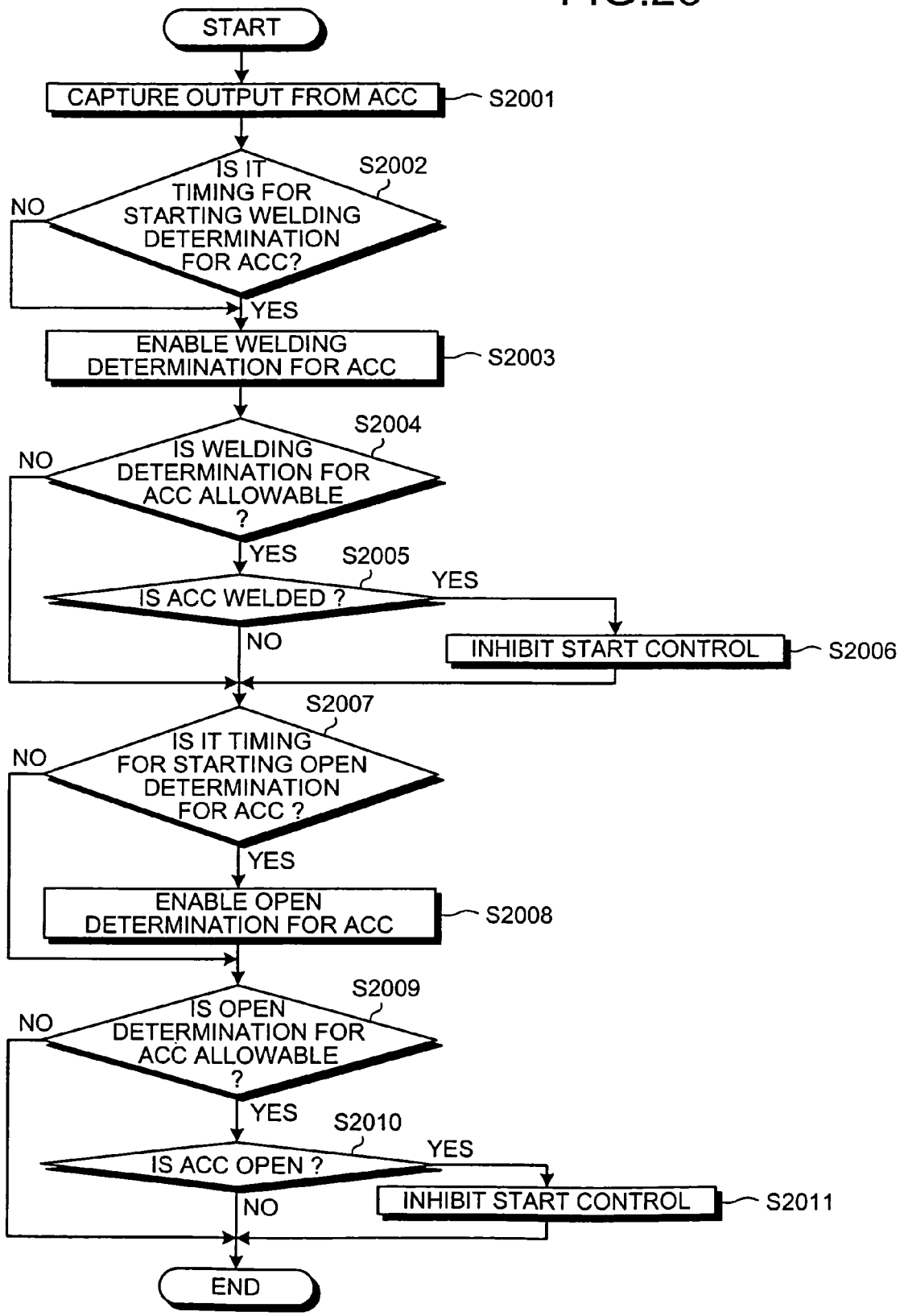
FIG. 23 is a flow chart of a process procedure for performing failure determination of the ACC.

Next, determination of a failure in the ACC line is described. FIG. 23 is a flow chart for illustrating processing operations of the remote starter 10 for determining a failure in the ACC line. As shown in FIG. 23, determination of a failure in the ACC line begins with capture of output from the ACC line (step S2001).

In the next step, the remote starter 10 determines whether the current point of time is the timing for starting welding determination for the ACC line (step S2002), and when it is the timing for starting welding determination for the ACC line (step S2002, Yes), welding determination for the ACC line is enabled (step S2003).

After the step S2003, or when it is determined that the current point of time is not the timing for starting welding determination for the ACC line (step S2002, No), the remote starter 10 determines whether the welding determination for the ACC line is allowable (step S2004).

When it is determined that welding determination for the ACC line is allowable (step S2004, Yes), the remote starter 10 determines whether the ACC line is in a welded state (step S2005). When it is determined that the ACC line is in a welded state (step S2005, Yes), the start control is inhibited (step S2006).

After the start control is inhibited in step S2006, or when it is determined that the welding determination for the ACC line is not allowable (step S2004, No), or when it is determined that the ACC line is not in a welded state (step S2005, No), then the remote starter 10 determines whether the current point of time is the timing for starting open determination the ACC line (step S2007).

When it is determined that the current point of time is the timing for starting open determination for the ACC line (step S2007, Yes), the remote starter 10 enables open determination for the ACC line (step S2008).

After the step S2008, or when it is determined that the current point of time is not the timing for starting the open determination for the ACC line (step S2007, No), the remote starter 10 determines whether open determination for the ACC line is allowable (step S2009).

When open determination for the ACC line is allowable (step S2009, Yes), the remote starter 10 carries out open determination for the ACC line (step S2010). When it is determined that the ACC line has an open failure (step S2010, Yes), the start control is inhibited (step S2011) and the processing is terminated.

On the other hand, when it is determined that open determination for the ACC line is not allowable (step S2009, No), or when it is determined that ACC line has no open failure (step S2010, No), the remote starter 10 immediately terminates the failure determination for the ACC line.

Figure 24:
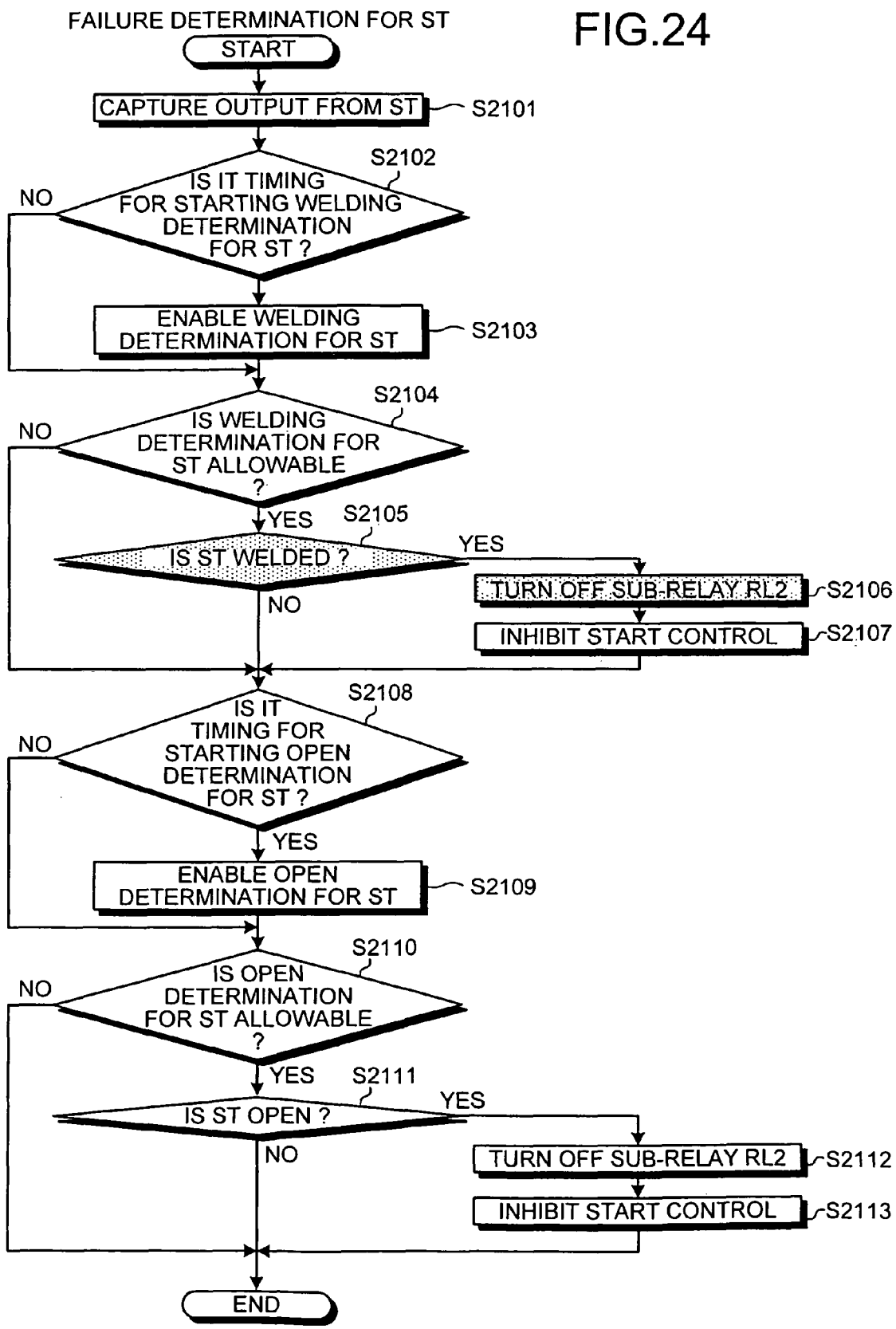
FIG. 24 is a flow chart of a process procedure for performing failure determination of the ST.

Next, determination for a failure in the ST line is described. FIG. 24 is a flow chart for illustrating the processing operations of the remote starter 10 for determining a failure in the ST line. As shown in FIG. 24, determination for a failure in the ST line begins with capture of output from ST line (step S2101).

In the next step, the remote starter 10 determines whether the current point of time is the timing for starting welding determination for the ST line (step S2102), and when it is determined that the current point of time is the timing for starting welding determination for the ST line (step 2102, Yes), welding determination for the ST line is enabled (step S2103).

After the step S2103, or when it is determined that the current point of time is not the timing for welding determination for the ST line (step 2102, No), the remote starter 10 determines whether the welding determination for the ST line is allowable (step S2104).

When welding determination for the ST line is allowable (step 2104, Yes), the remote starter 10 determines whether the ST line is in a welded state (step S2105). When it is determined that the ST line is in a welded state (step S2105, Yes), the sub-relay RL2 is turned OFF (step S2106) and also the start control is inhibited (step S2107).

After the start control is inhibited in step S2107, or when welding determination for the ST line is not allowable (step 2104, No), or when ST line is not in a welded state (step S2105, No), then the remote starter 10 determines whether the current point of time is the timing for starting open determination for the ST line (step S2108), and when it is determined that the current point of time is the timing for starting open determination for the ST line (step S2108, Yes), open determination for the ST line is enabled (step S2109).

After the step S2109, or when it is determined that the current point of time is not the timing for starting open determination for the ST line (step S2108, No), the remote starter 10 determines whether open determination for the ST line is allowable (step S2110).

When it is determined that open determination for the ST line is allowable (step S2110, Yes), the remote starter 10 carries out open determination for the ST line (step S2111). When it is determined that the ST line has an open failure (step S2111, Yes), the sub-relay RL2 is turned OFF (step S2112), and also the start control is inhibited (step S2113) with the processing terminated.

On the other hand, when it is determined that open determination for the ST line is not allowable (step S2110, No), or when ST line has no open failure (step S2111, No), the remote starter 10 immediately terminates failure determination for the ST line.

In the failure determination for the ST line, as shown in the figure with shaded areas, when welding occurs in ST (step S2105, Yes), the operation of turning OFF the sub-relay RL2 (step S2106) can suppress occurrence of a phenomenon where the starter switch SWs and the accessory switch SWa are simultaneously ON.

Next, the processing is described in the case where the procedure of when the ST line is in a welded state, the ACC line is turned ON after the sub-relay RL2 is turned OFF is employed. In this case, as compared to the case where the procedure of after the ACC line is turned ON, the sub-relay RL2 is turned OFF when the ST line is in a welded state is employed described with reference to FIGS. 14 to 24, the processing of turning OFF the ST line and the processing of a failure determination for the ST line are different, while the other processing operations are identical, and therefore only these two processing operations are described.

Figure 25:
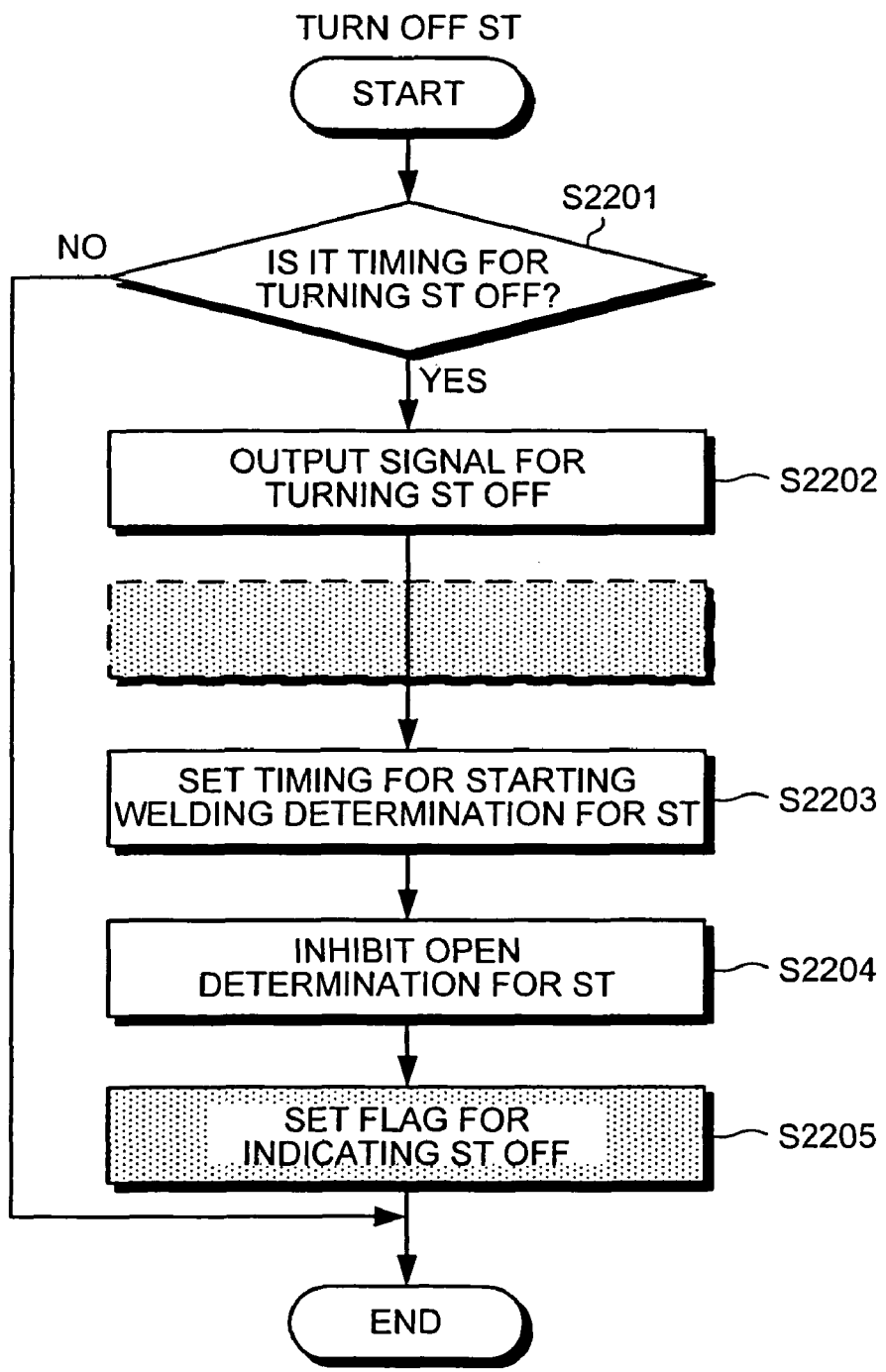
FIG. 25 is a flow chart of an ST line ON control when a condition that when the ST is in welded state, the ACC is turned ON after the sub-relay RL2 is turned OFF is employed.

FIG. 25 is a flow chart for illustrating details of the control for turning OFF the ST line (step S1006 in FIG. 13) in the case where the procedure that when the ST line is in a welded state, the ACC line is turned ON after the sub-relay RL2 is turned OFF is employed. In this processing flow, at the beginning, the remote starter 10 determines whether the current point of time is the timing for turning OFF the ST line (step S2201).

When it is determined that the current point of time is the timing for turning OFF the ST line (step S2201, Yes), the drive output section 15 turns OFF the starter switch SWs to output a signal for turning OFF the ST line (step S2202).

In the next step, instead of setting the control timing for turning ON the ACC line second time, the timing for starting welding determination for the ST line is set (step S2203), and the open determination for the ST line is inhibited (step S2204). Further, a flag for indicating ST OFF is set (step S2205).

After the step S2205 is finished, or when it is determined that that the current point of time is not the control timing for turning OFF the ST line (step S2201, No), the control for turning OFF the ST line is terminated and the processing shifts to the control for turning ON the ACC second time shown as step S1007 in FIG. 13.

Figure 26:
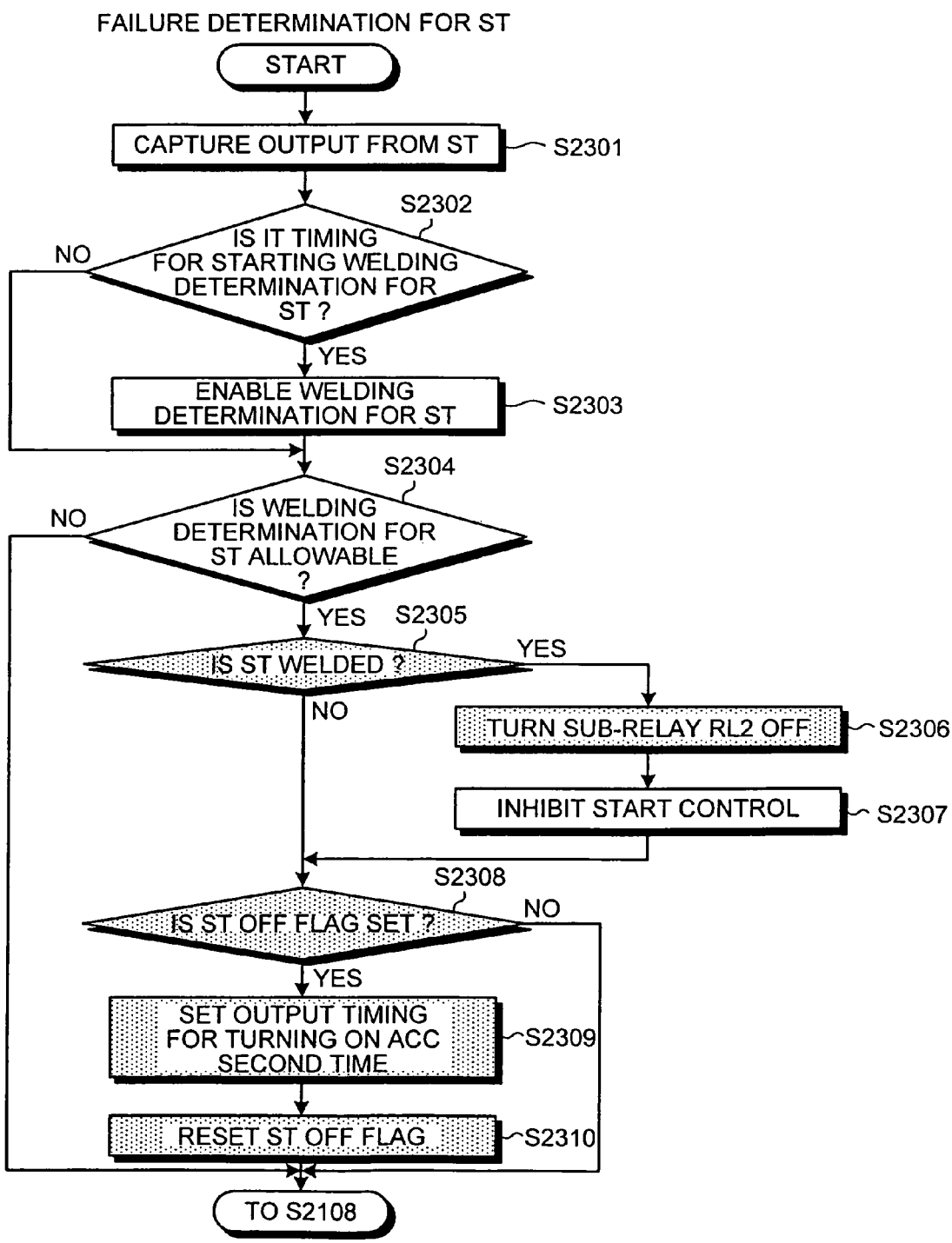
FIG. 26 is a flow chart of a process procedure for performing failure determination of the ST line when a condition that when the ST is in welded state, the ACC is turned ON after the sub-relay RL2 is turned OFF is employed.

Next, the processing of failure determination for the ST Line in the case where the procedure that when the ST line is in a welded state, the ACC line is turned ON after the sub-relay RL2 is turned OFF is employed is shown in a flow chart in FIG. 26. The processing shown in this figure begins with capture of output from the ST line (step S2301).

In the next step, the remote starter 10 determines whether the current point of time is the timing for starting welding determination for the ST line (step S2302), and when it is determined that the current point of time is the timing for starting welding determination for the ST line (step S2302, Yes), welding determination for the ST line is enabled (step S2303).

After the step S2303, or when the current point of time is not the timing for starting welding determination for the ST line (step S2302, No), the remote starter 10 determines whether welding determination for the ST line is allowable (step S2304).

When the welding determination for the ST line is allowable (step S2304, Yes), the remote starter 10 determines whether the ST line is in a welded state (step S2305). As a result, when it is determined that the ST line is in a welded state (step S2305, Yes), the sub-relay RL2 is turned OFF (step S2306) and the start control is inhibited (step S2307).

After the start control is inhibited in step S2307, or when it is determined that the ST line is not in a welded state (step S2305, No), then the remote starter 10 determines whether the ST OFF flag is set (step S2308).

When it is determined that the ST OFF flag is set (step S2308, Yes), the control timing for turning ON the ACC line second time is set (step S2309), and the ST OFF flag is reset (step S2310).

After the step S2310 is finished, or when the ST OFF flag is not set (step S2308, No), or when the welding determination for the ST line is not allowable (step S2304, No), the remote starter 10 shifts to the step S2108 shown in FIG. 24.

Next, the processing is described in the case where the procedure that when the ACC line is in a welded state, the ST line is turned OFF is employed. In this case, as compared to the case where the procedure of after the ACC line is turned ON, the sub-relay RL2 is turned OFF when the ST line is in a welded state is employed described with reference to FIGS. 14 to 24, the processing of turning ON the ST line and the processing of failure determination for the ACC line are different, while the other processing operations are identical, and therefore only the former two processing operations are described below.

Figure 27:
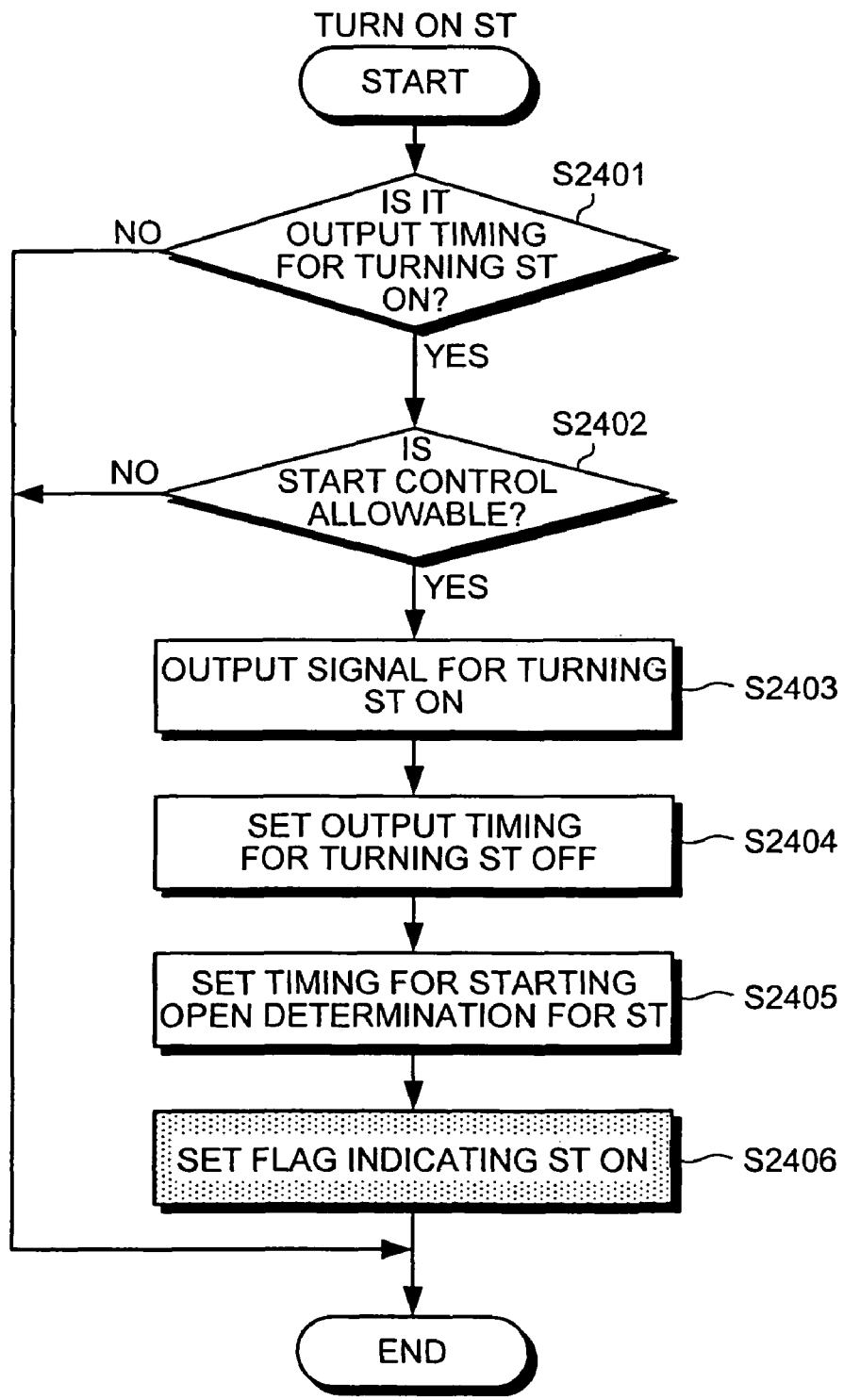
FIG. 27 is a flow chart of the ST line ON control when a condition that when the ACC is in welded state, the ST is turned OFF is employed.

FIG. 27 is a flow chart for illustrating details of control for turning ON the ST line (step S1005 shown in FIG. 13) in the case where the procedure of when the ACC line is in a welded state, the ST line is turned OFF Fig is employed. In this processing flow, at the beginning, the remote starter 10 determines whether the current time is the control timing for turning ON the ST line (step S2401).

When it is determined that the current point of time is the control timing for turning ON the ST line (step S2401, Yes), then the remote starter 10 determines whether start control is allowable (step S2402).

When the start control is allowable (step S2402, Yes), the drive output section 15 turns ON the starter switch SWs to output a signal for turning ON the ST line (step S2403).

In the next step, the control timing for turning OFF the ST line (step S1006 in FIG. 13) is set (step S 2404), and also the timing for starting open determination for the ST line is set (step S2405). Then, the remote starter 10 sets a flag for indicating ST ON (step S2406).

After the step S2406 is finished, or when it is determined that that the current point of time is not the control timing for turning ON the ST line (step S2401, No), or when it is determined that the start control is not allowable (step S2402, No), the remote starter 10 terminates the control for turning ON the ST line.

Figure 28:
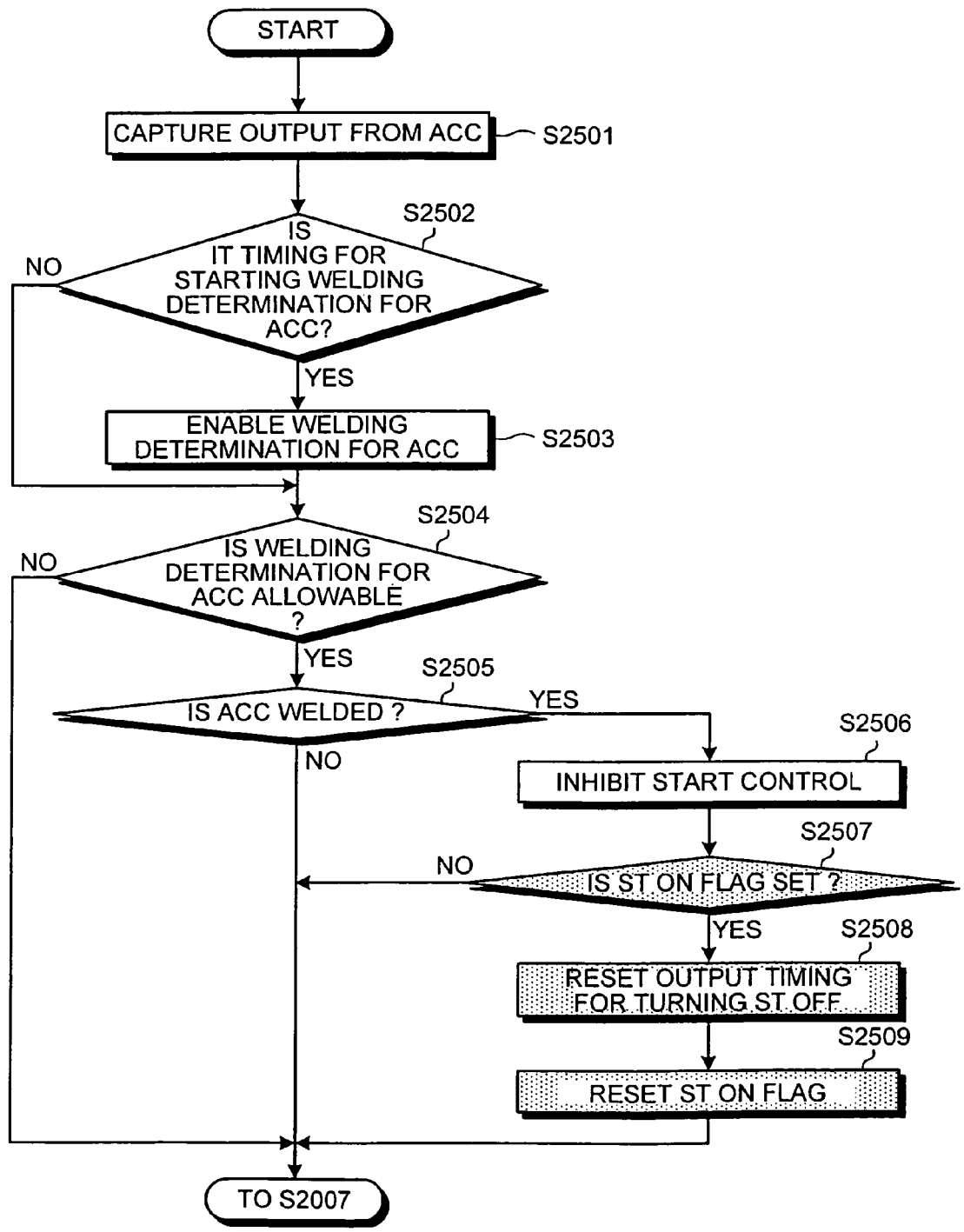
FIG. 28 is a flow chart of a process procedure for performing failure determination of the ACC when a condition that when the ACC is in welded state, the ST is turned OFF is employed.

Next, the processing of failure determination for the ACC line in the case where the procedure when the ACC line is in a welded state, the ST line is turned OFF is employed is shown in a flow chart in FIG. 28. The processing shown in this figure begins with capture of output from the ACC line (step S2501).

In the next step, the remote starter 10 determines whether the current point of time is the timing for starting welding determination for the ACC line (step S2502), and when it is determined that the current point of time is the timing for starting welding determination for the ACC line (step S2502, Yes), welding determination for the ACC line is enabled (step S2503).

After the step S2503, or when it is determined that the current point of time is not the timing for starting welding determination for the ACC line (step S2502, No), the remote starter 10 determines whether the welding determination for the ACC line is allowable (step S2504).

When the welding determination for the ACC line is allowable (step S2504, Yes), the remote starter 10 determines whether the ACC line is in a welded state (step S2505). When it is determined that that the ACC line is in a welded state (step S2505, Yes), the start control is inhibited (step S2506).

After the start control is inhibited in step S2506, the remote starter 10 determines whether the ST ON flag is set as shown in the figure with a shaded area (step S2507). When it is determined that the ST ON flag is set (step S2507, Yes), the timing of control for turning OFF the ST line is set again (step S2508), and then the ST ON flag is reset (step S2509). Here, the timing of control for turning OFF the ST line is set as the earliest timing for turning OFF the starter switch SWs.

After the ST ON flag is reset in step S2509, or when it is determined that that the ST ON flag is not set (step S2507, No), or when the welding determination for the ACC line is not allowable (step S2504, No), or when the ACC line is not in a welded state (step 2505, No), the remote starter 10 shifts to the step S2007 shown in FIG. 23.

Next, the processing is described in the case where when the ACC line is in a welded state, turning ON the ST line is inhibited is employed. In this case, as compared to the case where the procedure that after the ACC line is turned ON, the sub-relay RL2 is turned OFF when the ST line is in a welded state is employed described with reference to FIGS. 14 to 24, the processing of turning OFF the ACC line first time and the processing of failure determination for the ACC line are different, while the other processing operations are identical, and therefore only the former two processing operations are described.

Figure 29:
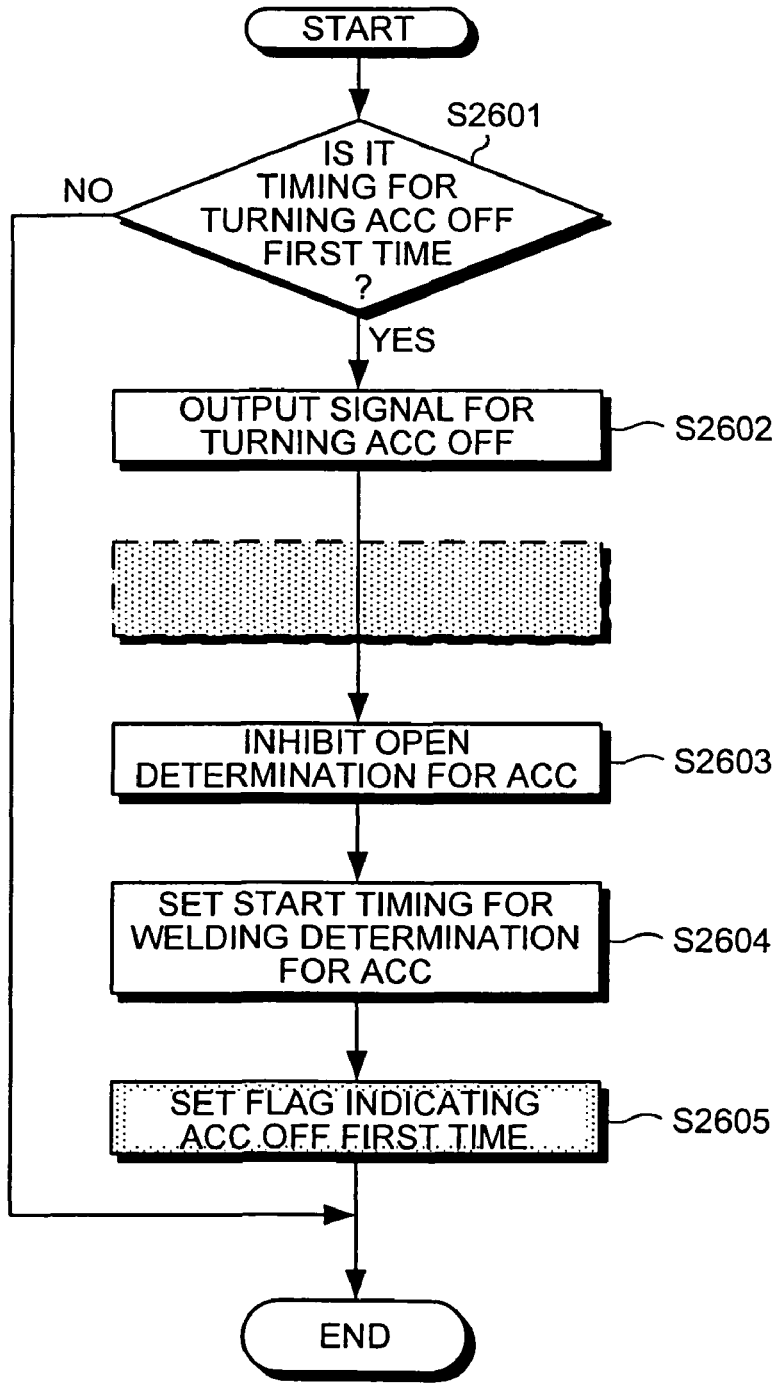
FIG. 29 is a flow chart of a first time ACC OFF control when a condition that when the ACC is in welded state, turning ON the ST is inhibited is employed.

FIG. 29 is a flow chart for illustrating details of the control for turning OFF the ACC line first time (step S1004 in FIG. 13) in the case where the procedure that when the ACC line is in a welded state, turning ON the ST line is inhibited is employed. In this processing flow, at the beginning, the remote starter 10 determines whether the current point of time is the timing for turning OFF the ACC line first time (step S2601).

When it is determined that the current point of time is the control timing for turning OFF the ACC line first time (step S2601, Yes), the drive output section 15 turns OFF the ACC switch SWa to output a signal for turning OFF the ACC line (step S2602).

Then, without setting the control timing for turning ON the ST line, open determination for the ACC line is inhibited (step S2603). Then, the start timing for welding determination for the ACC line is set (step S2604), and further a flag indicating ACC OFF first time is set (step S2605).

After the step S2605 is finished, or when it is not the control timing for turning OFF the ACC line first time (step S2601, No), the remote starter 10 terminates the control for turning OFF the ACC line first time.

Figure 30:
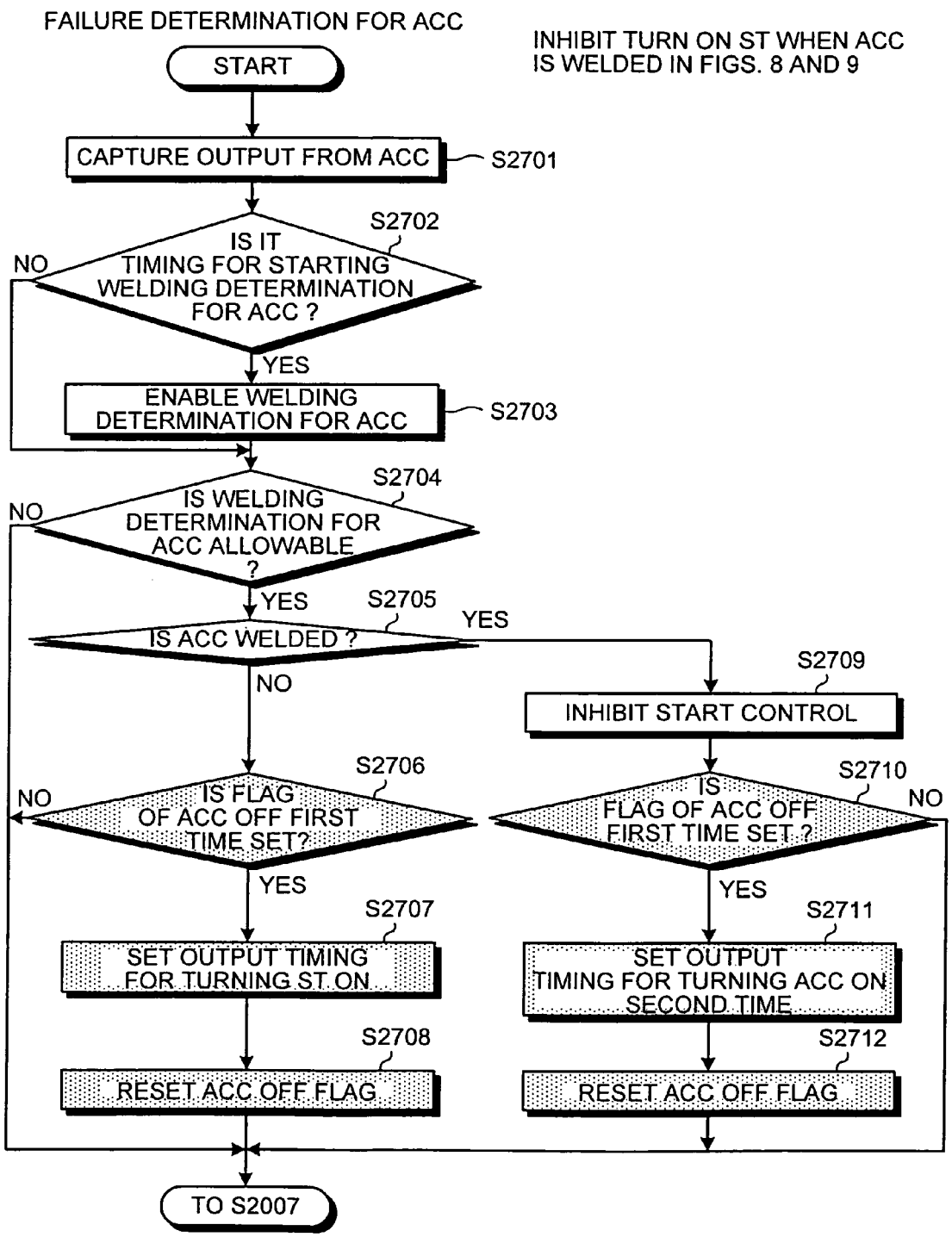
FIG. 30 is a flow chart of a process procedure for performing failure determination of the ACC when a condition that when the ACC is in welded state, turning ON the ST is inhibited is employed.

Next, the processing of failure determination for the ACC line in the case where the procedure that when the ACC line is in a welded state, turning ON the ST line is inhibited is employed is shown in a flowchart in FIG. 30. The processing shown in this figure begins with capture of output from the ACC line (step S2701).

In the next step, the remote starter 10 determines whether the current point of time is the timing for starting welding determination for the ACC line (step S2702), and when it is determined that the current point of time is the timing for starting welding determination for the ACC line (step S2702, Yes), the welding determination for the ACC line is enabled (step S2703).

After the step S2703, or when it is determined that the current point of time is not the timing for starting welding determination for the ACC line (step S2702, No), the remote starter 10 determines whether the welding determination for the ACC line is allowable (step S2704). When the welding determination for the ACC line is allowable (step S2704, Yes), the remote starter 10 determines whether the ACC line is in a welded state (step S2705).

When it is determined that the ACC line is not in a welded state (step S2705, No), the remote starter 10 determines whether the flag of ACC OFF first time is set (step S2706). When the flag of ACC OFF first time is set (step S2706, Yes), the remote starter 10 sets the control timing for turning ON the ST line (step S2707), and resets the ACC OFF flag (step S2708).

On the other hand, when it is determined that the ACC line is in a welded state (step S2705, Yes), after the start control is inhibited (step S2709), whether the flag of ACC OFF first time is set is determined (step S2710). When it is determined that the flag of ACC OFF first time is set (step S2710, Yes), the remote starter 10 sets the control timing for turning ON the ACC line second time (step S2711), and resets the ACC OFF flag (step S2712).

After the ACC OFF flag is reset step S2708 or step S2712), or when the welding determination for the ACC line is not allowable (step S2704, No), or when it is determined that the flag of ACC OFF first time is not set (step S2706, No; or step S2710, No), the remote starter 10 shifts to the step S2007 shown in FIG. 23.

Next, the processing of setting a standby time period until welding determination for the accessory switch SWa (Delay time to welding determination for the ACC line) is described. The flow chart shown in FIG. 31 is an example of the processing of setting a delay time to welding determination for the ACC line, which is repeatedly executed when the remote starter 10 is in the setting change mode.

At the beginning, the remote starter 10 determines whether a first key of the transmitter 28 is operated (changed from OFF to ON) (step S2801). When it is determined that the first key is operated (step S2801, Yes), delay time Ta to welding determination for the ACC line is incremented by 1 second (step S2082), and the processing is terminated.

On the other hand, when it is determined that the first key is not operated (step S2801, No), the remote starter 10 determines whether a second key of the transmitter 28 is operated (changed from OFF to ON) (step S2803). When the second key is operated (step S2803, Yes), the delay time Ta to welding determination for the ACC line is decremented by 1 second (step S2804) and the processing is terminated, or when the second key is not operated (step S2803, No), the processing is immediately terminated.

Thus, by incrementing or decrementing a delay time to welding determination for the ACC line in response to a prespecified operation (operation of the first key and the second key of the transmitter 28 in the processing flow in FIG. 31), a user can specify an appropriate delay time.

Next, an operation for switching a sequence of welding determination for ACC line and control for turning ON the ST line is described. A flow chart shown in FIG. 32 is an example of the routine for setting time sequential order of welding determination for the ACC line and control for turning ON the ST line, which is repeatedly executed when the remote starter 10 is in the setting change mode.

At the beginning, the remote starter 10 counts number of times of opening and closing of door(s) within 10 seconds based on an output from the door open/close switch 23 (step S2901). As a result, when the number of times of opening and closing of the door(s) is 5 times or more, a control mode flag for turning ON the ST line is set at 1 (step S2902). When the number of times of opening and closing of the door(s) is 4 times or less, the control mode flag for turning ON the ST line is set at 0 (step S2903).

It is to be noted that the control mode flag for turning ON the ST line indicates that the control for turning ON the ST line is executed before welding determination for the ACC line when the value is 1, and indicates that the control for turning ON the ST line is executed after welding determination for the ACC line when the value is 0, while the initial value is 1.

Thus, according to a prespecified operation (in the processing flow in FIG. 32, the number of times of opening and closing the door(s) within 10 seconds), the user can freely select the time sequential order of welding determination for the ACC line and control for turning ON the ST line.

Next, control selection when using the control mode flag for turning ON the ST line is described below with reference to FIGS. 33 to 35. FIG. 33 is a flow chart for illustrating the control for turning OFF the ACC line first time when using the control mode flag for turning ON the ST line.

In the processing shown in FIG. 33, the remote starter 10 at first refers to the control mode flag for turning ON the ST line (step S3001). When the control mode flag for turning ON the ST line indicates 1, the processing shifts to the step S1401, or when the control mode flag for turning ON the ST line indicates 0, the processing shifts to the step S2601.

Similarly, in the processing of the control for turning ON the ST line when using the control mode flag for turning ON the ST line, as shown in the flow chart in FIG. 34, the remote starter 10 at first refers to the control mode flag for turning ON the ST line (step S3002). When the control mode flag for turning ON the ST line indicates 1, the processing shifts to the step S2401, or when the control mode flag for turning ON the ST line indicates 0, the processing shifts to the step S1501.

Figure 35:
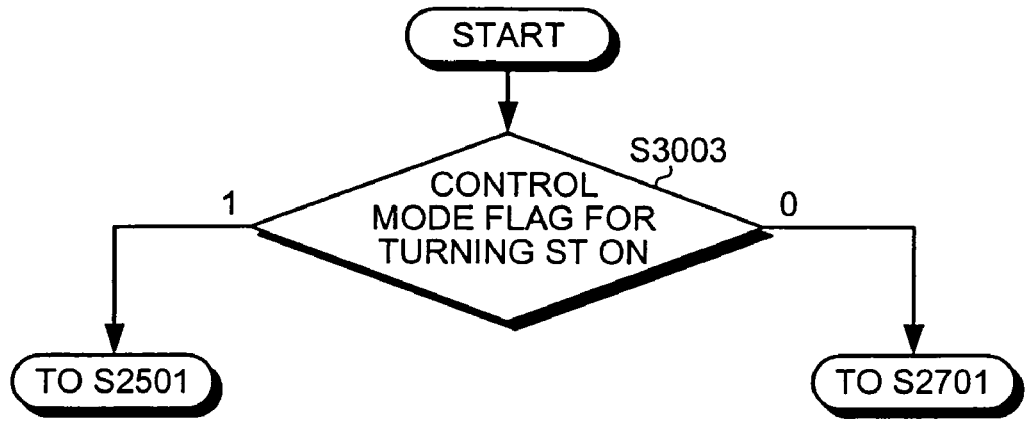
FIG. 35 is a flow chart of a process procedure for performing failure determination of the ACC that uses the control mode flag for the ST ON control.

In addition, in the processing of failure determination for the ACC line when using the control mode flag for turning ON the ST line, as shown in the flow chart in FIG. 35, the remote starter 10 at first refers to the control mode flag for turning ON the ST line (step S3003). When the control mode flag for turning ON the ST line indicates 1, the processing shifts to the step S2501, or when the control mode flag for turning ON the ST line indicates 0, the processing shifts to the step S2701.

Furthermore, as already described above, the time sequential order of welding determination for the ACC line and control for turning ON the ST line can be switched automatically based on the delay time to welding determination for the ACC line. Examples of processing when automatically switching the time sequential order of welding determination for the ACC line and control for turning ON the ST line are shown in FIGS. 36 to 38.

Figure 36:
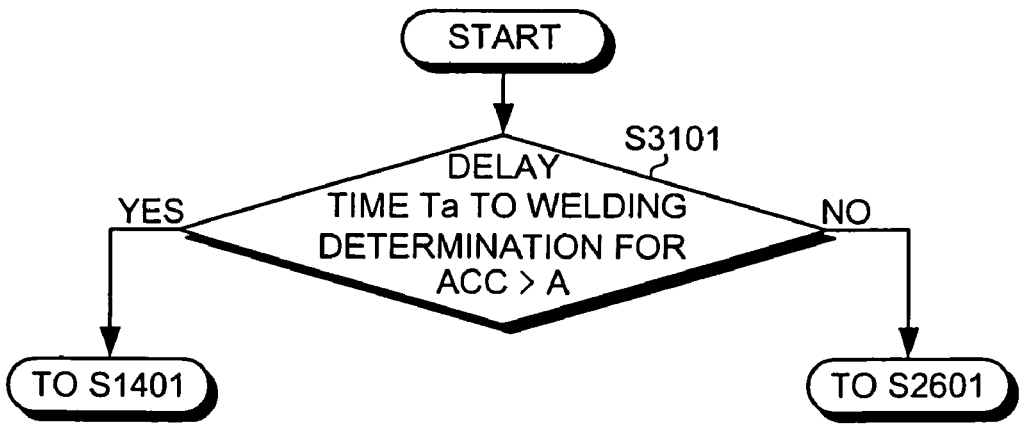
FIG. 36 is a flow chart of a first time ACC ON control in which the order of performing the welding determination of the ACC and the ST ON control is automatically switched.

FIG. 36 is a flow chart illustrating the control for turning OFF the ACC line first time when automatically switching the time sequential order of welding determination for the ACC line and control for turning ON the ST line. In the processing shown in this figure, at first, the remote starter 10 compares the delay time Ta to welding determination for the ACC line and a prespecified threshold A (step S3101). When Ta>A, the processing shifts to the step S1401, and when Ta≦A, the processing shifts to the step S2601.

Figure 37:
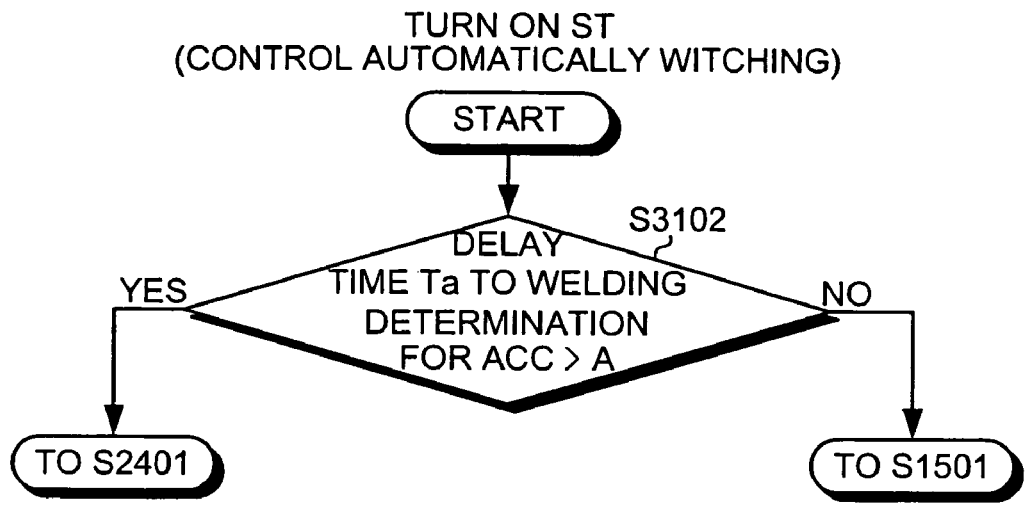
FIG. 37 is a flow chart of an ST ON control in which the order of performing the welding determination of the ACC and the ST ON control is automatically switched.

Similarly, in the processing of the control for turning ON the ST line when automatically switching the time sequential order of welding determination for the ACC line and control for turning ON the ST line, as shown in the flow chart in FIG. 37, the remote starter 10 at first compares the delay time Ta to welding determination for the ACC line and the prespecified threshold A (step S3102). When Ta>A, the processing shifts to the step S2401, and when Ta≦A, the processing shifts to the step S1501.

Figure 38:
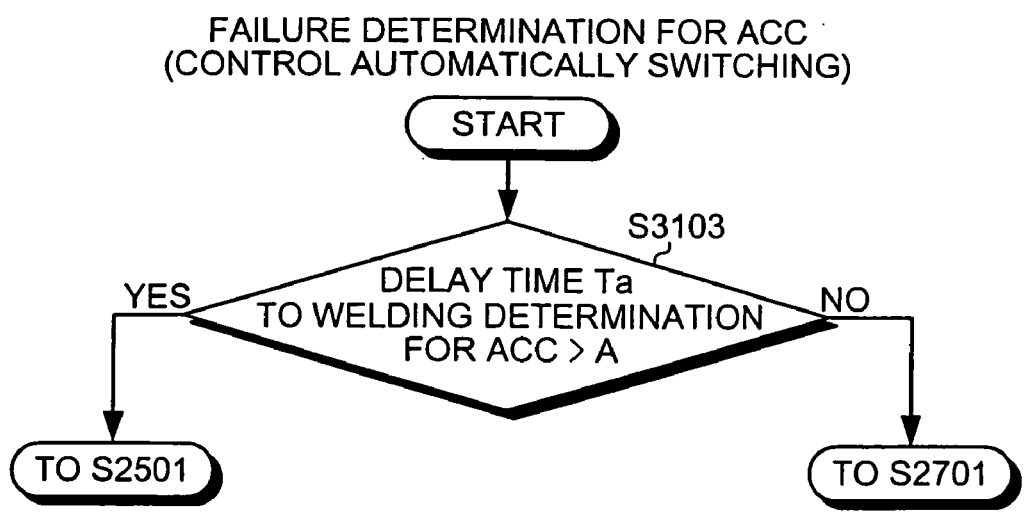
FIG. 38 is a flow chart of a process procedure for performing failure determination of the ACC in which the order of performing the welding determination of the ACC and the ST ON control is automatically switched.

Also in the processing of failure determination for the ACC line when automatically switching the time sequential order of welding determination for the ACC line and control for turning ON the ST line, as shown in the flow chart in FIG. 38, the remote starter 10 compares the delay time Ta to welding determination for the ACC line and the prespecified threshold A (step S3103). When Ta>A, the processing shifts to the step S2501, otherwise when Ta≦A, the processing shifts to the step S2701.

As described above, with the remote starter according to the first embodiment, by connecting the accessory switch SWa and the ignition switch SWi to the sub-relay RL1 and also connecting the starter switch SWs to the sub-relay RL2, when the starter switch SWs is in a welded state, the sub-relay RL2 is turned OFF, whereby a period of time that the accessory switch SWa and the starter switch SWs are simultaneously ON can be reduced, or such situation can be prevented from occurring.

Also ordinary control for the accessory switch SWa and the ignition switch SWi can be continued even when the starter switch SWs is in a welded state. Further, overrunning of the starter motor 32 (a state in which the starter motor continues turning after the engine is started) can be avoided.

In addition, when the accessory switch SWa is in a welded state, by controlling for turning OFF the starter switch SWs performing the control for turning ON the starter switch SWs, a period of time that the accessory switch SWa and the starter switch SWs are simultaneously ON can be reduced, or such situation can be prevented from occurring.

Also by enabling to set a period of time until the welding determination for the accessory switch SWa, erroneous detection in welding determination can be prevented, and also a period of time until the control for turning ON the starter switch SWs (starting the engine) can be reduced.

Further, by allowing the time sequential order between welding determination for the accessory switch SWa and control for turning ON the starter switch SWa to be selected freely or automatically based on a period of standby time until welding determination, start control suitable to connecting conditions of in-vehicle electric equipment can be achieved.

It is to be noted that the processing when the starter switch is in a welded state and the processing when the accessory switch is in a welded state are described individually for the purpose of clarifying description in the first embodiment, however, it is needless to say that it is desirable to employ in combination the processing when the starter switch is in a welded state and the processing when the accessory switch is in a welded state.

In addition, although the first embodiment is described by taking a remote starter for providing start control based on an instruction for remote start from the transmitter 28 as an example, the present invention is not limited to this configuration and can widely be applied to start controls of a vehicle by means of relay switches, such as automatic starting based on a prespecified schedule or starting of a vehicle without operating the ignition key.

Second Embodiment

Figure 39A:
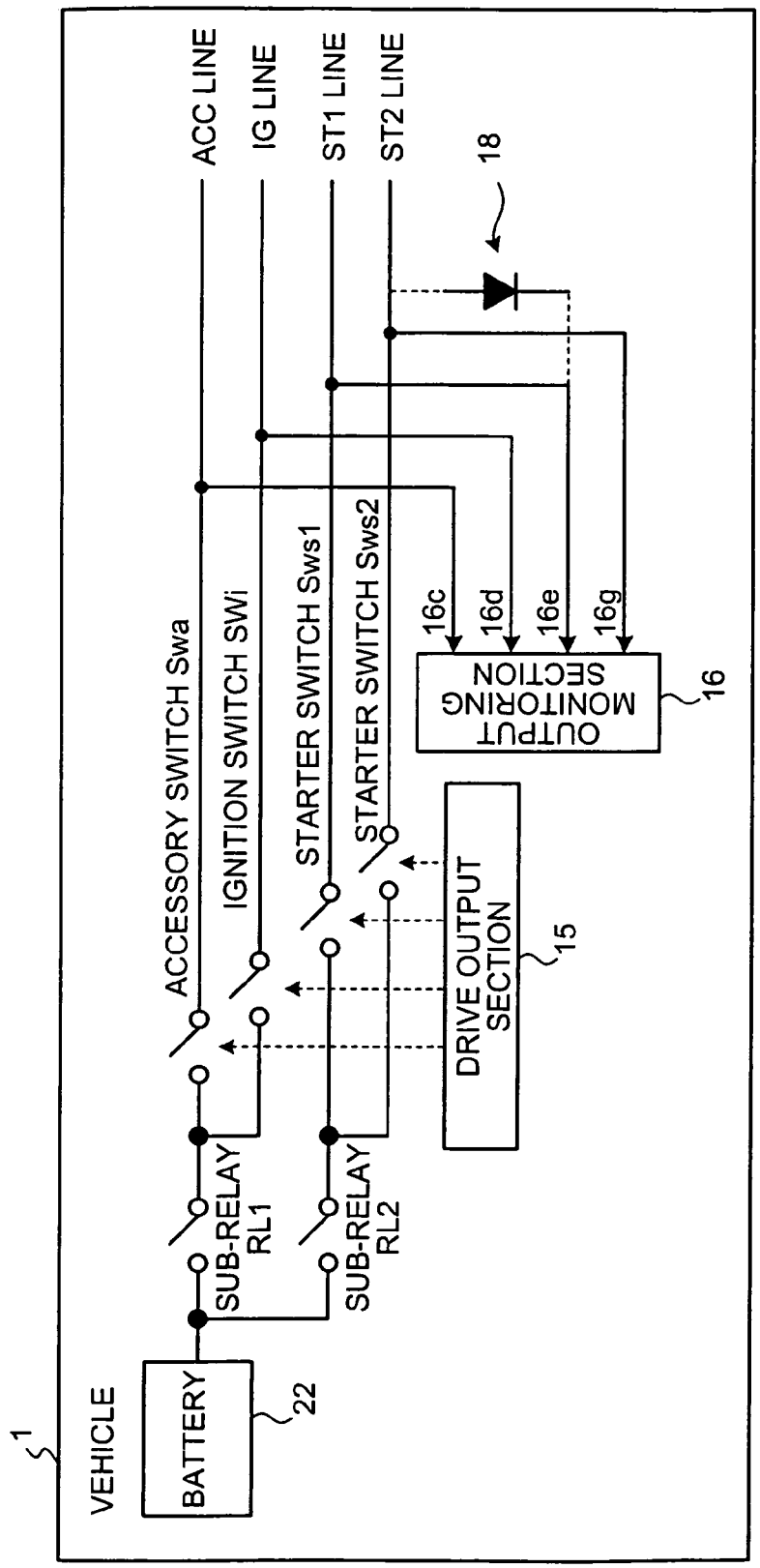
FIGS. 39A and 39B are schematics for explaining how versatility can be improved.
Figure 39B:
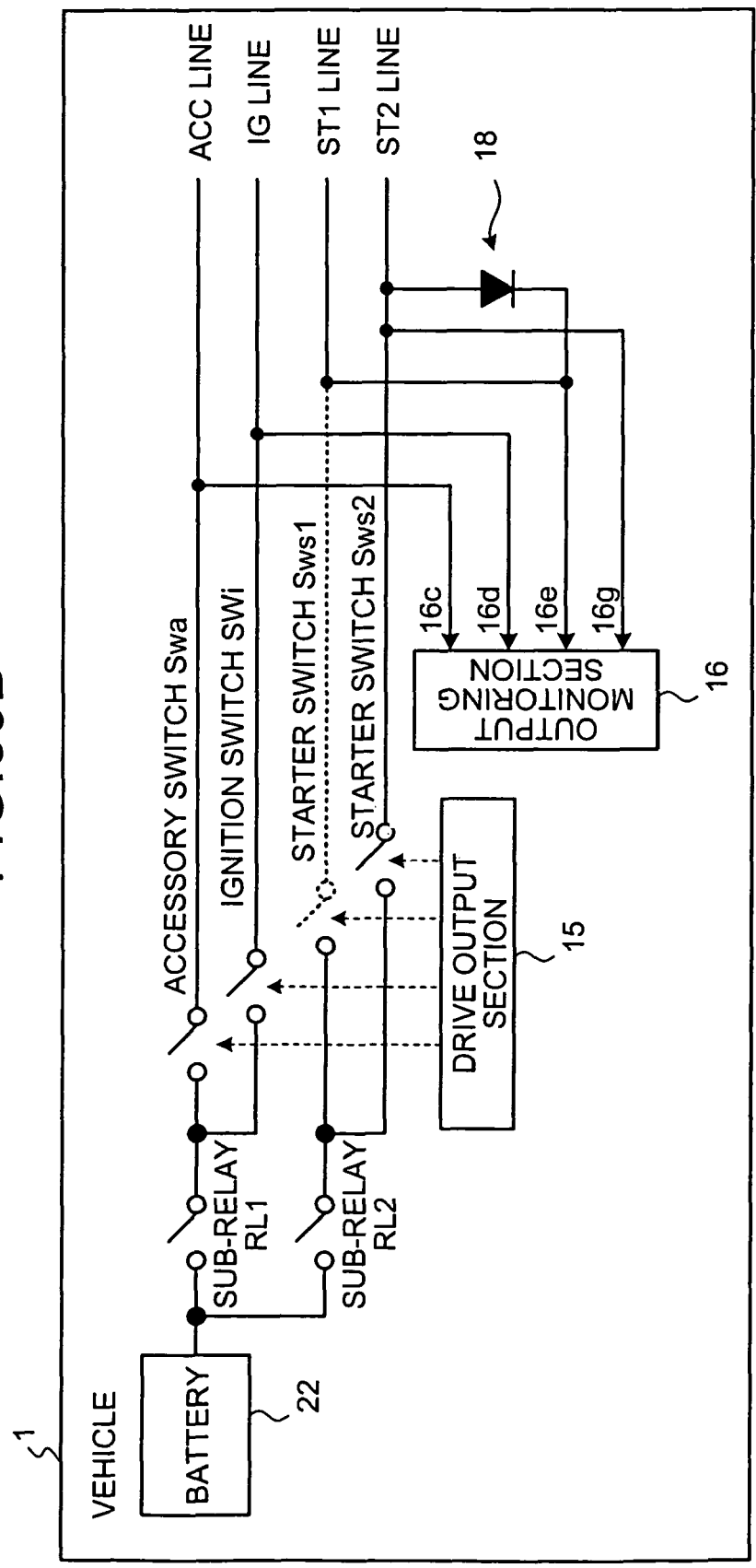

At first, outline of improvement in versatility in the present invention is described with reference to FIGS. 39A and 39B. In each of the figures, a remote controller is provided in a vehicle 1, and has an ignition system line including an accessory (ACC) line, an ignition (IG) line, a starter 1 (ST1) line and a starter 2 (ST2) line.

The accessory line is a path for supplying power to accessory switch SWa. The ignition line is a path for supplying power to ignition control device and is controlled by an ignition switch SWi.

The starter 2 line is a path for supplying power to a starting device (cell motor) of an engine and is controlled by a starter switch SWs2. Further, the starter 1 line is a path for supplying information concerning a start control of the engine for controlling other devices and is controlled by a-starter switch SWs1.

A sub-relay RL1 is a failsafe mechanism for disconnecting power to the accessory switch SWa and ignition switch SWi, while a sub-relay RL2 is a failsafe mechanism for cutting off power to the starter switch SWs1 and starter switch SWs2.

The drive output section 15 is a unit for providing ON/OFF control over the accessory switch SWa, ignition switch SWi, starter switch SWs1, starter switch SWs2, sub-relay RL1 and sub-relay RL2 utilizing the voltage in a battery 22.

Additionally, in order to execute welding determination and open determination for each switch, the output monitoring section 16 acquires output from ignition line switches including the accessory switch SWa, ignition More specifically, the output monitoring section 16 acquires output from the accessory switch SWa with a terminal 16c, that from the ignition switch SWi with a terminal 16d, that from starter switch SWs1 with a terminal 16e, and that from starter switch SWs2 with a terminal 16g respectively.

When the remote start device is provided in a vehicle using both the starter line 1 and starter line 2, the starter switch SWs1 is necessary, and the output monitoring section 16 acquires output from the starter switch SWs1 with a terminal 16e.

In the meantime, when the remote start device is provided in a vehicle using only the starter line 2 (not using the starter line 1), the starter switch SWs1 is not necessary. Thus, in the present invention, when the starter switch SWs1 is not necessary, cost reduction is realized by omitting the starter switch SWs1.

Further, when the starter switch SWs1 is omitted, the terminal 16e is connected to the starter switch SWs2 via an auxiliary circuit 18. Therefore, not output from the starter switch SWs1 but that from the starter switch SWs2, namely the same output as that from the terminal 16g can be obtained from the terminal 16e.

As described above, when the starter switch SWs1 is deleted, the state of another switch (in this case, the starter switch SWs2) is inputted as that of the starter switch SWs1, and thereby determination of the state of the starter switch SWs1 can be virtually executed, which enables to prevent an error from occurring.

Figure 40:
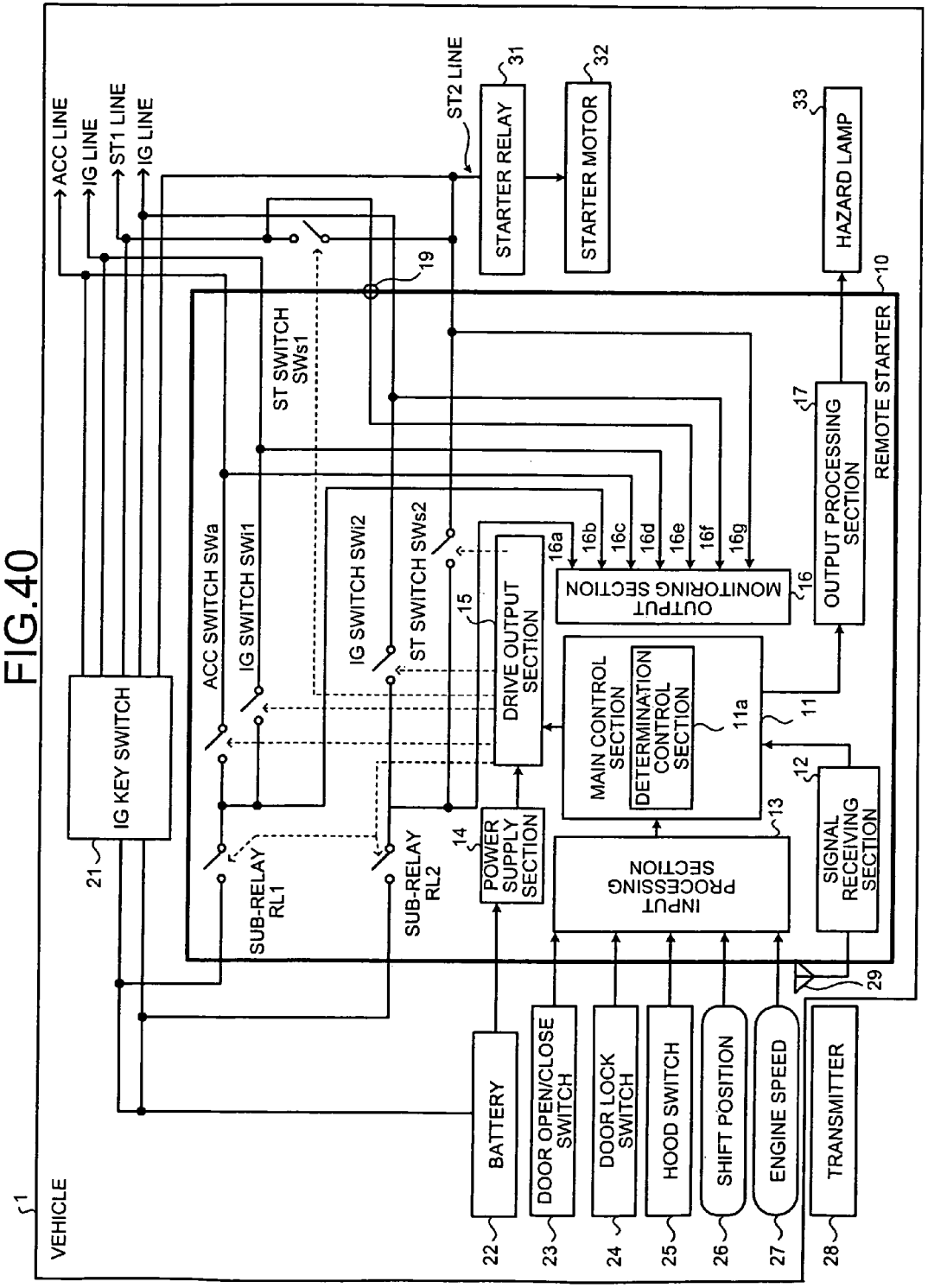
FIG. 40 is a block diagram of a configuration with a starter 1 line.

Next a specific configuration example of the remote starter according to Embodiment 2 in the present invention is described. At first, a general block diagram illustrating an example of configuration in which a starter 1 line is required is shown in FIG. 40. As shown in the figure, the remote starter 10 is provided in the vehicle 1, is connected to a battery 22, a door open/close switch 23, a door lock switch 24, a hood switch 25, an antenna 29, a starter relay 31, and a hazard lamp 33, and acquires data for the shift position 26 and the engine speed 27.

The battery 22 is further connected to an ignition (IG) key switch 21, and the starter relay 31 is further connected to a starter motor 32.

The IG key switch 21 controls the accessory line, ignition 1 line, starter 1 line, ignition 2 line and starter 2 line, when a driver of the vehicle inserts an ignition key to manually operates the lines. It is to be noted that configuration is shown herein in which two lines of the ignition line are also provided in addition to two lines of the starter line.

Two lines of the ignition line are provided because one line is for inputting a signal to an ECU related to the engine control and another line is for inputting a signal to another ECU related to any part other than the engine control (for instance, ECU for controlling a wiper or a door lock). With this configuration, even when a trouble happens in any part other than the engine control ECU, the engine control ECU advantageously has no relation with the trouble.

The door open/close switch 23 is a switch dealing with the open/close state of the door of the vehicle, and the door lock switch 24 is a switch dealing with the locking state of the door of the vehicle. Further the hood open/close switch 25 is a switch dealing with the open/close state of the hood.

The antenna 29 receives a signal from the transmitter 28 (for instance, a remote key) owned by a driver of the vehicle, and outputs the signal to the remote starter 10. Further the starter relay 31 is connected to the starter 2 line, and is a control switch for operating the starter motor 32 when the engine is started. The hazard lamp 33 provides alarms concerning behaviors of the vehicle to people and drivers of vehicles around the vehicle by simultaneously flickering direction indicators in the right and left sides of the vehicle, but is also used as a notifying unit for notifying a result of control for remote start to a driver of the vehicle in this embodiment 2.

The remote starter 10 includes the main control section 11, a signal receiving section 12, an input processing section 13, a power supply section 14, a drive output section 15, an output monitoring section 16, an output processing section 17, a sub-relay RL1, a sub-relay RL2, ignition line switches (an accessory (ACC) switch SWa, an ignition (IG) switches SWi1, SWi2, and a starter (ST) switch SWs2), and an external terminal 19.

The external connection terminal 19 is, in FIG. 40, connected to the starter switch SWs1 provided outside. The starter switch SWs1 is provided outside so that the starter switch SWs1 can be provided only when the starter switch SWs1 is required.

The remote starter 10 has the same functions as those of the IG key switch 21 by controlling the accessory switch SWa, ignition switches SWi1, SWi2, and starter switches SWs1, SWs2.

The signal receiving section 12 outputs a signal received by the antenna 29 to the main control section 11. Further, the input processing section 13 outputs data for states of the door open/close switch 23, the door lock switch 24, and the hood switch 25 as well as data for the shift position 26 and the engine speed 27 to the main control section 11.

The power supply section 14 acquires necessary power from the battery 22 required for ON/OFF control by the drive output section 15 over the accessory switch SWa, ignition switches SWi1, swi2, starter switches SWs1, SWs2, a sub-relay RL1, and a sub-relay RL2, and supplies the power thereto. The output processing section 17 is a unit for controlling the hazard lamp 33.

The output monitoring section 16 monitors outputs from the sub-relays RL1, RL2, accessory switch SWa, ignition switch SWi, and starter switch SWs, and outputs the data to the main control section 11.

More specifically, the output monitoring section 16 acquires output from the sub-relay RL1 with a terminal 16a and that from the sub-relay RL2 with a terminal 16b. Further the output monitoring section 16 acquires output from the accessory switch SWa with a terminal 16c, that from the ignition switch SWi1 with the terminal 16d, that from starter switch SWs1 with a terminal 16e, that from the ignition switch SWi2 with a terminal 16f, and that from the starter switch SWs2 with the terminal 16g respectively.

The main control section 11 controls the remote starter 10 as a whole, and executes signal output to the drive output section 15 and the output processing section 17 based on the signal input from the signal receiving section 12, the input processing section 13, and the output monitoring section 16.

More specifically, the main control section 11 executes start control by controlling the accessory switch SWa, ignition switches SWi1, SW12, and starter switches SWs1, SWs2 when the signal receiving section 12 receives an instruction for remote start from the transmitter 28. When a signal inputted from the input processing section 13 indicates opening of a door, releasing of a lock, opening of a hood and the like, the start control is not executed. Similarly, when the shift position 26 is other than parking, the start control is not provided.

The engine speed 27 is used for determining whether the engine has been started after the starter switch SWs2 is turned ON. Further the engine speed 27 can also be used for determining whether warming up of the engine has been finished when control is provided for remotely starting and then automatically stopping rotation of the engine after warming up of the engine is finished.

Figure 41:
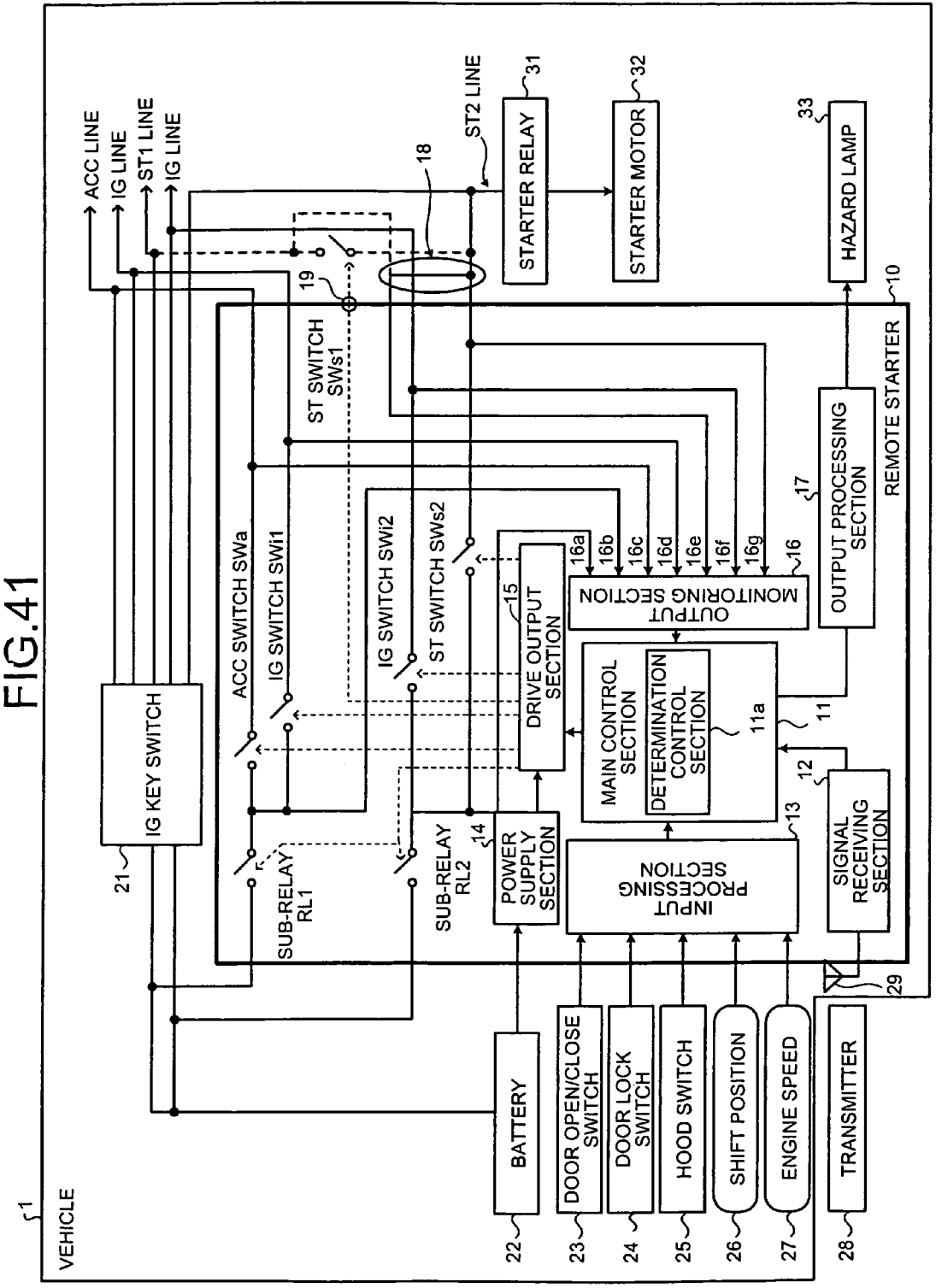
FIG. 41 is a block diagram of a configuration without the starter 1 line.
Figure 42:
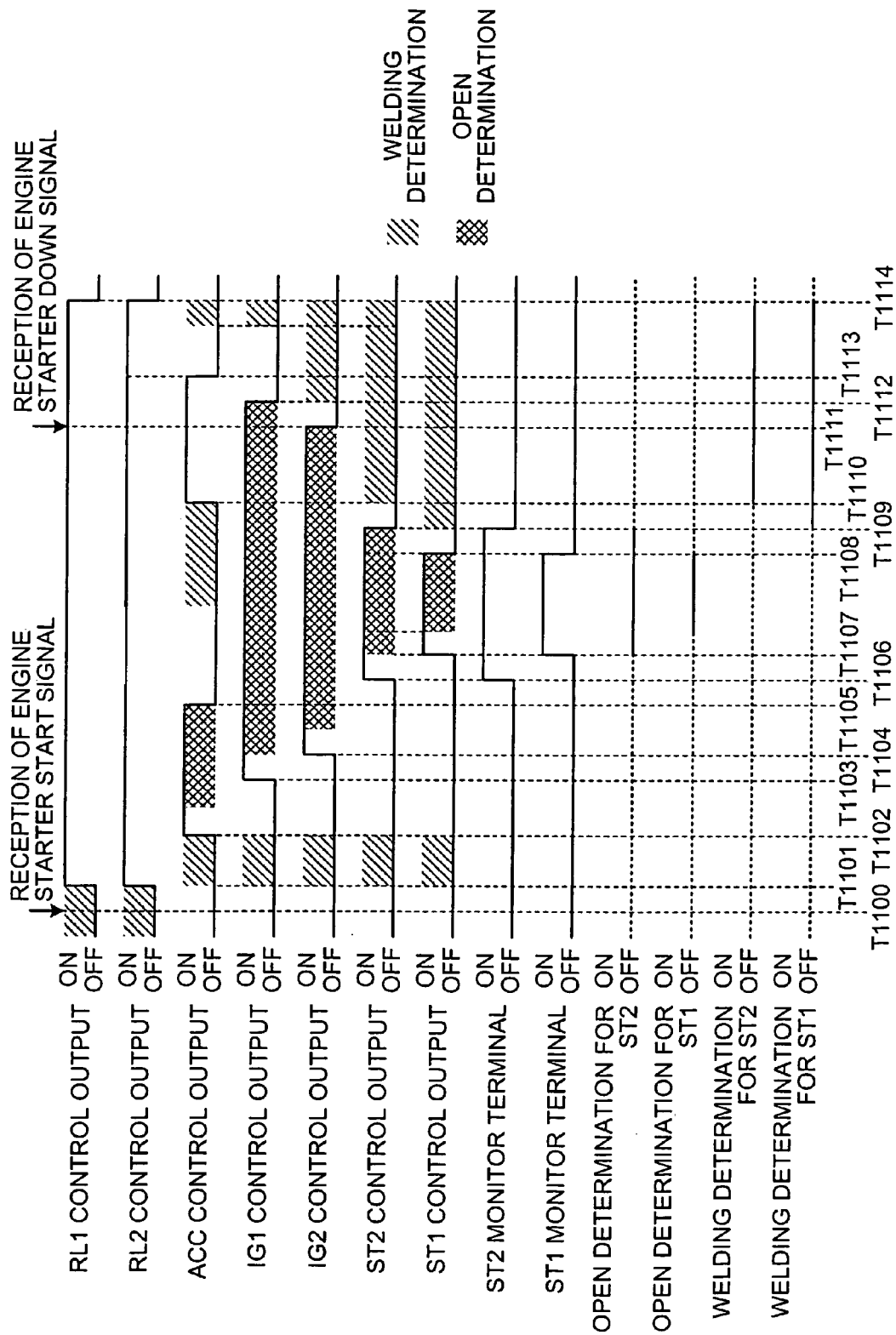
FIG. 42 is a schematic for explaining control output and the state of each switch when a starter switch SWs1 is connected.

FIG. 41 is a general block diagram showing an example of configuration in which the starter 1 line is not required. Though the starter switch SWs1 is connected to the external terminal 19 in the configuration shown in FIG. 40, the external terminal 19 is connected to the starter 2 line via the auxiliary circuit 18 in the configuration shown in FIG. 41. The configuration shown in FIG. 41 other than that described above is the same as the configuration shown in FIG. 40.

Thus, the configuration can be easily switched over by only changing a section to be connected to the external terminal 19. Further, when the starter 1 line is not required, cost reduction is realized by omitting the starter switch SWs1 itself.

Next, control output to each switch and a state of each switch are described below with reference to FIG. 42 to FIG. 45. At first, a case in which the starter switch SWs1 is connected is described with reference to FIG. 42. It is to be noted that, a signal of IG1 and that of IG2 are not synchronized with each other in FIG. 42 to FIG. 45, the reason for this is that the IG of a peripheral equipment is turned ON or OFF to start an operation thereof in one ignition line, while the IG of the engine system ECU is turned ON or OFF to start an operation thereof in another ignition line, so that a coordinated operation between the engine system ECU and the peripheral equipment is ensured (for inputting a signal to-the engine-related ECU without fail).

When the main control section 11 receives an instruction of remote start (engine starter start signal) from the transmitter 28 at a time point T1100, the main control section 11 determines whether the sub-relay RL1 and sub-relay RL2 are in a welded state, and when the sub-relay RL1 and sub-relay RL2 are not welded, the main control sections turns ON the sub-relay RL1 and sub-relay RL2 (at the time point T1101).

The main control section 11 next determines whether the accessory switch SWa, ignition switches SWi1, SW12, and starter switches SWs1 and SWs2 are in a welded state, and, the main control sections turns ON the accessory switch SWa at a time point T1102. Further, after a passage of a prespecified time after the accessory switch SWa is turned ON, it is determined whether the accessory switch SWa is properly turned ON in response to the turning-ON control (determination of opening for the accessory switch SWa). The prespecified time is provided to prevent an erroneous determination due to chattering generated along with the switching from OFF to ON of the accessory switch SWa. Similarly, when each control output is switched from OFF to ON or ON to OFF in FIG. 42, a delay time to welding determination or open determination is started takes chattering due to the change in switching into consideration.

Subsequently, the ignition switch SWi1 is turned ON at a time point T1103, and it is determined whether the ignition switch SWi1 is open. Further, the ignition switch SWi2 is turned ON at a time point T1104, and it is determined whether the ignition switch SWi2 is open.

Then the accessory switch SWa is turned OFF at a time point T1105, and it is determined after a passage of a prespecified time whether the accessory switch SWa is in a welded state. The prespecified time in this case takes into consideration a time necessary for removing an influence of residual electric charge after the accessory switch SWa is turned OFF, namely, a time, for instance, necessary for discharging of a capacitor. Then the starter switch SWs2 is turned ON at a time point T1106, and it is determined whether the starter switch SWs2 is open. Further, the starter switch SWs1 is turned ON at a time point T1107, and it is determined whether the starter switch SWs1 is open.

Then the engine is started when the starter switch SWs2 is turned ON, so that the starter switch SWs1 is turned OFF at a time point T1108 and the starter switch SWs2 is also turned OFF at a time point T1109, and then it is determined whether each of the starter switches is in a welded state. Further, the accessory switch SWa is turned ON at a time point T1110.

Subsequently, each switch is provided with ordinary controls. In the figure, as an instruction of terminating remote start (an engine starter termination signal) is received from the transmitter 28, the ignition switch SWi2 is turned OFF at a time point T1111 and the ignition switch SWi1 is also turned OFF at a time point T1112. Further, the accessory switch SWa is turned OFF at a time point T1113 and the sub-relay RL1 and sub-relay RL2 are turned OFF at a time point T1114.

In this step, the state of starter switch SWs2 obtained by the output monitoring section 16 as a result that the starter switch SWs2 is turned ON (at the time point T1106) (the state of the switch inputted in the terminal 16g) is the state of ON, while the state of starter switch SWs2 obtained by the output monitoring section 16 as a result that the starter switch SWs2 is turned OFF (at the time point T1109) is the state of OFF. Namely, the state of control over the switch is the same as the state of the switch.

Similarly, the state of starter switch SWs1 obtained by the output monitoring section 16 as a result that the starter switch SWs1 is turned ON (at the time point T1107) (the state of the switch inputted in the terminal 16e ) is the state of ON, while the state of starter switch SWs1 obtained by the output monitoring section 16 as a result that the starter switch SWs1 is turned OFF (at the time point T1108) is the state of OFF. Namely, the state of control over the switch is the same as the state of the switch.

Figure 43:
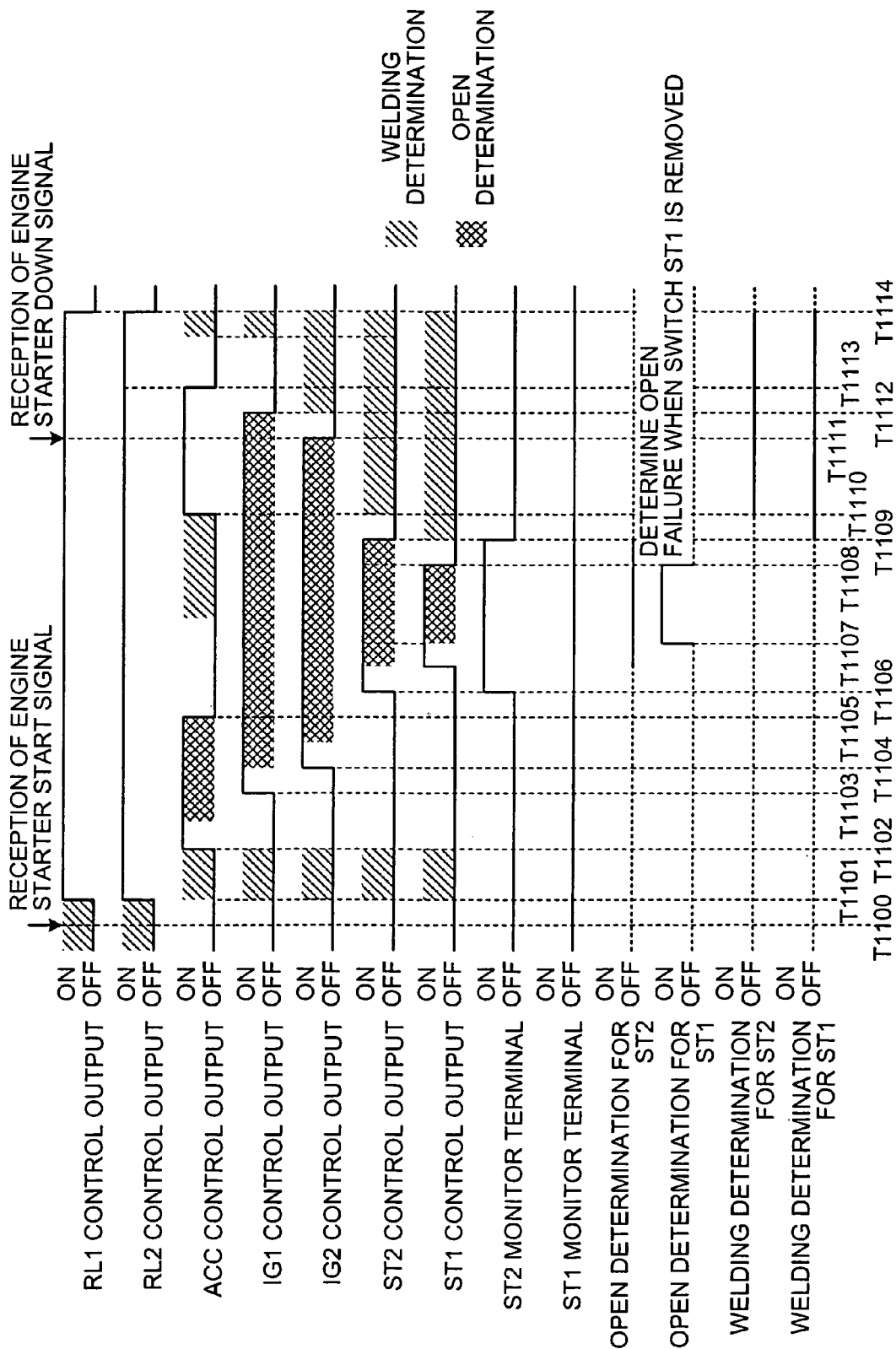
FIG. 43 is a schematic for explaining control output and the state of each switch when the starter switch SWs1 is removed.

Herein, when the starter switch SWs1 is simply deleted, control output to each switch and the state of each switch are as shown in FIG. 43. In the figure, controls to each switch are the same as those in FIG. 42.

Since the starter switch SWs1 does not exist, even if the starter switch SWs1 is turned ON (at the time point T1107), the state of starter switch SWs1 obtained by the output monitoring section 16 (the state of the switch inputted in the terminal 16e) remains the state of OFF. The main control section 11 therefore determines that the starter switch SWs1 has an open failure.

Figure 44:
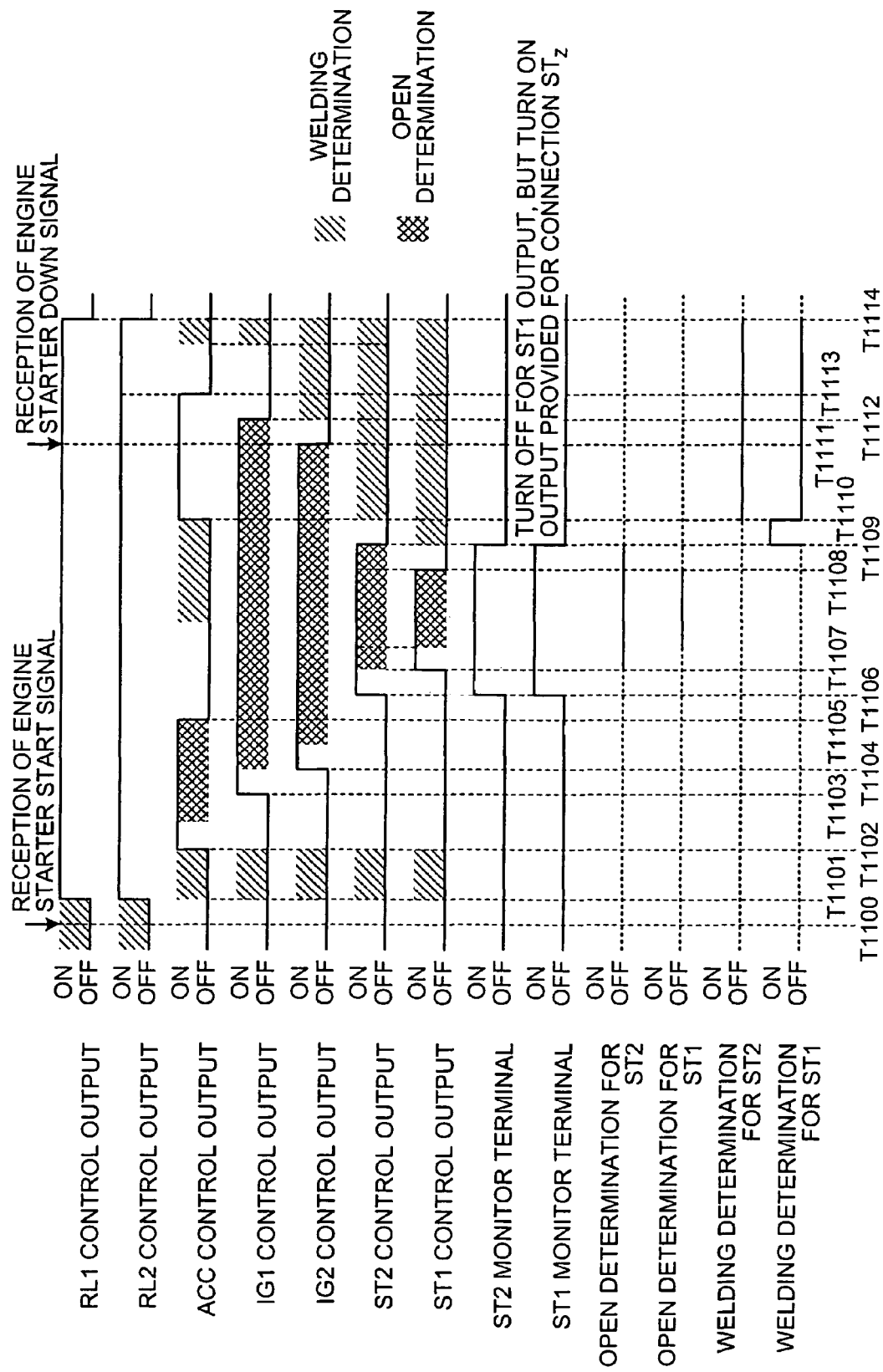
FIG. 44 is a schematic for explaining control output and the state of each switch when an external connection terminal is connected to a starter 2 line.

Then the external terminal 19 is connected to the starter 2 line as shown in FIG. 41, control output to each switch and the state of each switch are as shown in FIG. 44. It is to be noted that controls to each switch in FIG. 41 are the same as those in FIG. 42.

As the external terminal 19 is connected to the starter 2 line, not only the state of starter switch SWs2 obtained by the output monitoring section 16 (the state of the switch inputted in the terminal 16g) but also the state of the switch inputted in the terminal 16e are the state of ON as a result that the starter switch SWs2 is turned ON (at the time point T1106), while not only the state of starter switch SWs2 obtained by the output monitoring section 16 (the state of the switch inputted in the terminal 16g) but also the state of the switch inputted in the terminal 16e are the state of OFF as a result that the starter switch SWs2 is turned OFF (at a time point T1109).

Therefore it is not determined that the starter switch SWs1 has an open failure as shown in FIG. 43. However, the time until welding determination is started after the starter switch SWs1 is switched from ON to OFF (from the time point T1108 to the time point T1109) and the time until welding determination is started after the starter switch SWs2 is switched from ON to OFF (from the time point T1109 to the time point T1110) are set to be the same length for the purpose of preventing chattering. As the time point when the starter switch SWs1 is turned OFF is earlier compared to the time point when the starter switch SWs2 is turned OFF, the timing for welding determination for the starter switch SWs1 is earlier compared to the timing for welding determination for the starter switch SWs2, and thereby it is determined that the starter switch SWs1 has a welding failure.

The remote starter 10 is thus set to have the same timing for determination on the starter switch SWs1 as that for determination on other ignition line switch (more specifically, a switch connected to a terminal for monitoring the starter switch SWs1).

For instance, as shown in this embodiment, when the starter switch SWs2 is connected to the terminal 16e, the main control section 11 changes the timing for determination on the starter switch SWs1 with a determination control section 11a for providing open determination and welding determination, to be synchronized with the timing for determination for the starter switch SWs2.

Figure 45:
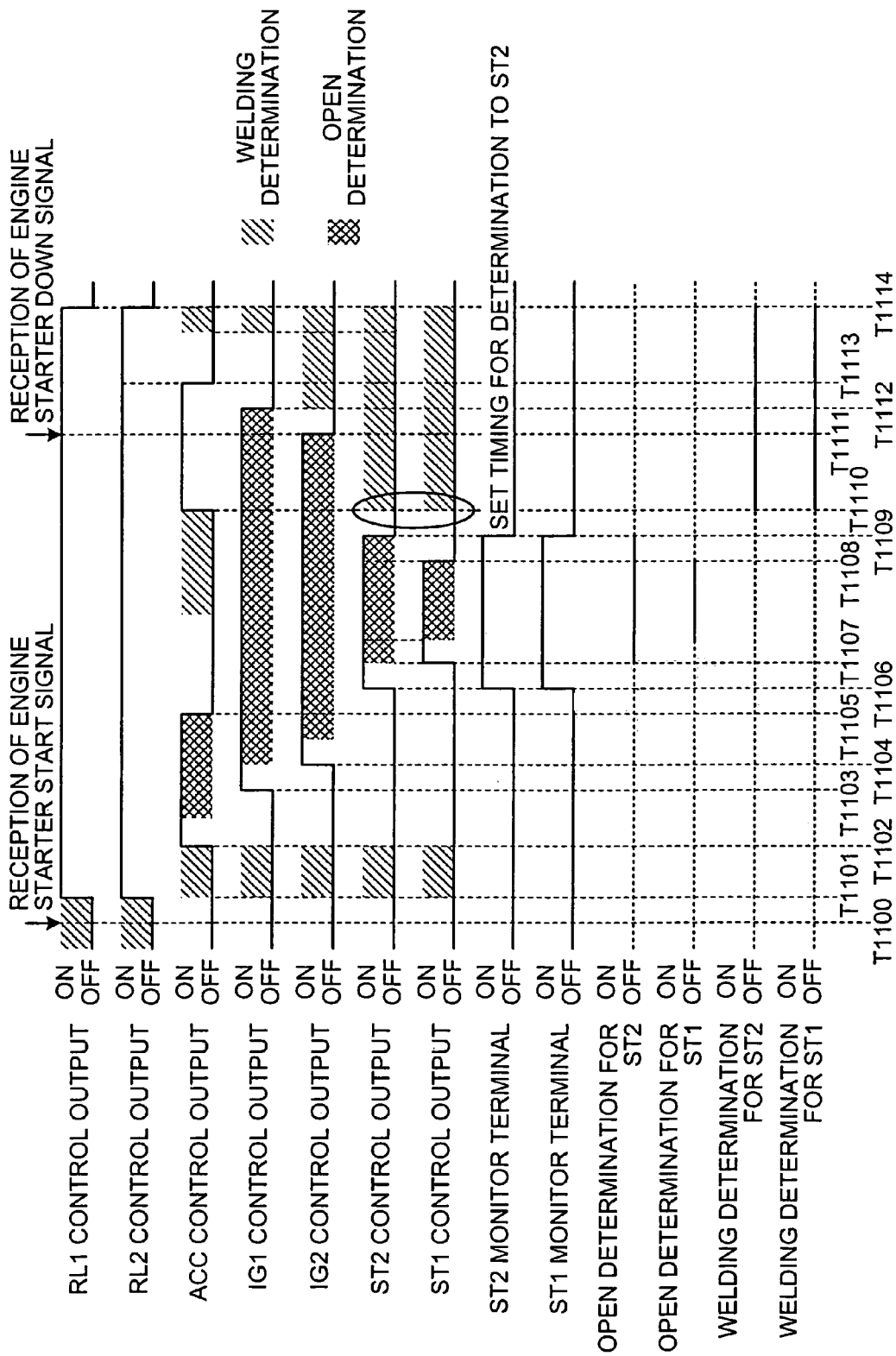
FIG. 45 is a schematic for explaining control output and the state of each switch when timing for determination is changed.

As a result, control output to each switch and the state of each switch turn out to be as shown in FIG. 45. In the figure, though the control to each switch is the same as that in FIG. 42, it is possible to prevent erroneous determination of an open failure as well as erroneous determination of a welding failure, because the timing for determination for the starter switch SWs1 is synchronized with that for the starter switch SWs2.

As described above, by changing the timing for determination, the remote starter 10 can be used regardless of the configuration of a vehicle even when control output is the same, and improvement in versatility can be easily obtained.

It is to be noted that, when the timing for determination is changed, the timing may be automatically set to that for the connected switch (herein the starter switch SWs2), or may be set to a delayed one between the connected switch and the original switch (herein the starter switch SWs1).

Figure 46:
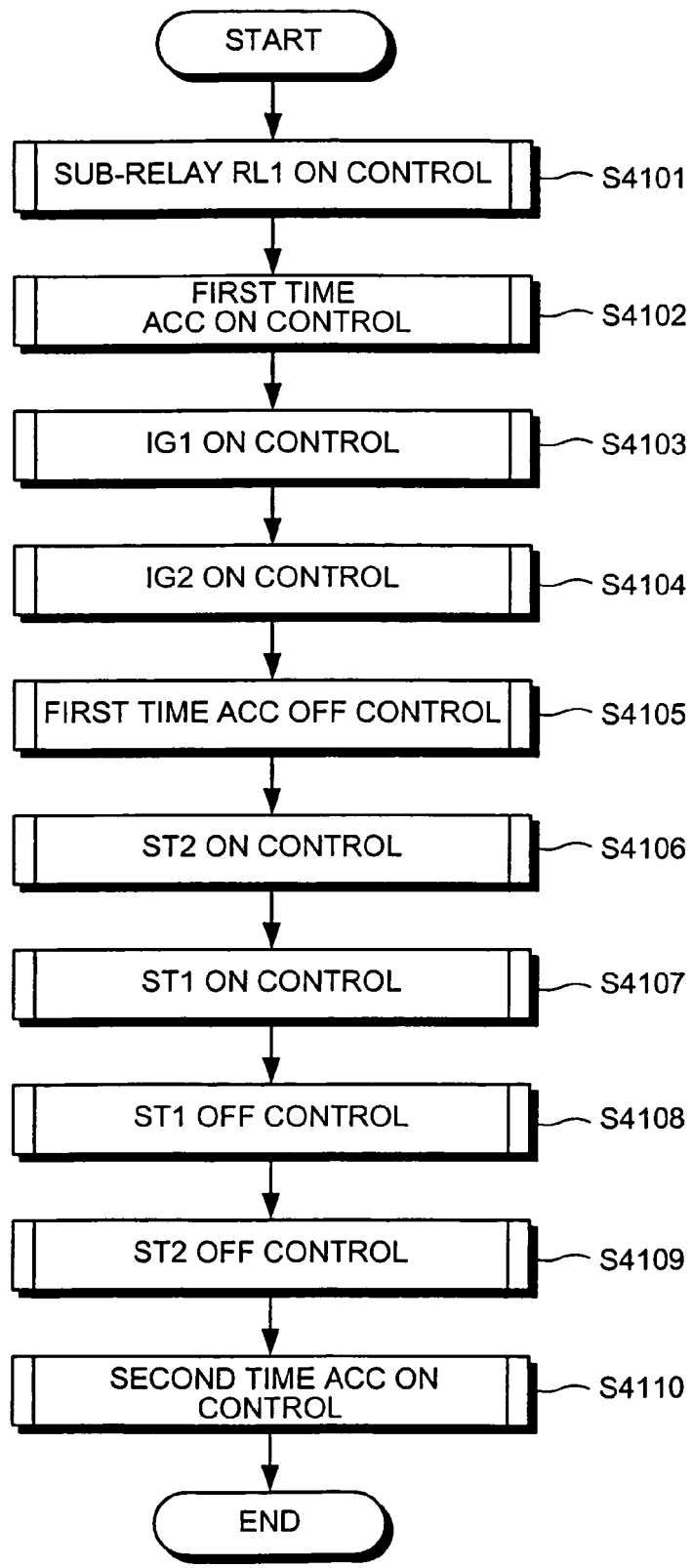
FIG. 46 is a flow chart of a process procedure of remote start control.

Next, processing operation of the remote starter 10 is described. FIG. 46 is a flow chart for illustrating processes to be executed when the remote starter 10 receives an instruction for remote start from the transmitter 28. The processing flow shown in this figure is to be executed repeatedly during start control by the remote starter 10.

As shown in FIG. 46, when the remote starter 10 receives an instruction for remote start, the sub-relays RL1 and RL2 are turned ON at the beginning (step S4101). Subsequently, control for turning ON the ACC line (accessory switch SWa) first time (step S4102), control for turning ON the IG1 line (ignition switch SWi1) (step S4103) and control for turning ON the IG2 line (ignition switch SWi2) (step S4104) are executed.

After control for turning OFF the ACC line first time (step S4105) is executed, control for turning ON the ST2 line (starter switch SWs2) (step S4106) and control for turning ON the ST1 line (starter-switch SWs1) (step S4107) are executed.

Further, after control for turning OFF the ST1 line (starter switch SWs1) (step S4108) and control for turning OFF the ST2 line (starter switch SWs2) (step S4109) are executed, control for turning ON the ACC line second time (step S4110) is executed and the processing is terminated.

Figure 47:
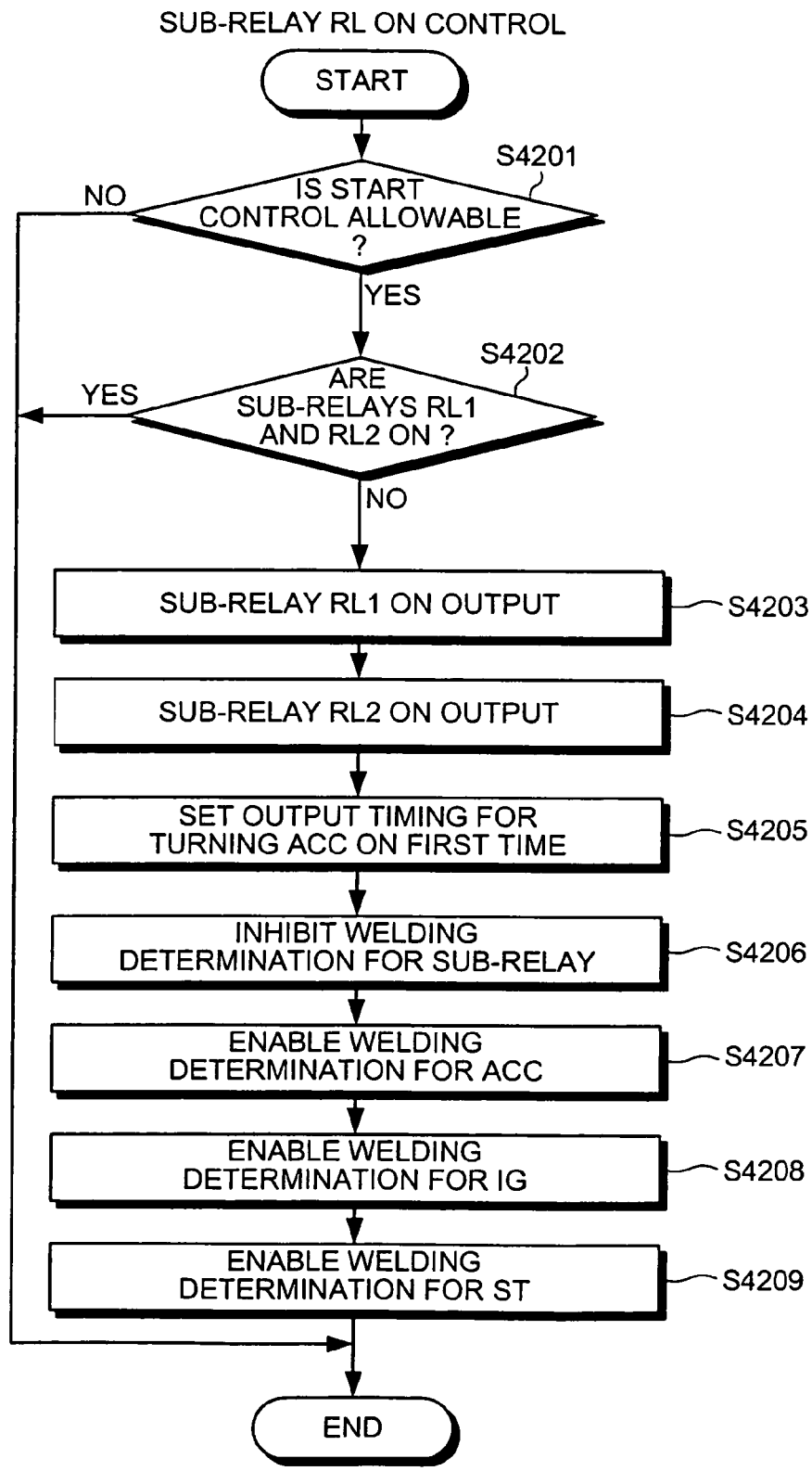
FIG. 47 is a flow chart of a sub-relay RL ON control shown in FIG. 46.

Next, each process illustrated in FIG. 46 is described in detail. FIG. 47 is a flow chart for illustrating details of the processing during the control for turning ON the sub-relays RL shown as step S4101 in FIG. 46. In this processing flow, at the beginning, the remote starter 10 determines whether start control is allowable (step S4201).

When it is determined that the start control is allowable (step S4201, Yes), it is determined whether both the sub-relays RL1 and RL2 are ON (step S4202).

When the sub-relays RL1 and RL2 are not ON (step S4202, No), the drive output section 15 turns ON the sub-relay RL1 (step S4203) and turns ON the sub-relay RL2 (step S4204).

Then, control timing for turning ON the ACC line first time (step S4102 in FIG. 46) is set (step S4205) and welding determination for the sub-relays RL1 and RL2 is inhibited (step S4206).

In addition, welding determination for the ACC line (accessory switch SWa) is enabled (step S4207), welding determination for the IG1 line (ignition switch SWi1) and the IG2 line (ignition switch SWi2) is enabled (step S4208) and welding determination for the ST1 line (starter switch SWs1) and the ST2 line (starter switch SWs2) is enabled (step S4209).

After this step S4209 is finished, or when the start control is not allowable (step S4201, No), or when the sub-relays RL1 and RL2 are ON (step S4202, Yes), the remote starter 10 terminates the processing of turning ON the sub-relays RL and shifts to the control for turning ON the ACC line first time shown as step S4102 in FIG. 46.

Figure 48:
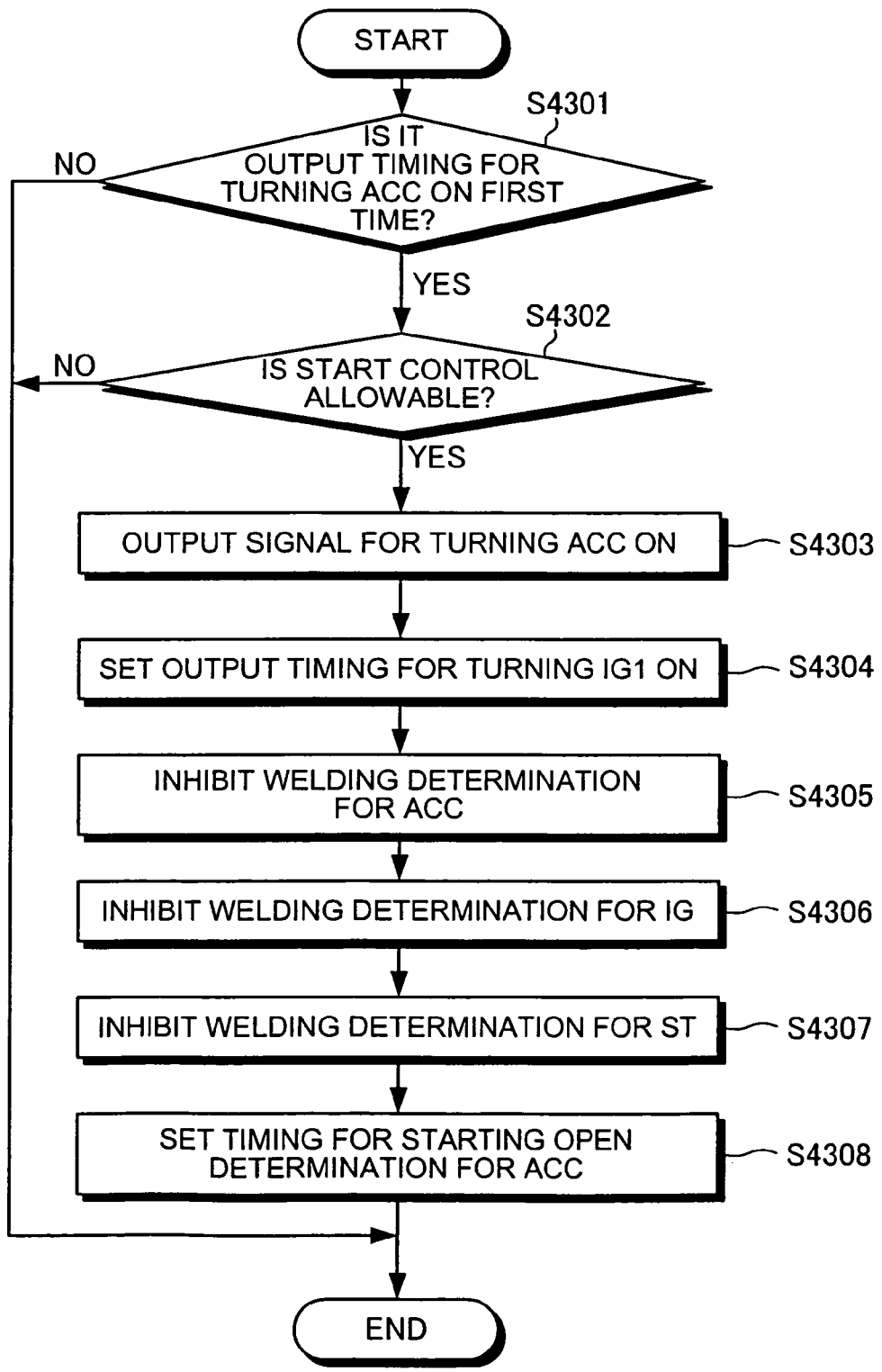
FIG. 48 is a flow chart of a first time ACC ON control shown in FIG. 46.

FIG. 48 is a flow chart for illustrating details of the processing during the control for turning ON the ACC line first time shown as step S4102 in FIG. 46. In this processing flow, at the beginning, the remote starter 10 determines whether the current point of time is the control timing for turning ON the ACC line first time (step S4301).

When it is determined that the current point of time is the control timing for turning ON the ACC line first time (step S4301, Yes), then the remote starter 10 determines whether start control is allowable (step S4302).

When the start control is allowable (step S4302, Yes), the drive output section 15 turns ON the ACC switch SWa to output a signal for turning ON the ACC line (step S4303).

In the next step, control timing for turning ON the IG1 line (step S4103 in FIG. 46) is set (step S4304), and welding determination for the ACC line is inhibited (step S4305). Similarly, welding determination for the IG1 line and the IG2 line is inhibited (step S4306) and welding determination for the ST1 line and the ST2 line is inhibited (step S4307).

After that, the remote starter 10 sets the timing for starting open determination for the ACC line (step S4308). This timing for starting the determination is set in consideration to chattering caused by change in switching as described above. Specifically, it is advantageous to set the timing approximately 50 milliseconds to 100 milliseconds later than the control for turning ON the ACC line in step S4303. In the following description, it is assumed that the timing for starting the determination is set in consideration to chattering as described above.

After the step S4308 is finished, or when it is determined that the current point of time is not the control timing for turning ON the ACC line first time (step S4301, No), or when the start control is not allowable (step S4302, No), the remote starter 10 terminates the control for turning ON the ACC line first time and shifts to the control for turning ON the IG1 line shown as step S4103 in FIG. 46.

Figure 49:
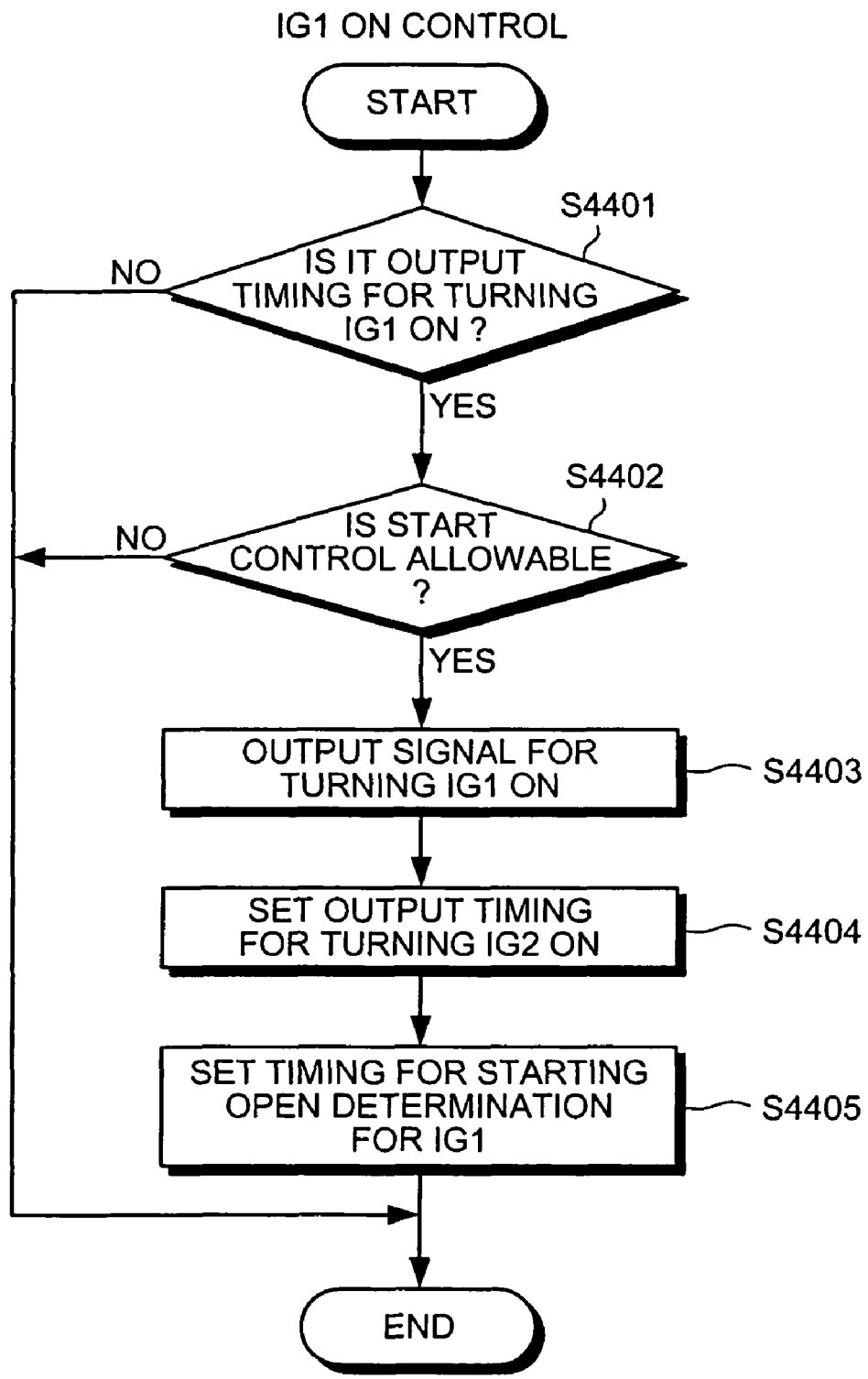
FIG. 49 is a flow chart of an IG1 ON control shown in FIG. 46.

FIG. 49 is a flow chart for illustrating details of the processing during the control for turning ON the IG1 line shown as step S4103 in FIG. 46. In this processing flow, at the beginning, the remote starter 10 determines whether the current point of time is the control timing for turning ON the IG1 line (step S4401).

When it is determined that the current point of time is the control timing for turning ON the IG1 line (step S4401, Yes), then the remote starter 10 determines whether start control is allowable (step S4402).

When the start control is allowable (step S4402, Yes), the drive output section 15 turns ON the ignition switch SWi1 to output a signal for turning ON the IG1 line (step S4403).

In the next step, control timing for turning ON the IG2 line (step S4104 in FIG. 46) is set (step S4404), and the timing for starting open determination for the IG1 line is set (step S4405).

After the step S4405 is finished, or when it is determined that the current point of time is not the control timing for turning ON the IG1 line (step S4401, No), or the start control is not allowable (step S4402, No), the remote starter 10 terminates the control for turning ON the IG1 line and shift to the control for turning ON the IG2 line shown as step S4104 in FIG. 46.

Figure 50:
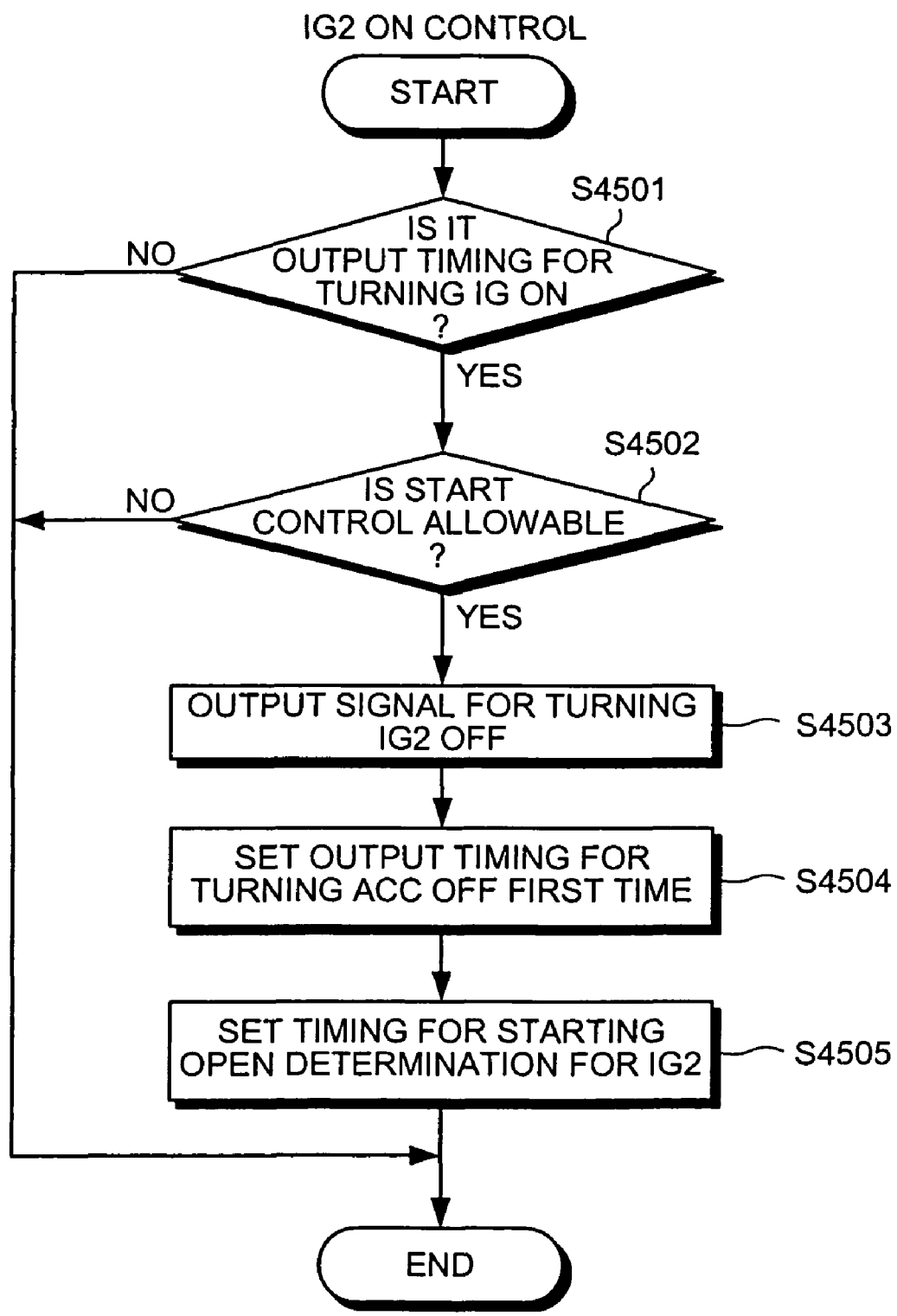
FIG. 50 is a flow chart of an IG2 ON control shown in FIG. 46.

FIG. 50 is a flow chart for illustrating details of the processing during the control for turning ON the IG2 line shown as step S4104 in FIG. 46. In this processing flow, at the beginning, the remote starter 10 determines whether the current point of time is the control timing for turning ON the IG2 line (step S4501).

When it is determined that the current point of time is the control timing for turning ON the IG2 line (step S4501, Yes), then the remote starter 10 determines whether start control is allowable (step S4502).

When the start control is allowable (step S4502, Yes), the drive output section 15 turns ON the ignition switch SWi2 to output a signal for turning ON the IG2 line (step S4503).

In the next step, control timing for turning OFF the ACC line first time (step S4105 in FIG. 46) is set (step S4504), and the timing for starting open determination for the IG2 line is set (step S4505).

After the step S4505 is finished, or when it is determined that the current point of time is not the control timing for turning ON the IG2 line (step S4501, No), or when the start control is not allowable (step S4502, No), the remote starter 10 terminates the control for turning ON the IG2 line and shifts to the control for turning OFF the ACC line first time shown as step S4105 in FIG. 46.

Figure 51:
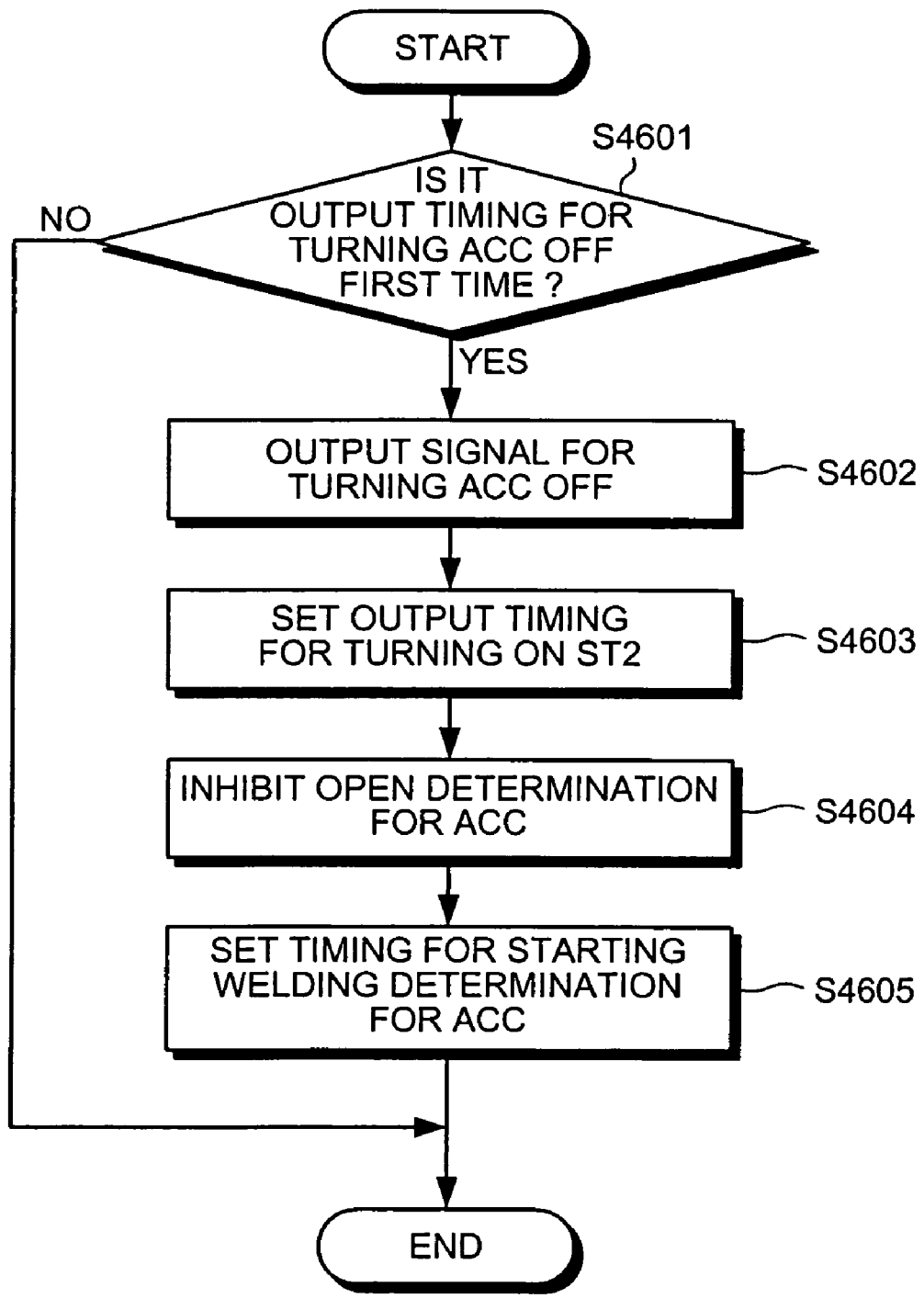
FIG. 51 is a flow chart of a first time ACC OFF control shown in FIG. 46.

FIG. 51 is a flow chart for illustrating details of the processing during the control for turning OFF the ACC line first time shown as step S4105 in FIG. 46. In this processing flow, at the beginning, the remote starter 10 determines whether the current point of time is the control timing for turning OFF the ACC line first time (step S4601).

When it is determined that the current point of time is the control timing for turning OFF the ACC line first time (step S4601, Yes), the drive output section 15 turns OFF the ACC switch SWa to output a signal for turning OFF the ACC line (step S4602).

Then, control timing for turning ON the ST2 line (step S4106 in FIG. 46) is set (step S4603), and open determination for the ACC line is inhibited (step S4604).

After that, the remote starter 10 sets the timing for starting welding determination for the ACC line (step S4605). The timing for starting the determination is set in consideration to influence of residual electric charge as described above.

Although specific time length depends on such as condenser capacity, it is advantageous to set, for instance, approximately 1 second later than the control for turning OFF the ACC line in step S4602. In the following description, it is assumed that the timing for starting the determination is set in consideration to residual electric charge as described above.

After the step S4605 is finished, or when it is determined that the current point of time is not the control timing for turning OFF the ACC line first time (step S4601, No), the remote starter 10 terminates the control for turning OFF the ACC line first time and shifts to the control for turning ON the ST2 line shown as step S4106 in FIG. 46.

Figure 52:
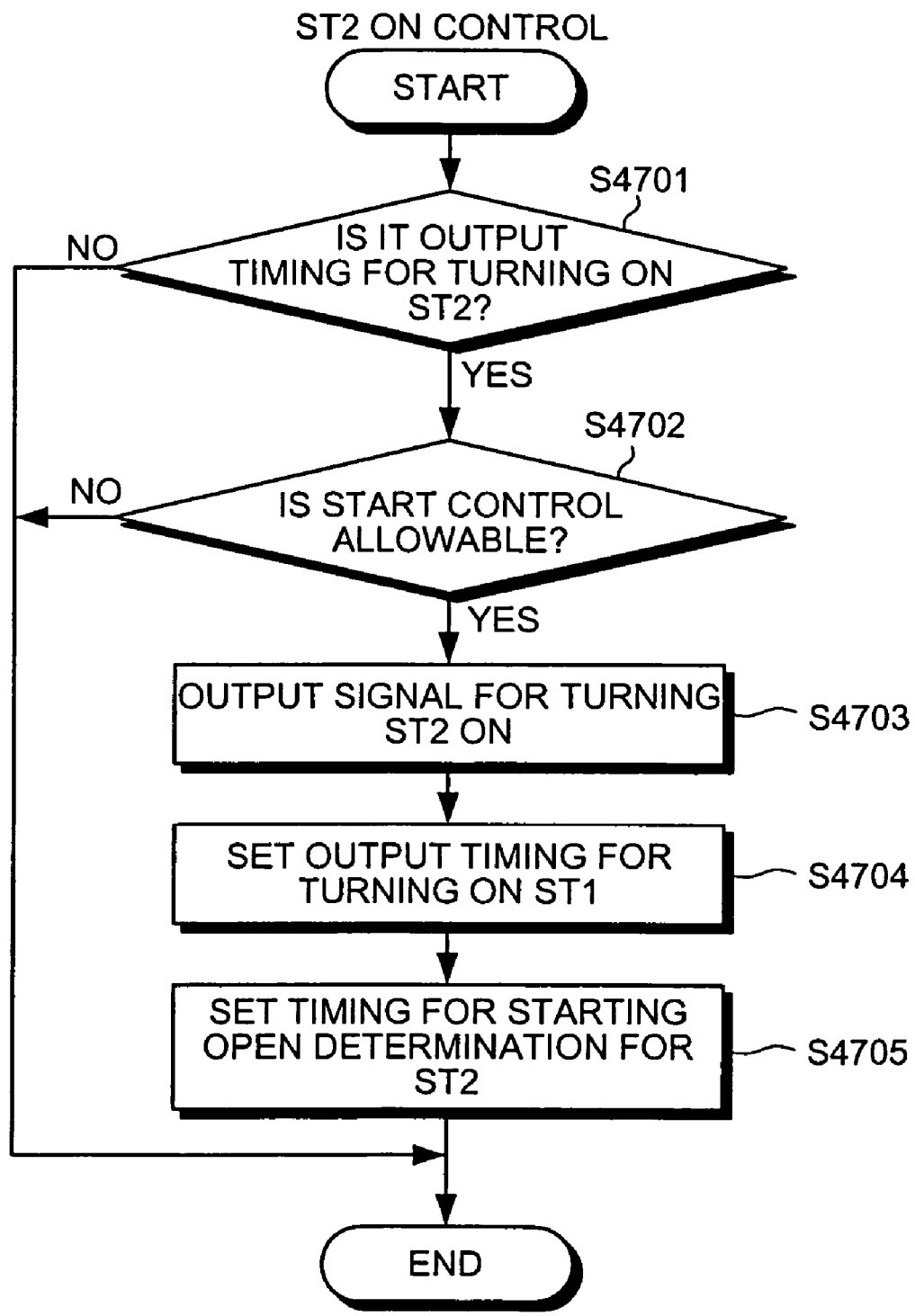
FIG. 52 is a flow chart of an ST2 ON control shown in FIG. 46.

FIG. 52 is a flow chart for illustrating details of the processing during the control for turning ON the ST2 line shown as step S4106 in FIG. 46. In this processing flow, at the beginning, the remote starter 10 determines whether the current point of time is the control timing for turning ON the ST2 line (step S4701).

When it is determined that the current point of time is the control timing for turning ON the ST2 line, (step S4701, Yes), then the remote starter 10 determines whether start control is allowable (step S4702).

When the start control is allowable (step S4702, Yes), the drive output section 15 turns ON the starter switch SWs2 to output a signal for turning ON the ST2 line (step S4703).

In the next step, the control timing for turning ON the ST1 line (step S4107 in FIG. 46) is set (step S4704), and the timing for starting open determination for the ST2 line is set (step S4705).

After the step S4705 is finished, or when it is determined that the current point of time is not the control timing for turning ON the ST2 line (step S4701, No), or when the start control is not allowable (step S4702, No), the remote starter 10 terminates the control for turning ON the ST2 line and shifts to the control for turning ON the ST1 line shown as step S4107 in FIG. 46.

Figure 53:
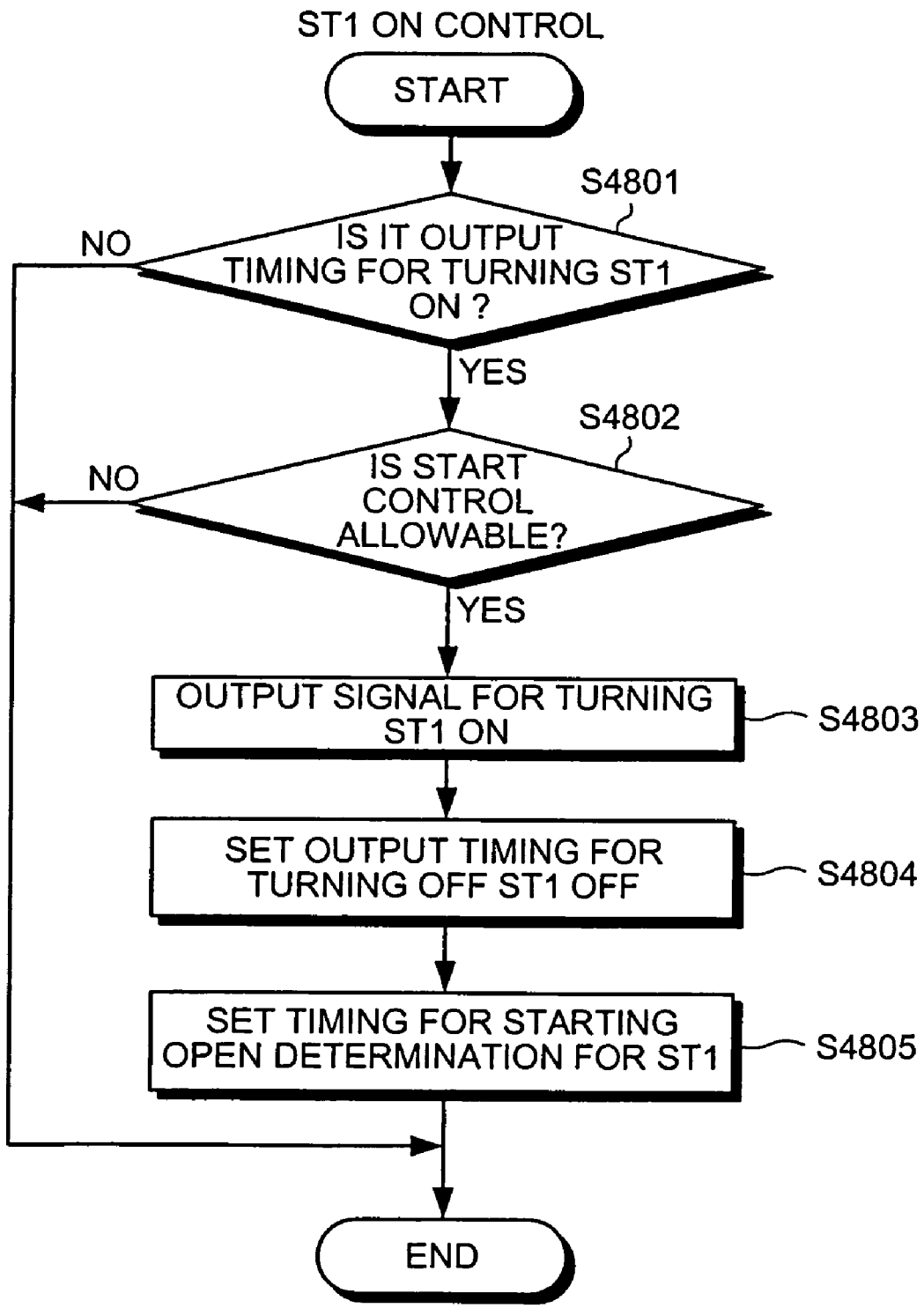
FIG. 53 is a flow chart of an ST1 ON control shown in FIG. 46.

FIG. 53 is a flow chart for illustrating details of the processing during the control for turning ON the ST1 line shown as step S4107 in FIG. 46. In this processing flow, at the beginning, the remote starter 10 determines whether the current point of time is the control timing for turning ON the ST1 line (step S4801).

When it is determined that the current point of time is the control timing for turning ON the ST1 line, (step S4801, Yes), then the remote starter 10 determines whether start control is allowable (step S4802).

When the start control is allowable (step S4802, Yes), the drive output section 15 turns ON the starter switch SWs1 to output a signal for turning ON the ST1 line (step S4803).

In the next step, the control timing for turning OFF the ST1 line (step S4108 in FIG. 46) is set (step S4804), and the timing for starting open determination for the ST1 line is set (step S4805).

After the step S4805 is finished, or when it is determined that the current point of time is not the control timing for turning ON the ST1 line (step S4801, No), or when the start control is not allowable (step S4802, No), the remote starter 10 terminates the control for turning ON the ST1 line and shifts to the control for turning OFF the ST1 line shown as step S4108 in FIG. 46.

Figure 54:
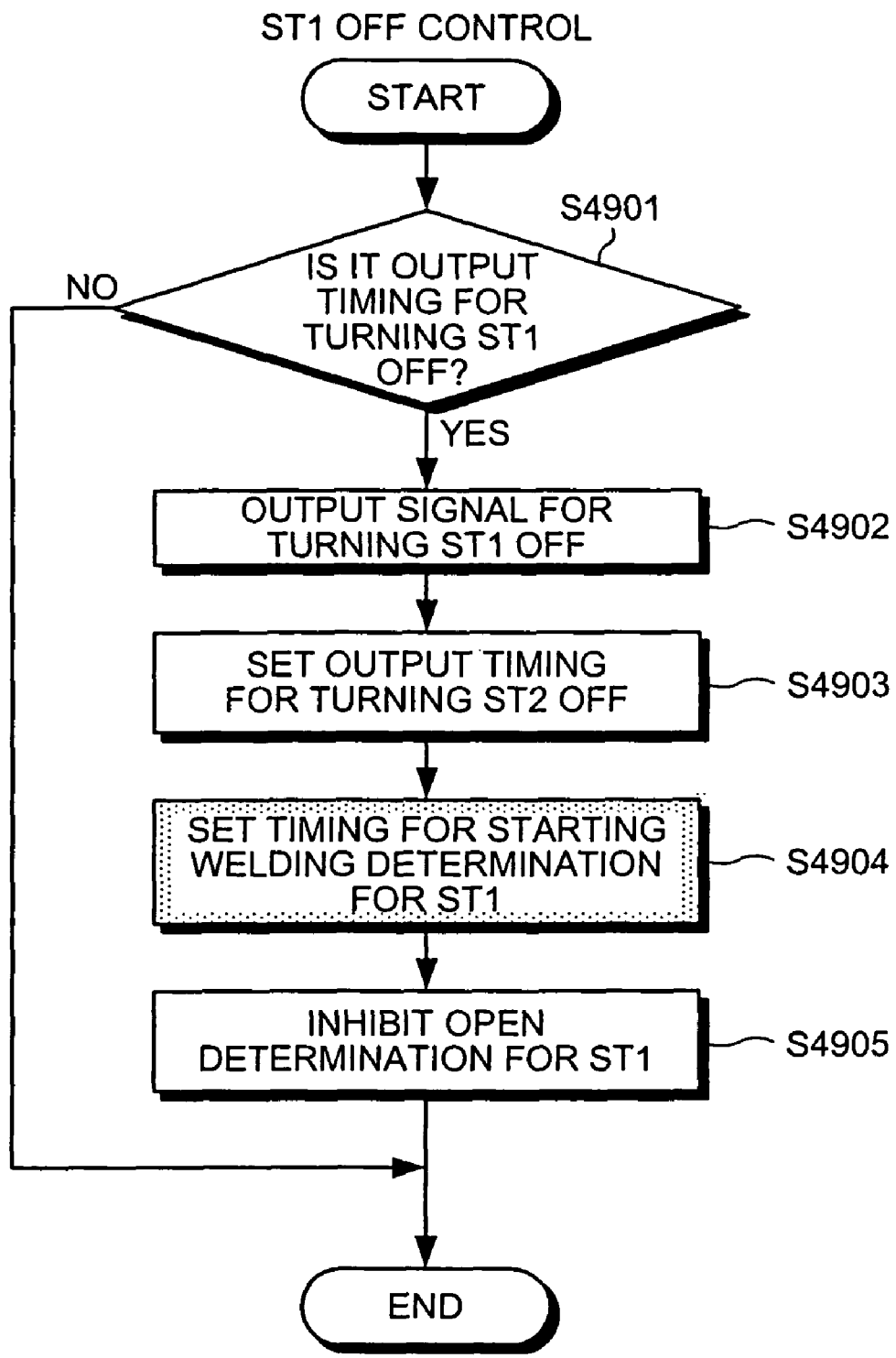
FIG. 54 is a flow chart of an ST1 OFF control shown in FIG. 46.

FIG. 54 is a flow chart for illustrating details of the processing during the control for turning OFF the ST1 line shown as step S4108 in FIG. 46. In this processing flow, at the beginning, the remote starter 10 determines whether the current point of time is the control timing for turning OFF the ST1 line (step S4901).

When it is determined that the current point of time is the control timing for turning OFF the ST1 line (step S4901, Yes), the drive output section 15 turns OFF the starter switch SWs1 to output a signal for turning OFF the ST1 line (step S4902).

In the next step, control timing for turning OFF the ST2 line (step S4109 in FIG. 46) is set (step S4903), and the timing for starting welding determination for the ST1 line is set (step S4904). Here, the timing for starting welding determination for the ST1 line is, as already described above, not set later than the control for turning OFF the ST1 line by a prespecified period of time, but set at the identical moment to the timing for starting welding determination for the ST2 line. In addition, after step S4904 is finished, the remote starter 10 inhibits open determination for the ST1 line (step S4905).

After the step S4905 is finished, or when it is determined that the current point of time is not the control timing for turning OFF the ST1 line (step S4901, No), the remote starter 10 terminates the control for turning OFF the ST1 line and shifts to the control for turning OFF the ST2 line shown as step S4109 in FIG. 46.

Figure 55:
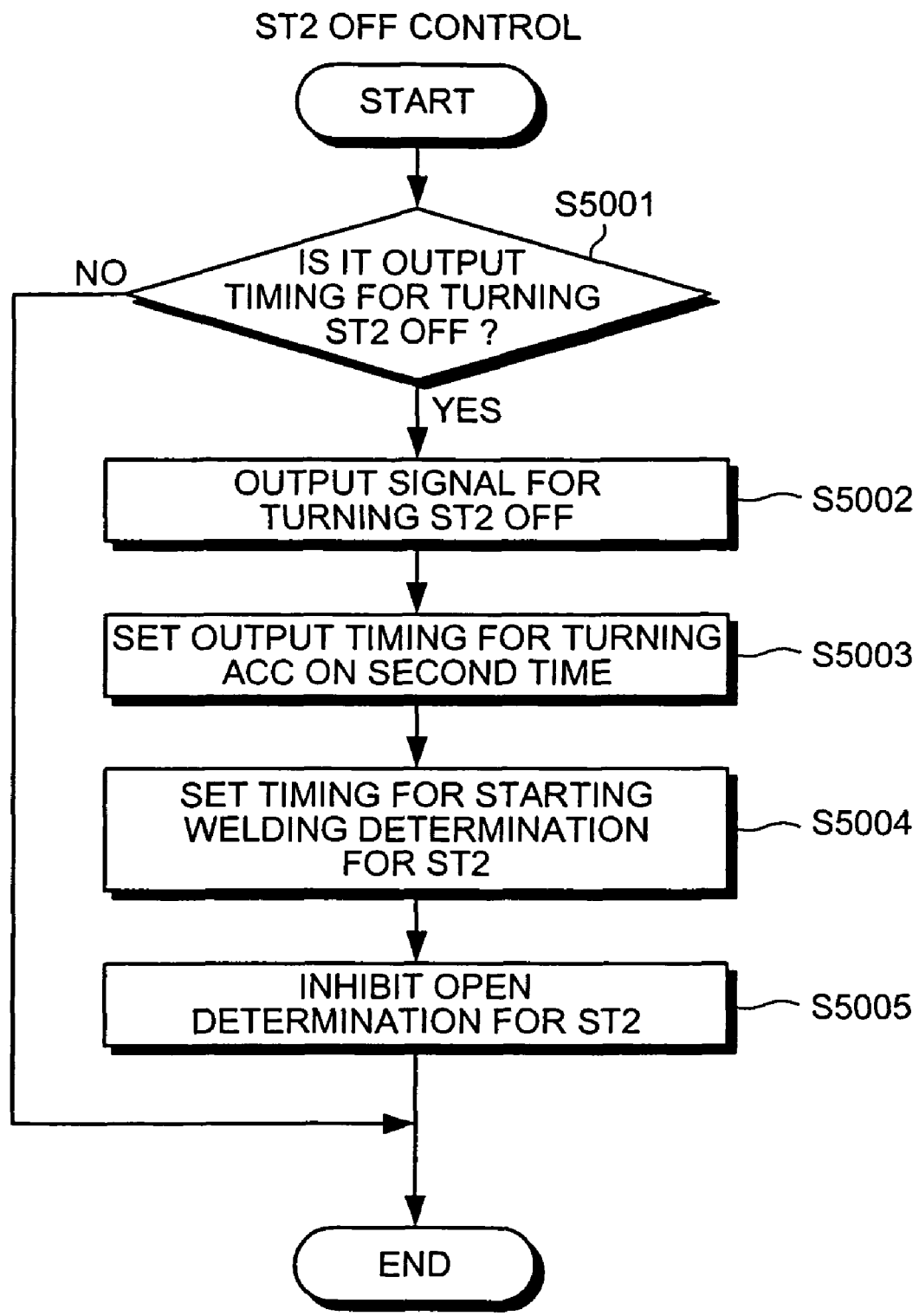
FIG. 55 is a flow chart of an ST2 OFF control shown in FIG. 46.

FIG. 55 is a flow chart for illustrating details of the processing during the control for turning OFF the ST2 line shown as step S4109 in FIG. 46. In this processing flow, at the beginning, the remote starter 10 determines whether the current point of time is the control timing for turning OFF the ST2 line (step S5001).

When it is determined that the current point of time is the control timing for turning OFF the ST2 line (step S5001, Yes), the drive output section 15 turns OFF the starter switch SWs2 to output a signal for turning OFF the ST2 line (step S5002).

In the next step, control timing for turning ON the ACC line second time (step S4110 in FIG. 46) is set (step S5003), and the timing for starting welding determination for the ST2 line is set (step S5004). Here, the timing for starting welding determination for the ST2 line is set in consideration to chattering and residual electric charge occurring due to the control for turning OFF the ST2 line in step S5002. After the step S5004 is finished, the remote starter 10 inhibits open determination for the ST2 line (step S5005).

After the step S5005 is finished, or when it is determined that the current point of time is not the control timing for turning OFF the ST2 line (step S5001, No), the remote starter 10 terminates the control for turning OFF the ST2 line and shifts to the control for turning ON the ACC line second time shown as step S4110 in FIG. 46.

Figure 56:
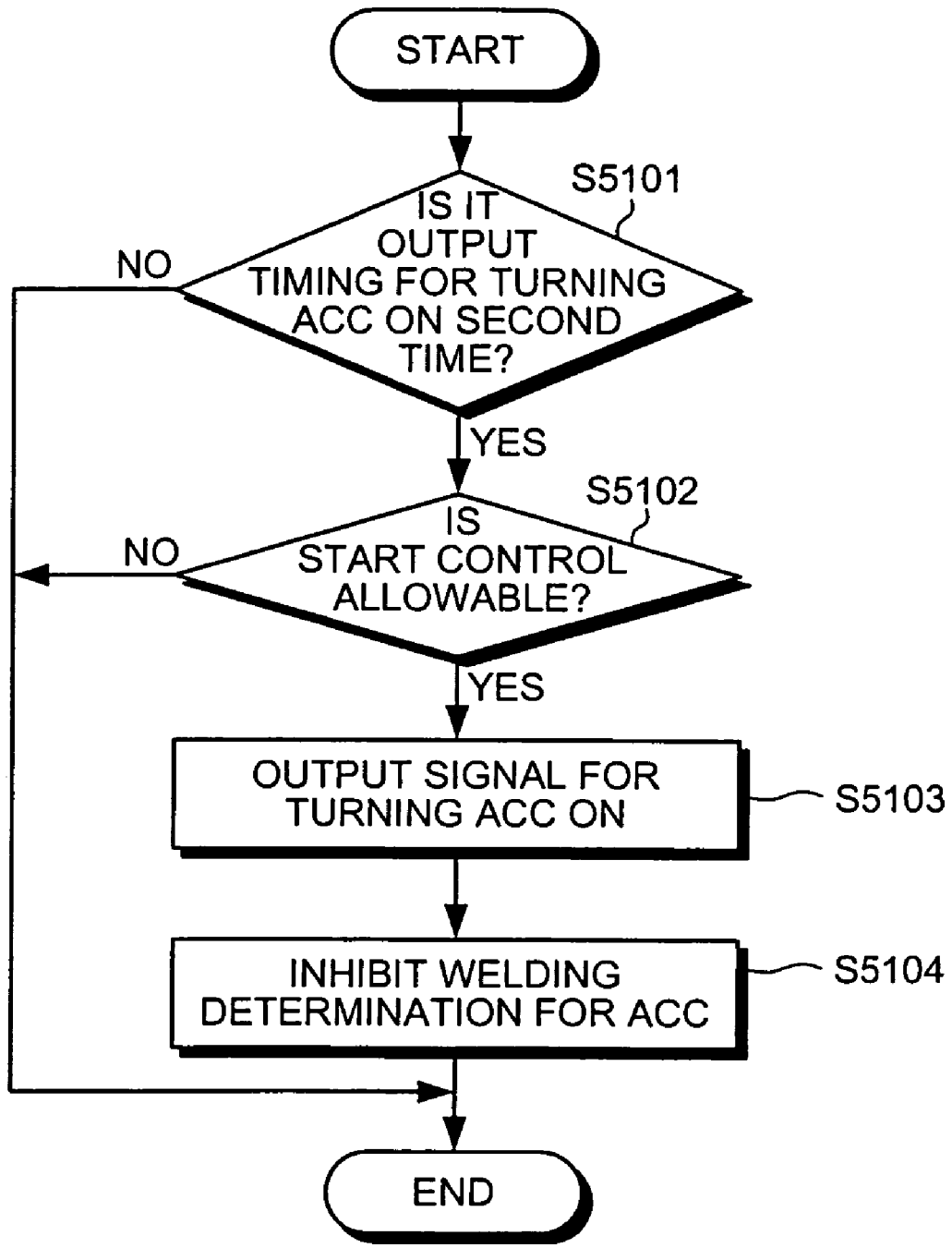
FIG. 56 is a flow chart of a second time ACC ON control shown in FIG. 46.

FIG. 56 is a flow chart for illustrating details of the processing during the control for turning ON the ACC line second time shown as step S4110 in FIG. 46. In this processing flow, at the beginning, the remote starter 10 determines whether the current point of time is the control timing for turning ON the ACC line second time (step S5101).

When it is determined that the current point of time is the control timing for turning ON the ACC line second time (step S5101, Yes), then the remote starter 10 determines whether start control is allowable (step S5102).

When the start control is allowable (step S5102, Yes), the drive output section 15 turns ON the ACC switch SWa to output a signal for turning ON the ACC line (step S5103) and also to inhibit welding determination for the ACC line (step S5104).

After the step S5104 is finished, or when it is determined that the current point of time is not the control timing for turning ON the ACC line second time (step S5101, No), or when the start control is not allowable (step S5102, No), the remote starter 10 terminates the control for turning ON the ACC line second time.

Next, failure determination by the remote starter 10 is described. The start control processing described with reference to FIG. 46 to FIG. 56 is carried out when an instruction for remote start is received from the transmitter 28, while each failure determination for the sub-relays, ACC line, IG line, and ST line is periodically carried out within the main routine.

Figure 57:
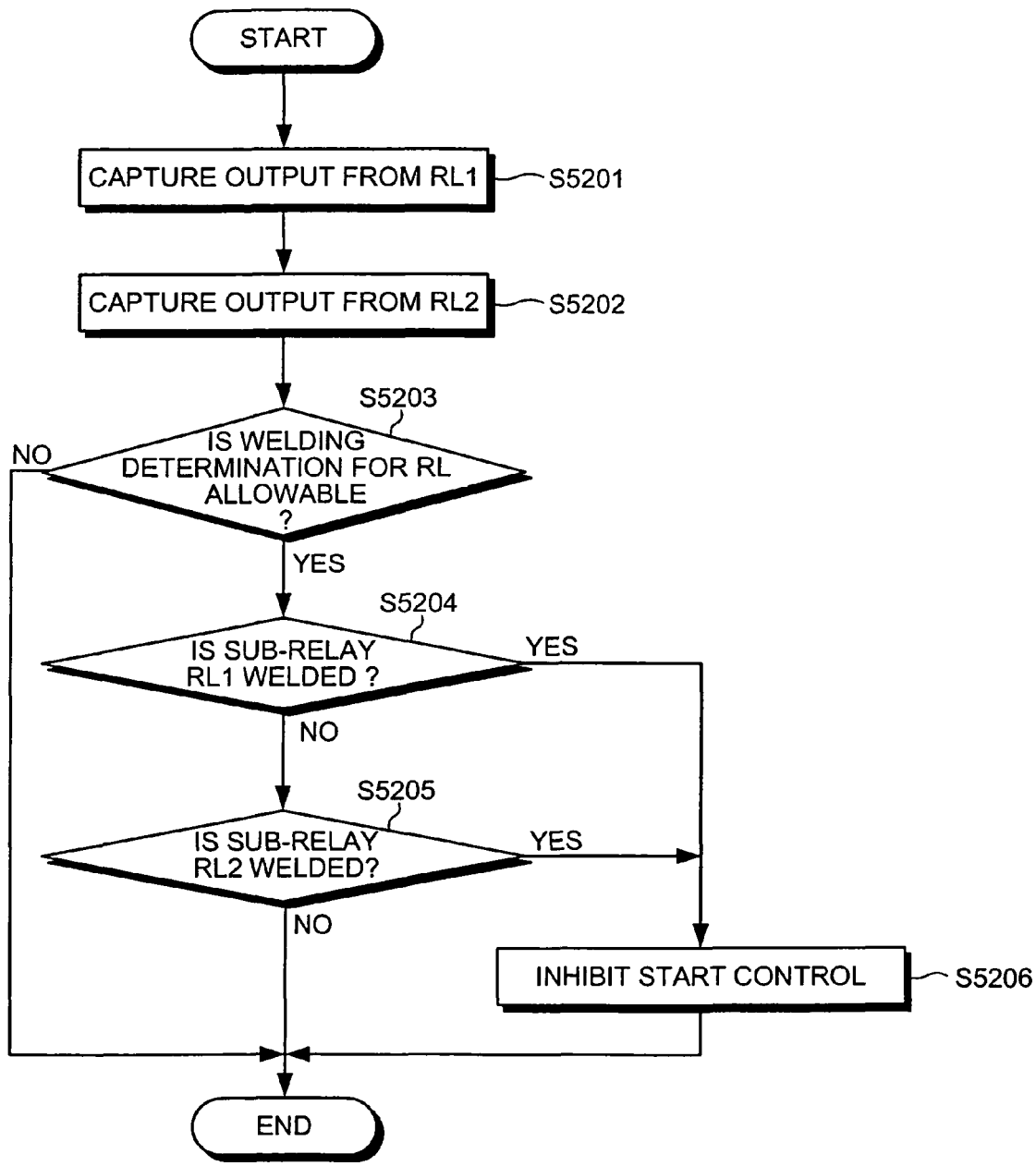
FIG. 57 is a flow chart of process procedure for performing failure determination of a sub-relay.

FIG. 57 is a flow chart for illustrating processing operation of the remote starter 10 for determining a failure in the sub-relays RL1 and RL2. As shown in this figure, the failure determination for the sub-relays begins with capture of output from the sub-relay RL1 (step S5201) and capture of output from the sub-relay RL2 (step S5202).

In the next step, the remote starter 10 determines whether welding determination for the sub-relays RL1 and RL2 is allowable (step S5203). When it is determined that welding determination for the sub-relays RL1 and RL2 is not allowable (step S5203, No), the processing is immediately terminated.

On the other hand, when it is determined that welding determination for the sub-relays RL1 and RL2 is allowable (step S5203, Yes), the remote starter 10 determines welding in the sub-relay RL1 (step S5204). Further, when the sub-relay RL1 is not in a welded state (step S5204, No), next welding in the sub-relay RL2 is determined (step S5205).

When the sub-relay RL2 is not in a welded state (step S5205, No), the processing is immediately terminated.

On the other hand, when it is determined that the sub-relay RL1 is in a welded state (step S5204, Yes) or when the sub-relay RL2 is in a welded state (step S5205, Yes), the remote starter 10 inhibits the start control (step S5206) and terminates the processing.

Inhibition of the start control is set by flagging with a prespecified indication, and when determining whether start control is allowable, it is required only to refer to this flag. Also the control for turning OFF the sub-relay RL1 may be carried out in response to the inhibition of the start control. In the following steps, to inhibit the start control, a flag is prepared with a prespecified indication, and the control for turning OFF the sub-relay RL1 may be carried out.

Figure 58:
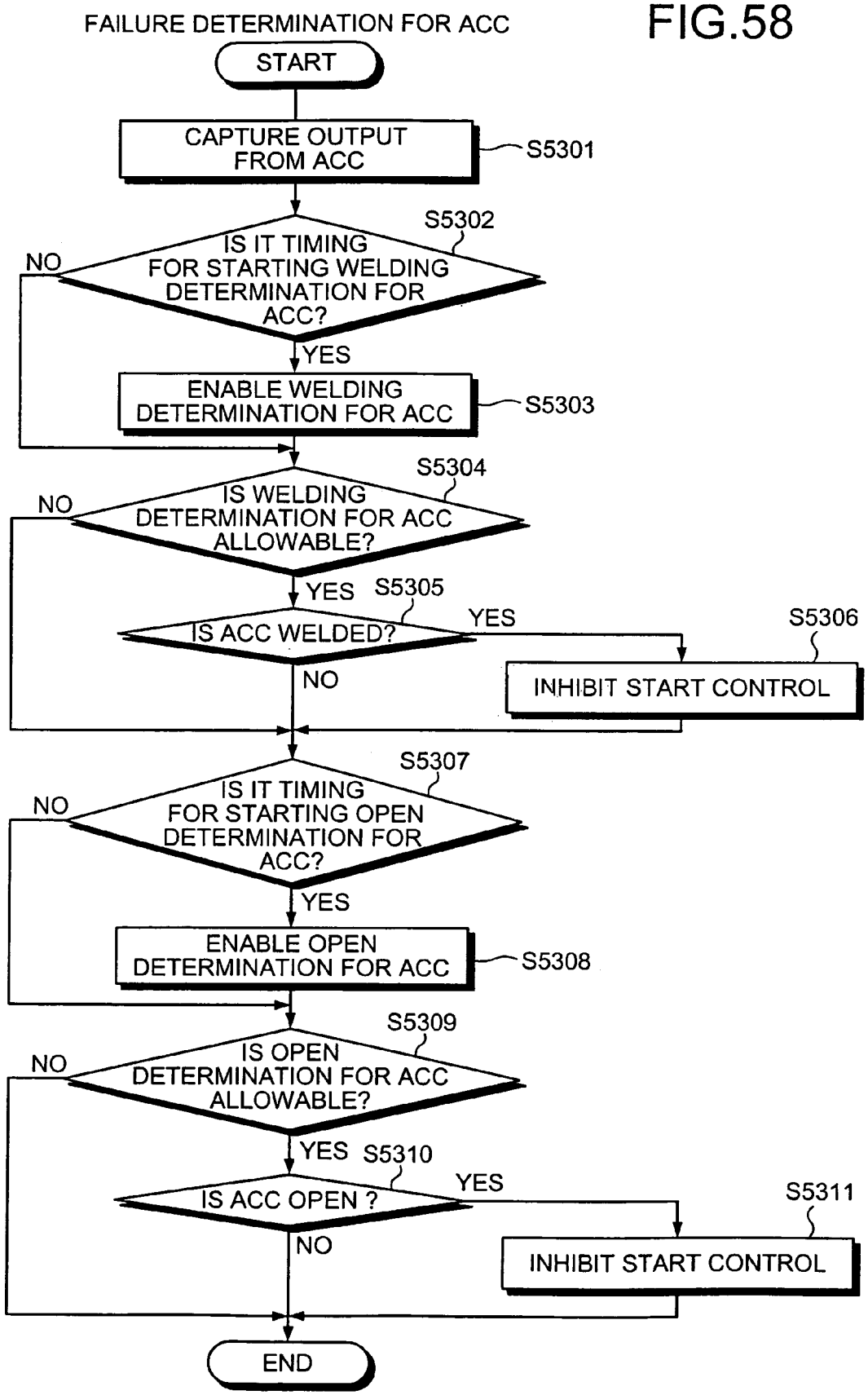
FIG. 58 is a flow chart of a process procedure for performing failure determination of an ACC.

Next, determination for a failure in the ACC line is described. FIG. 58 is a flow chart for illustrating processing operation of the remote starter 10 for determining a failure in the ACC line. As shown in this figure, determination for a failure in the ACC line begins with capture of output from the ACC line (step S5301).

In the next step, the remote starter 10 determines whether the current point of time is the timing for starting welding determination for the ACC line (step S5302), and when it is determined that the current point of time is the timing for starting welding determination for the ACC line (step S5302, Yes), welding determination for the ACC line is enabled (step S5303).

After the step S5303, or when it is determined that the current point of time is not the timing for starting welding determination for the ACC line (step S5302, No), the remote starter 10 determines whether welding determination for the ACC line is allowable (step S5304).

When welding determination for the ACC line is allowable (step S5304, Yes), the remote starter 10 determines welding in the ACC line (step S5305). When it is determined that the ACC line is in a welded state (step S5305, Yes), the start control is inhibited (step S5306).

After the start control is inhibited in step S5306, or when welding determination for the ACC line is not allowable (step S5304, No), or when the ACC line is not in a welded state (step S5305, No), then the remote starter 10 determines whether the current point of time is the timing for starting open determination for the ACC line (step S5307).

When it is determined that the current point of time is the timing for starting open determination for the ACC line (step S5307, Yes), the remote starter 10 enables open determination for the ACC line (step S5308).

After the step S5308, or when it is determined that the current point of time is not the timing for starting open determination for the ACC line (step S5307, No), the remote starter 10 determines whether open determination for the ACC line is allowable (step S5309).

When open determination for the ACC line is allowable (step S5309, Yes), the remote starter 10 carries out open determination for the ACC line (step S5310). When it is determined that the ACC line has an open failure (step S5310, Yes), the start control is inhibited (step S5311) and the processing is finished.

On the other hand, when it is determined that open determination for the ACC line is not allowable (step S5309, No), or when the ACC line has no open failure (step S5310, No), the remote starter 10 immediately terminates the failure determination for the ACC line.

Figure 59:
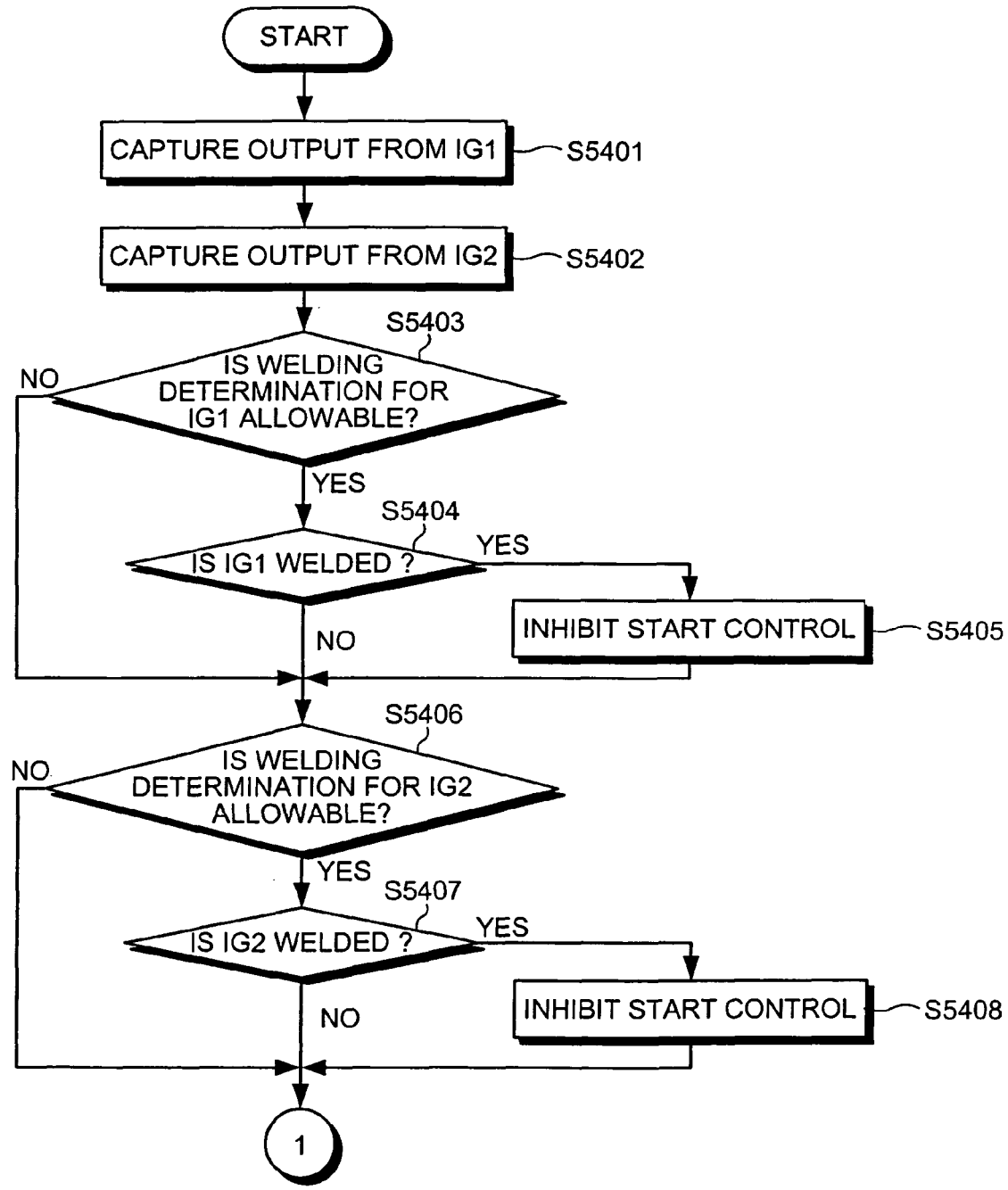
FIG. 59 is a flow chart (1) of a process procedure for performing failure determination of the IG.
Figure 60:
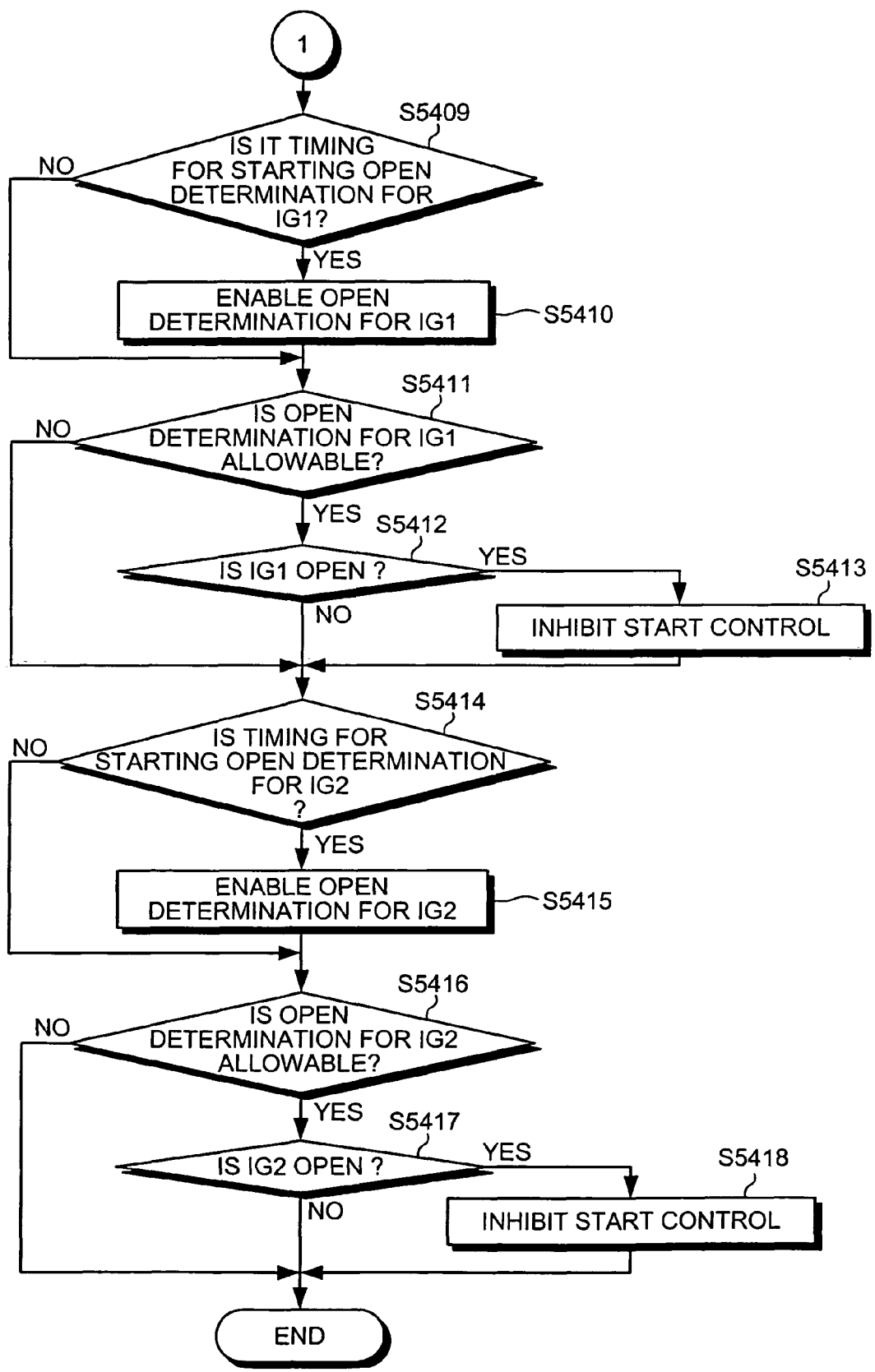
FIG. 60 is a flow chart (2) of a process procedure for performing failure determination of the IG.

Next, determination for a failure in the IG lines is described. FIGS. 59 to 60 show a flow chart for illustrating processing operation of the remote starter 10 for determining a failure in the IG lines. As shown in FIG. 59, determination for a failure in the IG lines begins with capture of output from the IG1 line (step S5401) and capture of output from the IG2 line (step S5402).

In the next step, the remote starter 10 determines whether welding determination for the IG1 line is allowable (step S5403). When welding determination for the IG1 line is allowable (step S5403, Yes), welding in the IG1 line is determined (step S5404). When it is determined that the IG1 line is in a welded state (step S5404, Yes), the start control is inhibited (step S 5405).

After the start control is inhibited in step S5405, or when welding determination for the IG1 line is not allowable (step S5403, No), or when the IG1 line is not in a welded state (step S5404, No), next the remote starter 10 determines whether welding determination for the IG2 line is allowable (step S5406).

When welding determination for the IG2 line is allowable (step S5406, Yes), welding in the IG2 line is determined (step S5407). When it is determined that the IG2 line is in a welded state (step S5407, Yes), the start control is inhibited (step S5408).

After the start control is inhibited in step S5408, or when welding determination for the IG2 line is not allowable (step S5406, No), or when the IG2 line is not in a welded state (step S5407, No), next the remote starter 10 determines whether the current point of time is the timing for starting open determination for the IG1 line (step S5409) as shown in FIG. 60.

When it is determined that the current point of time is the timing for starting open determination for the IG1 line (step S5409, Yes), the remote starter 10 enables open determination for the IG1 line (step S5410).

After the step S5410, or when it is determined that the current point of time is not the timing for starting open determination for the IG1 line (step S5409, No), the remote starter 10 determines whether open determination for the IG1 line is allowable (step S5411).

When open determination for the IG1 line is allowable (step S5411, Yes), the remote starter 10 carries out open determination for the IG1 line (step S5412). When it is determined that the IG1 line has an open failure (step S5412, Yes), the start control is inhibited (step S5413).

After the start control is inhibited in step S5413, or when open determination for the IG1 line is not allowable (step S5411, No), or when the IG1 line had no open failure (step S5412, No), the remote starter 10 determines whether the current point of time is the timing for starting open determination for the IG2 line (step S5414).

When it is determined that the current point of time is the timing for starting open determination for the IG2 line (step S5414, Yes), the remote starter 10 enables open determination for the IG2 line (step S5415).

After the step S5415, or when it is determined that the current point of time is not the timing for starting open determination for the IG2 line (step S5414, No), the remote starter 10 determines whether open determination for the IG2 line is allowable (step S5416).

When open determination for the IG2 line is allowable (step S5416, Yes), the remote starter 10 carries out open determination for the IG2 line (step S5417). When it is determined that the IG2 line has an open failure (step S5417, Yes), the remote starter 10 inhibits the start control (step S5418) and terminates the processing.

On the other hand, when it is determined that open determination for the IG2 line is not allowable (step S5416, No), or when the IG2 line has no open failure (step S5417, No), the remote starter 10 immediately terminates the failure determination for the IG lines.

Figure 61:
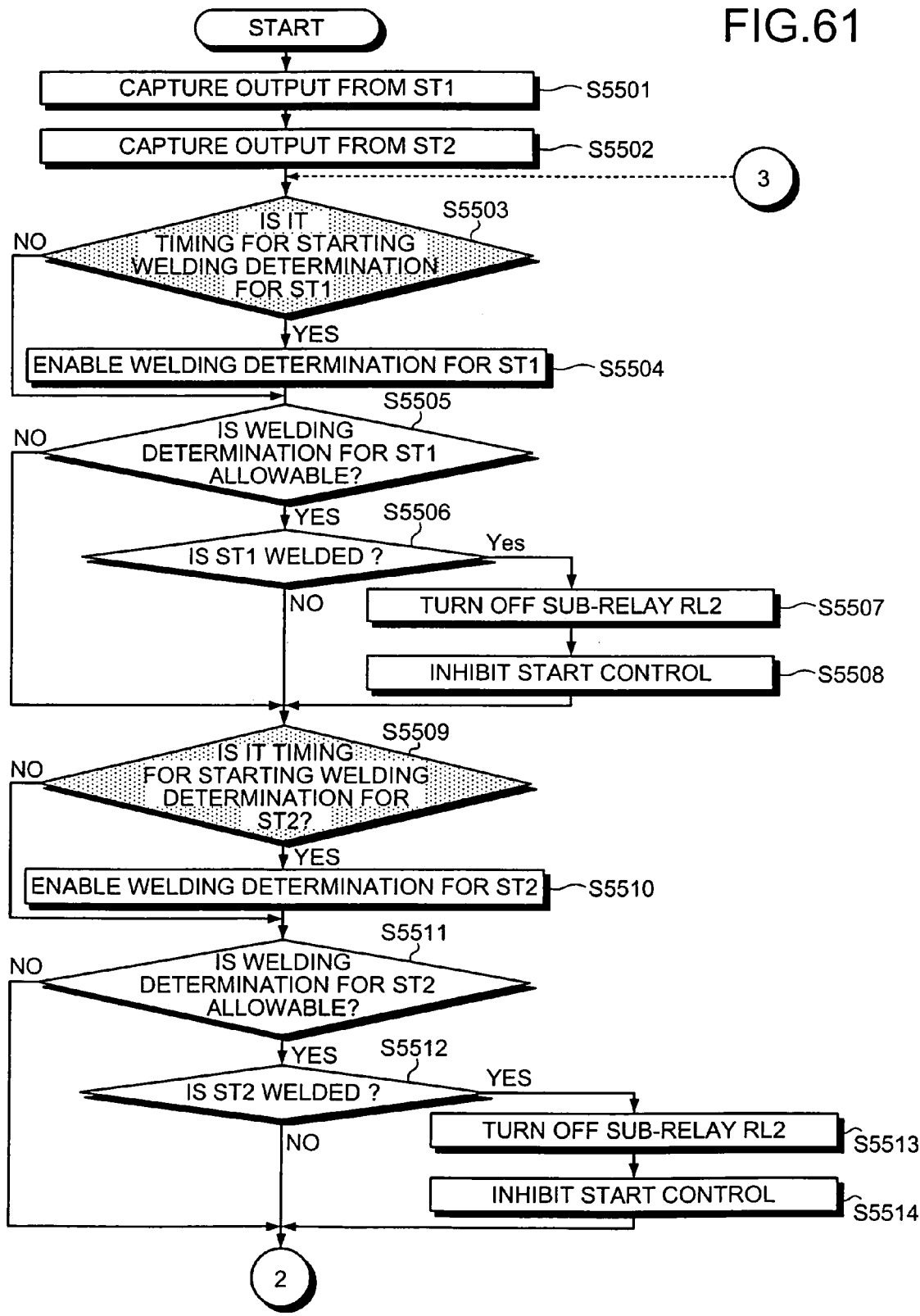
FIG. 61 is a flow chart (1) of a process procedure for performing failure determination of the ST.
Figure 62:
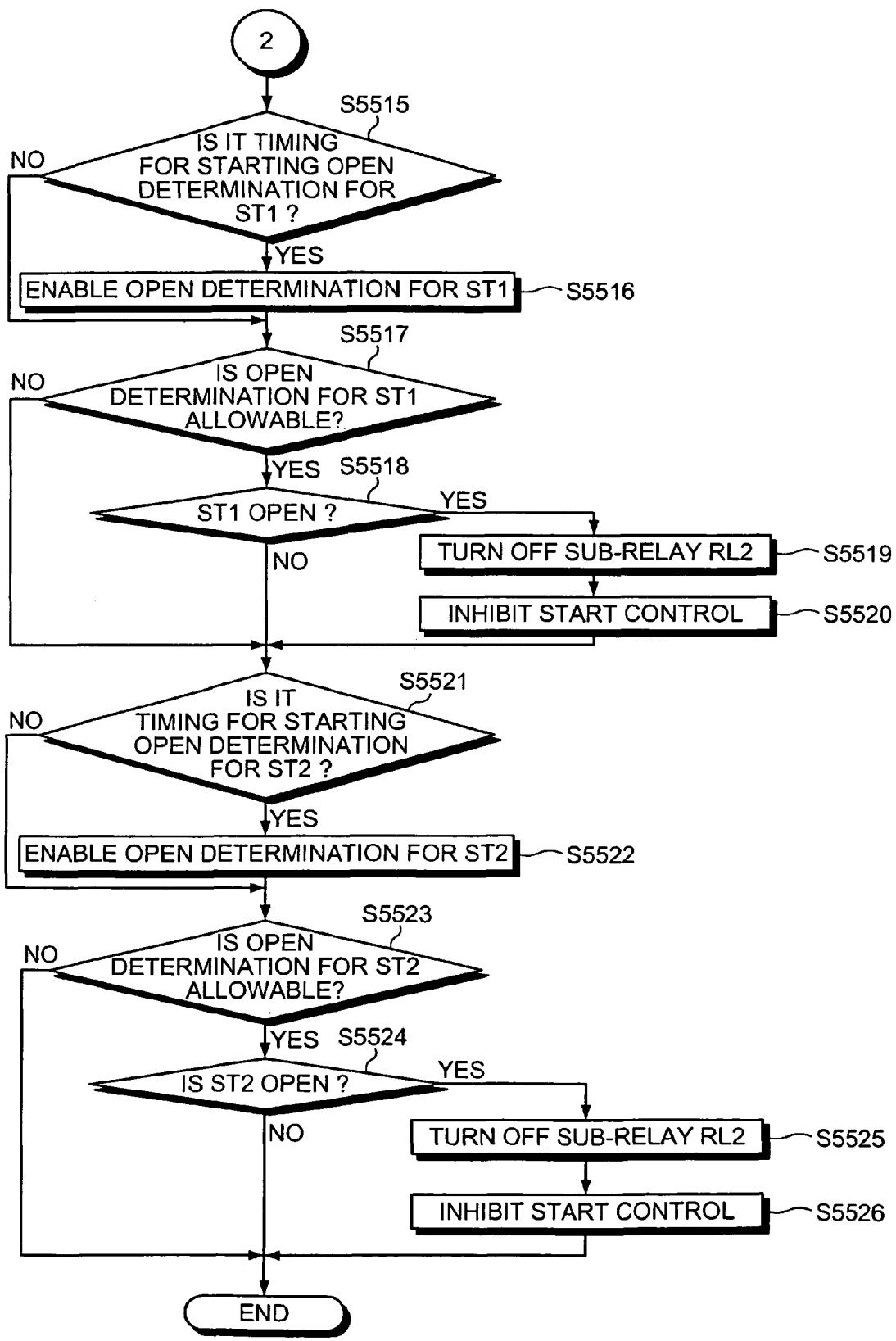
FIG. 62 is a flow chart (2) of a process procedure for performing failure determination of the ST.

Next, determination for a failure in the ST lines is described. FIGS. 61 to 62 show a flow chart for illustrating processing operation of the remote starter 10 for determining a failure in the ST lines. As shown in FIG. 62, determination for a failure in the ST lines begins with capture of output from the ST1 line (step S5501) and capture of output from the ST2 line (step S5502).

In the next step, the remote starter 10 determines whether the current point of time is the timing for starting welding determination for the ST1 line (step S5503), and when it is determined that the current point of time is the timing for starting welding determination for the ST1 line (step 5503, Yes), welding determination for the ST1 line is enabled (step S5504).

After the step S5504, or when it is determined that the current point of time is not the timing for starting welding determination for the ST1 line (step 5503, No), the remote starter 10 determines whether welding determination for the ST1 line is allowable (step S5505).

When welding determination for the ST1 line is allowable (step 5505, Yes), the remote starter 10 determines failure in the ST1 line (step S5506). When it is determined that the ST1 line is in a welded state (step S5506, Yes), the sub-relay RL2 is turned OFF (step S5507) and also the start control is inhibited (step S5508).

After the start control is inhibited in step S5508, or when welding determination for the ST1 line is not allowable (step 5505, No), or when the ST1 line is not in a welded state (step S5506, No), in the next step, the remote starter 10 determines whether the current point of time is the timing for starting welding determination for the ST2 line (step S5509), and when it is determined that the current point of time is the timing for starting welding determination for the ST2 line (step 5509, Yes), welding determination for the ST2 line is enabled (step S5510).

After the step S5510, or when it is determined that the current point of time is not the timing for starting welding determination for the ST2 line (step 5509, No), the remote starter 10 determines whether welding determination for the ST2 line is allowable (step S5511).

When welding determination for the ST2 line is allowable (step S5511, Yes), the remote starter 10 determines a failure in the ST2 line (step S5512). When it is determined that the ST2 line is in a welded state (step S5512, Yes), the sub-relay RL2 is turned OFF (step S5513) and also the start control is inhibited (step S5514).

After the start control is inhibited in step S5514, or when welding determination for the ST2 line is not allowable (step 5511, No), or when the ST2 line is not in a welded state (step S5512, No), then the remote starter 10 determines whether the current point of time is the timing for starting open determination for the ST1 line (step S5515) as shown in FIG. 62, and when it is determined that the current point of time is the timing for starting open determination for the ST1 line (step S5515, Yes), open determination for the ST1 line is enabled (step S5516).

After the step S5516, or when it is determined that the current point of time is not the timing for starting open determination for the ST1 line (step S5515, No), the remote starter 10 determines whether open determination for the ST1 line is allowable (step S5517).

When open determination for the ST1 line is allowable (step S5517, Yes), the remote starter 10 carries out open determination for the ST1 line (step S5518). When it is determined that the ST1 line has an open failure (step S5518, Yes), the sub-relay RL2 is turned OFF (step S5519), also the start control is inhibited (step S5520), and the processing is finished.

After the start control is inhibited in step S5520, or when open determination for the ST1 line is not allowable (step S5517, No), or when the ST1 line has no open failure (step S5518, No), in the next step, the remote starter 10 determines whether the current point of time is the timing for starting open determination for the ST2 line (step S5521), and when it is determined that the current point of time is the timing for starting open determination for the ST2 line (step S5521, Yes), open determination for the ST2 line is enabled (step S5522).

After the step S5522, or when it is determined that the current point of time is not the timing for starting open determination for the ST2 line (step S5521, No), the remote starter 10 determines whether open determination for the ST2 line is allowable (step S5523).

When open determination for the ST2 line is allowable (step S5523, Yes), the remote starter 10 carries out open determination for the ST2 line (step S5524). When it is determined that the ST2 line has an open failure (step S5524, Yes), the sub-relay RL2 is turned OFF (step S5525), also the start control is inhibited (step S5526), and the processing is finished.

On the other hand, when it is determined that open determination for the ST2 line is not allowable (step S5523, No), or when the ST2 line has no open failure (step S5524, No), the remote starter 10 immediately terminates the failure determination for the ST lines.

In this failure determination for the ST lines, the timing for starting welding determination for the ST1 line (step S5503) and the timing for starting welding determination for the ST2 line (step S5505) as shown in the figure with shaded areas are set, by assuming the case where the starter switch SWs1 is not connected as already described, at the moment after a pre-specified period of time from the control for turning OFF the starter switch SWs2 (namely the identical timing).

It is to be noted that the timing for starting welding determination for the ST1 line may be settled based on the connecting state of the starter switch SWs1. In this case, control for turning OFF the ST1 line which is the processing for settling the timing for starting welding determination for the ST1 line employs the processing shown in a flowchart in FIG. 63.

Figure 63:
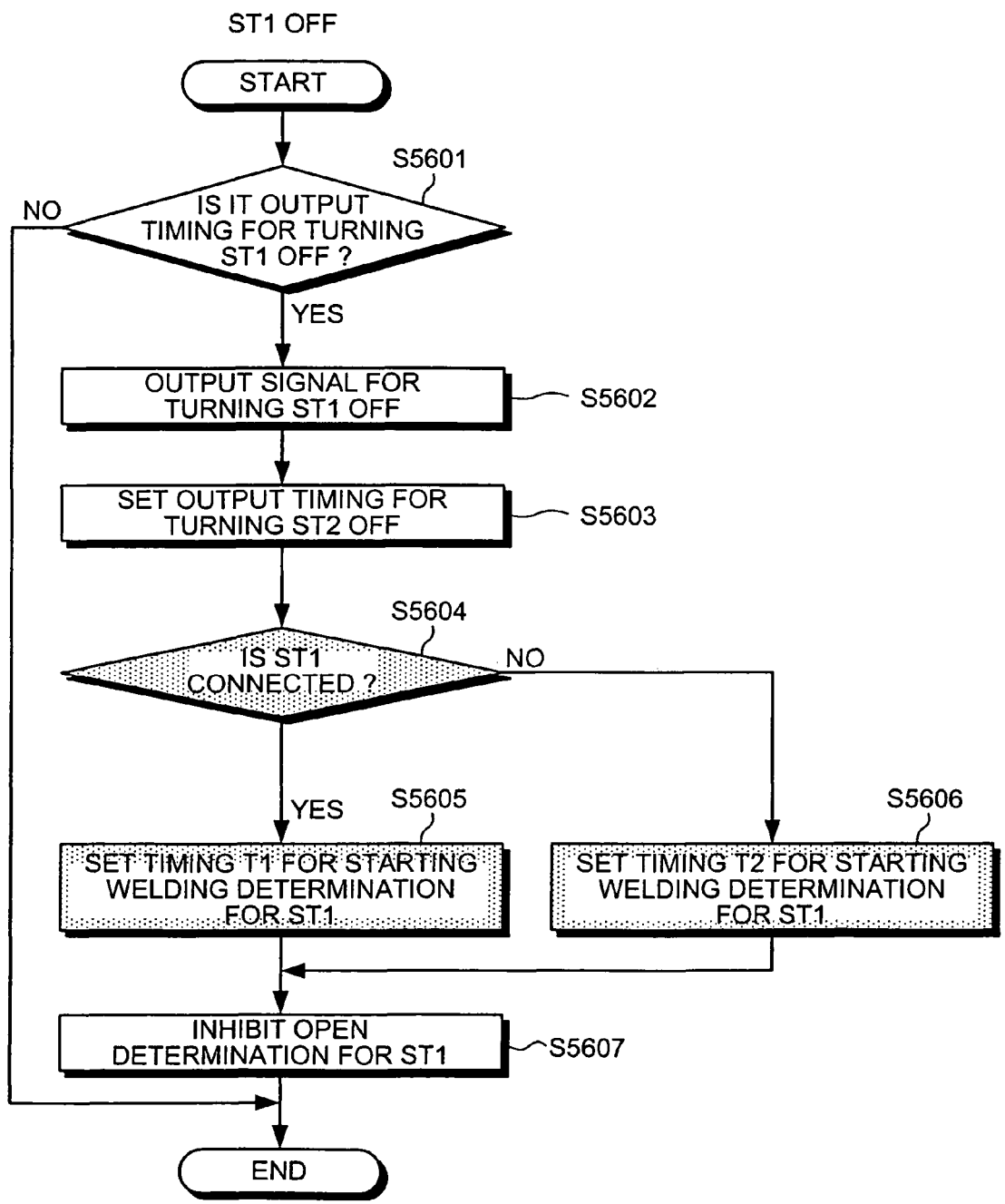
FIG. 63 is a flow chart of an ST1 OFF control when timing of performing the welding determination of the ST1 is changed.

In the control for turning OFF the ST1 line shown in FIG. 63, steps from determining whether the current point of time is control timing for turning OFF the ST1 line (step S5601), and when it is determined that the current point of time is the control timing for turning OFF the ST1 line (step S5601, Yes), and outputting a signal for turning OFF the ST1 line (step S5602), until setting control timing for turning OFF the ST2 line (step S5603), are similar to those from step S4901 to step S4903 of the processing of turning OFF the ST1 line shown in FIG. 54.

Then, after control timing for turning OFF the ST2 line is set (step S5603), it is determined whether the ST1 line is connected (step S5604), when the ST1 line is not connected (step S5604, No), the timing for starting welding determination for the ST1 line is set to T2, which is identical to the timing for welding determination for the ST2 line (step S5606).

On the other hand, when it is determined that the ST1 line is connected (step S5604, Yes), the timing for starting welding determination for the ST1 line is set to T11 in consideration to chattering or residual electric charge occurring due to the control for turning OFF the ST2 line in step S5602 (step S5605).

After the timing for starting welding determination for the ST1 line is set (step S5605 or step S5606), open determination for the ST1 line is inhibited (step S5607). Further, after step S5607 is finished, or when it is determined that the current point of time is not the control for turning OFF the ST1 line (step S5601, No), the remote starter 10 terminates the control for turning OFF the ST1 line and shifts to the control for turning OFF the ST2 line shown as step S4109 in FIG. 46.

Thus, by changing the timing for welding determination for the ST1 line based on the connecting state of the ST1 line, the optimal determination timing can be settled even when the ST line is connected. It is to be noted that the connecting state of the ST1 line may be inputted by a user, or may also be detected by the remote starter 10.

Figure 64:
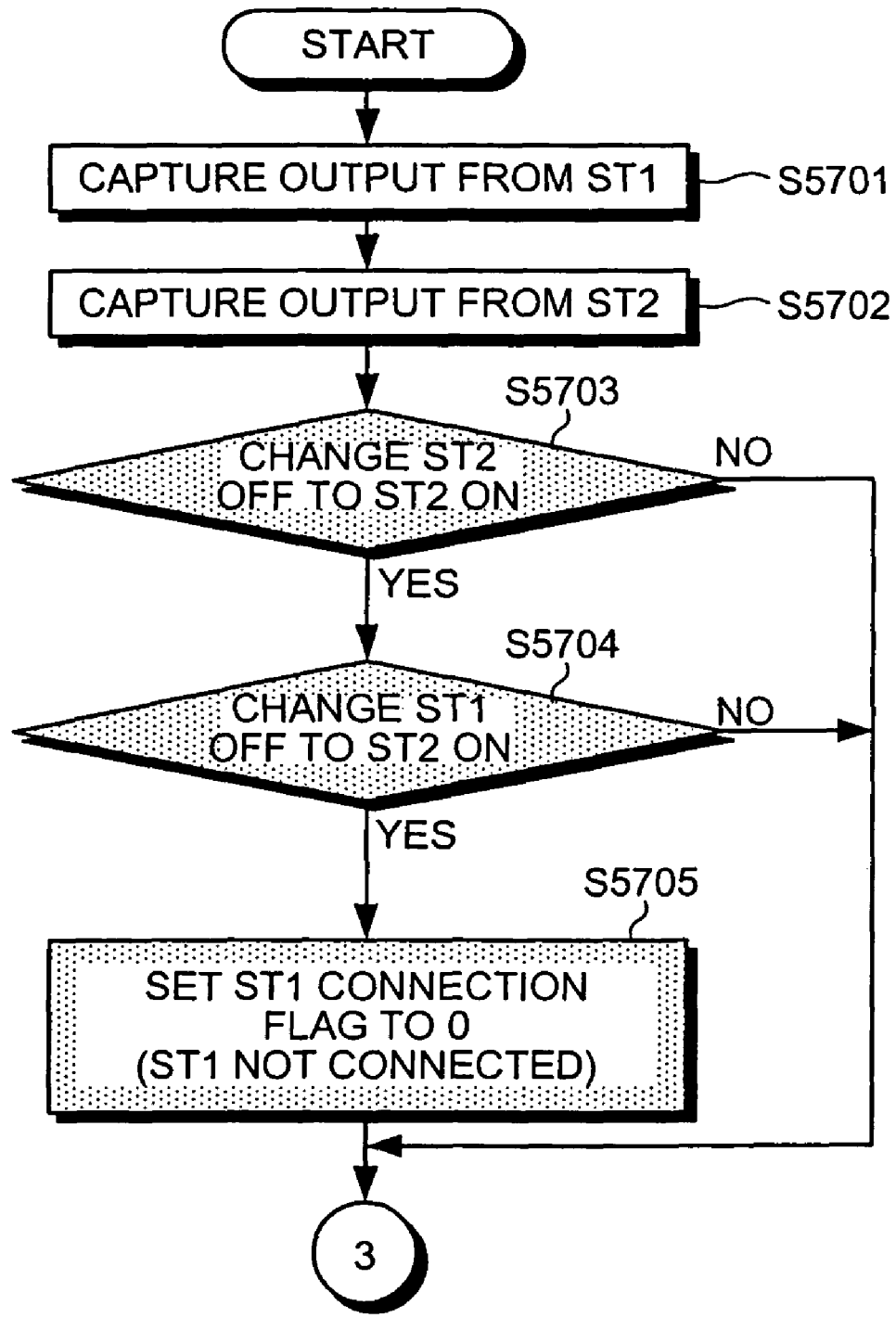
FIG. 64 is a flow chart of a process procedure for performing failure determination of the ST in which connection state of the ST1 can be automatically determined.

FIG. 64 shows a flow chart for the processing of failure determination for the ST lines for automatically detecting connecting state of the ST lines. The failure determination for the ST lines shown in this figure begins with capture of output from the ST1 line (step S5701) and capture of output from the ST2 line (step S5702).

When change from the ST1 line OFF to the ST1 line ON is detected (step S5703, Yes), it is determined whether the ST2 line OFF is changed to the ST2 line ON (step S5704).

When it is determined that the ST2 line OFF is changed to the ST2 line ON, namely when the ST1 line has changed in response to change in the ST2 line, the ST1 line connection flag indicates 0, namely it is determined that the ST1 line is not connected. It is to be noted that the initial value of this ST1 line connection flag is 1, namely the ST1 line is in the connected state.

After the step S5705 is finished, or when there is no change in the ST1 line OFF to the ST1 line ON (step S5703, No), or when there is no change in the ST2 line OFF to the ST2 line ON (step S5704, No), the processing shifts to the step S5503 shown in FIG. 61.

Thus, by comparing outputs from the ST1 line and the ST2 line, the connecting state of the ST1 line can be detected automatically.

As described above, with a remote starter according to the example 2, configuration can be switched easily only by changing the destination of connection of the external terminal 19. In addition, when the starter 1 line is not needed, the starter switch SWs 1 itself can be omitted to reduce cost.

Further, by changing the timing for determining the state of switch(es), regardless of change in configuration, the determination can be easily and accurately carried out without changing control output.

It is to be noted that, in the example 2, a remote starter applicable to a vehicle with 2 starter lines and 2 ignition lines is described with reference to the case where the starter is installed into a vehicle with one starter line, however, usage of the present invention is not limited to this example, and number of control lines of a remote starter can be configured in any number. In addition, for instance, in a case where the number of ignition lines of a remote starter exceeds the number of ignition lines on the vehicle-side, the present invention can be applied to any number of control lines. Further, a line to be connected instead of the deleted switch is not limited to the similar line (as described in the example, the starter line 1 is connected to the starter line 2), but may be connected to any control line.

In addition, although the example 2 is described by taking a remote starter for providing start control based on an instruction for remote start from the transmitter 28 as an instance, the present invention is not limited to this configuration and can widely be applied to start controls of a vehicle by means of relay switches, such as automatic starting based on a prespecified schedule or starting of a vehicle without operating the ignition key.

Further effects and variations can be easily derived by those skilled in the art. The aspects of the present invention are not limited to the specific embodiments as described. Thus, various modifications are possible within the scope of the idea of the invention according to the attached claims and the likes.

Effects

The start control apparatus according to the present invention includes a relay for disconnecting power to a starter switch and a power circuit supplying at least one of an ignition switch and an accessory switch independently from the relay, and disconnects the relay when welding is detected in the starter switch, whereby there is provided the advantage that it is possible to obtain a start control apparatus capable of preventing overturning of the starter switch by inhibiting the state in which the starter switch and accessory switch are turned ON simultaneously and providing ordinary switch control in the range in which the starter switch and accessory switch are simultaneously turned ON.

The start control apparatus according to the present invention provides control for turning ON the accessory switch in succession to start of the engine after detection for welding is carried out with the starter switch welding detecting unit, whereby there is provided the advantage that it is possible to obtain a start control apparatus capable of inhibiting the state in which the starter switch and accessory switch are turned ON simultaneously and providing ordinary switch control in the range in which the starter switch and accessory switch are not simultaneously turned ON.

The start control apparatus according to the present invention provides control for turning OFF the starter switch when, in succession to the control for turning ON the starter switch, welding in the accessory switch is detected by the accessory switch welding detecting unit, whereby there is provided the advantage that it is possible to obtain a start control apparatus capable of inhibiting the state in which the starter switch and accessory switch are turned ON simultaneously and providing ordinary switch control in the range in which the starter switch and accessory switch are not simultaneously turned ON.

The start control apparatus according to the present invention provides control for turning ON the starter switch in succession to detection of welding with the accessory switch welding detecting unit, whereby there is provided the advantages that it is possible to obtain a start control apparatus capable of inhibiting the state in which the starter switch and accessory switch are turned ON simultaneously and providing ordinary switch control in the range in which the starter switch and accessory switch are not simultaneously turned ON.

The start control apparatus according to the present invention changes a sequence of the control for turning ON the starter switch and detection of welding with the accessory switch, whereby there is provided the advantage that it is possible to obtain a start control apparatus capable of selecting the control sequence suited to connection state of the in-vehicle electric equipment.

The start control apparatus according to the present invention selectively inputs either one of a state of a switch to be monitored and a state of other switch to a monitoring unit for monitoring a starter switch or an ignition switch, whereby it is possible to obtain a start control apparatus with high versatility capable of being used irrespective of configuration in the vehicle side.

The start control apparatus according to the present invention monitors a state of a first ignition line switch with a second monitoring unit when a second ignition line switch is not provided therein, whereby there is provided the advantage that it is possible to obtain a start control apparatus with high versatility capable of being used even when the second ignition line switch is not provided therein.

In the start control apparatus according to the present invention, the timing for stating abnormality determination after state change of the first ignition line switch with a first determining unit is identical to the timing for starting abnormality determination after state change of the second ignition line switch with a second determining unit, whereby there is provided the advantage that it is possible to obtain a start control apparatus capable of executing abnormality determination even when there is not second ignition switch.

In the start control apparatus according to the present invention, the timing for starting abnormality determination for the first ignition line switch with the first determining unit is identical to the timing for starting abnormality determination for the first ignition line switch or the second ignition line switch with the second determining unit, whereby there is provided the advantage that it is possible to obtain a start control apparatus capable of accurately executing abnormality determination even when there is no second ignition switch.

The start control apparatus according to the present invention identifies, based on a result of monitoring with first and second monitoring units, data for a type of an ignition line switch inputted to the second monitoring unit and changes, when the ignition line switch with the data inputted to the second monitoring unit is a first ignition line switch, the timing for starting abnormality determination with the second determining unit to the timing for starting abnormality determination with the first determining unit, whereby there is provided the advantage that it is possible to obtain a start control apparatus capable of accurately executing abnormality determination by automatically determining the configuration.

In the start control method according to the present invention, power supply to the starter switch is disconnected when welding in the starter switch is detected, whereby there is provided the advantage that it is possible to obtain a start control method for inhibiting the state in which the starter switch and the accessory switch are turned ON simultaneously, continuing the ordinary switch control in the range where the starter switch and the accessory switch are turned ON simultaneously, and preventing overrunning of the starter switch.

INDUSTRIAL APPLICABILITY

As described above, the start control apparatus and start control method according to the present invention are useful in start control of a vehicle, and is especially suited to start control by controlling a relay switch.

What is claimed is:

1. A start control apparatus for providing start control of a vehicle in response to a remote signal received from a remote terminal, or in the directive mode, comprising:
a starter switch configured to control starting of an engine of the vehicle;
a relay configured to connect a power supply to the starter switch in series;
a power circuit configured to provide power supply to at least one of an ignition switch that controls ignition of the engine and an accessory switch that controls power supply to in-vehicle electric equipment, wherein the power circuit provides the power supply independent of the relay;
a starter switch welding detecting unit configured to detect that welding has occurred in the starter switch after receipt of the remote signal and within start control based on an incompatible ON/OFF state between a control signal for controlling the starter switch and an output at an output terminal of the starter switch; and
a switch control unit configured to control the relay to disconnect the power supply to the starter switch when the starter switch welding detecting unit detects that welding has occurred in the starter switch.

2. A start control apparatus for providing start control of a vehicle in response to a remote signal received from a remote terminal, or in the directive mode, comprising:
a starter switch configured to control starting of an engine of the vehicle;
an accessory switch configured to connect a power supply to in-vehicle electric equipment;
a starter switch welding detecting unit configured to detect that welding has occurred in the starter switch after receipt of the remote signal and within start control based on an incompatible ON/OFF state between a control signal for controlling the starter switch with an output at an output terminal of the starter switch; and
a switch control unit configured to turn ON the accessory switch in succession to start of the engine after detection by the starter switch welding detecting unit is over.

3. The start control unit according to claim 2, further comprising a relay configured to control power supply to the starter switch,
wherein the switch control unit disconnects power to the starter switch by controlling the relay, when the starter switch welding detecting unit detects that welding has occurred in the starter switch, and then turns ON the accessory switch.

4. A start control apparatus for providing start control of a vehicle in response to a remote signal received from a remote terminal, or in the directive mode, comprising:
a starter switch configured to control starting of an engine of the vehicle;
an accessory switch configured to connect a power supply to in-vehicle electric equipment;
an accessory switch welding detecting unit configured to detect that welding has occurred in the accessory switch after receipt of the remote signal and within start control based on an incompatible ON/OFF state between a control signal for controlling the accessory switch and an output at an output terminal of the accessory switch; and
a switch control unit configured to turn OFF the starter switch when the accessory switch welding detecting unit detects that welding has occurred in the accessory switch after the starter switch is turned ON.

5. A start control apparatus for providing start control of a vehicle in response to a remote signal received from a remote terminal, or in the directive mode, comprising:
a starter switch configured to control starting of an engine of the vehicle;
an accessory switch configured to connect a power supply to in-vehicle electric equipment;
an accessory switch welding detecting unit configured to detect that welding has occurred in the accessory switch after receipt of the remote signal and within start control based on an incompatible ON/OFF state between a control signal for controlling the accessory switch and an output at an output terminal of the accessory switch; and
a switch control unit configured to turn ON the starter switch after detection by the accessory switch welding detecting unit is over.

6. The start control apparatus according to claim 5, wherein the switch control unit suppresses control for turning ON the starter switch when the accessory switch welding detecting unit detects that welding has occurred in the accessory switch.

7. The start control apparatus according to claim 6, wherein the switch control unit provides control for turning ON the starter switch when the accessory switch welding detecting unit detects that welding had occurred in the accessory switch but the welding has been melted away.

8. A start control apparatus for providing start control of a vehicle in response to a remote signal received from a remote terminal, or in the directive mode, comprising:
a starter switch configured to control starting of an engine of the vehicle;
an accessory switch configured to connect a power supply to in-vehicle electric equipment;
an accessory switch welding detecting unit configured to detect that welding has occurred in the accessory switch after receipt of the remote signal and within start control based on an incompatible ON/OFF state between a control signal for controlling the accessory switch and an output at an output terminal of the accessory switch; and
a switch control unit capable of switching a sequence of the control for turning ON the starter switch and detection of welding in the accessory switch.

9. The start control apparatus according to claim 8, wherein the switch control unit is configured to change a standby period that is time between when the accessory switch is turned OFF and the detection of welding in the switch is started.

10. The start control apparatus according to claim 9, wherein the sequence of the control for turning ON the starter switch and the detection of welding in the accessory switch can be switched based on the standby period.

11. The start control apparatus of claim 1, wherein, within the start control, the starter switch welding detection unit detects whether welding has occurred by determining that the starter switch remains closed after the starter switch is turned off.

12. The start control apparatus of claim 2, wherein, within the start control, the starter switch welding detection unit detects whether welding has occurred by determining that the starter switch remains closed after the starter switch is turned off.

13. The start control apparatus of claim 4, wherein, within the start control, the accessory switch welding detection unit detects whether welding has occurred by determining that the accessory switch remains closed after the starter switch is turned on.

14. The start control apparatus of claim 5, wherein, within the start control, the accessory switch welding detection unit detects whether welding has occurred by determining that the accessory switch remains closed after the starter switch is turned on.

15. The start control apparatus of claim 8, wherein, within the start control, the accessory switch welding detection unit detects whether welding has occurred by determining that the accessory switch remains closed after the starter switch is turned on.

* * * * *